US005783767A

United States Patent [19]

Shinsky

[11] Patent Number: 5,783,767

[45] Date of Patent: Jul. 21, 1998

[54] FIXED-LOCATION METHOD OF COMPOSING AND PEFORMING AND A MUSICAL INSTRUMENT

[76] Inventor: Jeff K. Shinsky, 15531 Mira Monte, Houston, Tex. 77083

[21] Appl. No.: 898,613

[22] Filed: Jul. 22, 1997

Related U.S. Application Data

[60] Provisional application No. 60/020,457 Aug. 28, 1995.

Related U.S. Application Data

[63] Continuation-in-part of Ser. No. 531,786, Sep. 21, 1995, Pat. No. 5,650,584.

[51] Int. Cl.$^6$ .............................. G10H 5/00; H02M 5/00

[52] U.S. Cl. .............................. 84/657; 84/619; 84/613; 84/669

[58] Field of Search .............................. 84/613, 619, 637, 84/650, 657, 669

[56] References Cited

U.S. PATENT DOCUMENTS

| | | | |
|---|---|---|---|
| 5,003,860 | 4/1991 | Minamitaka | 84/613 X |
| 5,078,040 | 1/1992 | Shibukawa | 84/619 |
| 5,083,493 | 1/1992 | Heo | 84/619 |
| 5,153,361 | 10/1992 | Kozuki | 84/613 |

*Primary Examiner*—Jonathan Wysocki
*Assistant Examiner*—Jeffrey W. Donels
*Attorney, Agent, or Firm*—Gunn & Associates, P.C.

[57] ABSTRACT

A method for composing and performing music on an electronic instrument are provided. The method provides a technique in which individual chord progression chords can be triggered in real-time, while simultaneously generating the individual notes of the chord, and/or possible scale and non-scale notes to play along with the chord, and making them available for playing in separate fixed-locations on the instrument. The method of composition involves the designation of a chord progression section on the instrument, then assigning chords or individual chord notes to this chord progression section according to a song key's defined customary scale or customary scale equivalent song keys and scales. Further, as each chord is played in the chord progression section, the individual notes of the currently triggered chords are generated and simultaneously made available for playing in a separate fixed location on the instrument. Fundamental and alternate (fifth) notes of each chord may be generated and made available in separate fixed locations for composing purposes. Possible scale and non-scale notes, to play along with the currently triggered chord, can also be generated and simultaneously made available for playing in separate fixed locations on the instrument. Finally, a method of storing all composition data in memory, or on a storage device, in which all of this composition sequenced data can later be retrieved and performed by the user from a fixed location on the instrument, and on a reduced number of input controllers or keys.

1 Claim, 37 Drawing Sheets

FIXED-LOCATION METHOD OF COMPOSING AND PEFORMING AND A MUSICAL INSTRUMENT

This is a continuation in part of application Ser. No. 08/531,786, filed Sep. 21, 1995, now U.S. Pat. No. 5,650,584, which claims the benefit of provisional application Ser. No. 60/020,457 Filed Aug. 28, 1995.

FIELD OF THE INVENTION

The present invention relates generally to a method of composing and performing music on an electronic instrument. This invention relates more particularly to a method and an instrument for composing in which individual chords and/or chord notes in a chord progression can be triggered in real-time. Simultaneously, other notes and/or note groups are generated, such as individual notes of the chord, scale, and non-scale notes which may be selectively played along with the chord and/or chord notes. These other notes are made available in separate fixed locations on the instrument. The present invention further provides to a user or performer the ability to retrieve this composition data and to perform this composition from a fixed location on the instrument on a reduced number of keys.

BACKGROUND OF THE INVENTION

A complete electronic musical system should have both a means of composing professional music with little or no training, and a means of performing music, whether live or along with a previously recorded track, with little or no training, while still maintaining the highest levels of creativity and interaction in both composition and performance.

Methods of composing music on an electronic instrument are known, and may be classified in either of two ways: (1) a method in which automatic chord progressions are generated by depression of a key or keys (for example, Cotton Jr., et al., U.S. Pat. No. 4,449,437), or by generating a suitable chord progression after a melody is given by the user (for example, Minamitaka, U.S. Pat. No. 5,218,153); (2) a method in which a plurality of note tables is used for MIDI note-identifying information, and is selected in response to a user command (for example, Hotz, U.S. Pat. No. 5,099,738); and (32) a method in which one-finger chords can be produced in real-time (for example, Aoki, U.S. Pat. No. 4,419,916).

The first method of composition involves generating pre-sequenced or preprogrammed accompaniment. This automatic method of composition lacks the creativity necessary to compose music with the freedom and expression of a trained musician. This method dictates a preprogrammed accompaniment without user selectable modifications in real-time, either during composition or performance.

The second method of composition involves the use of note tables to define each key as one or more preselected musical notes. This method of using tables of note-identifying information is unduly limited and does not provide the professional results, flexibility, and efficiency achieved by the present invention.

The present invention allows any and all needed performance notes and/or note groups to be generated on-the-fly, providing many advantages. Any note or group of notes can now be auto-corrected during performance according to a generated note or note group, thus preventing incorrect notes from playing over the various chord and/or scale changes. Generating note groups on-the-fly allows every possible combination of harmonies, non-scale note groups, scale note groups, combined scale note groups, chord groups, chord inversions/voicings, note ordering, note group setups, and instrument setups to be accessible at any time, using only the current trigger status message, and/or other current triggers described herein, such as -those which can be used for experimentation with chord and/or scale changes. The user is not limited to pre-recorded tables of note identifying information. This allows any new part to be added at any time, and musical data can be transferred between various instruments for unlimited compatibility and flexibility during composition and/or performance. Since all data is generated on-the-fly, the database needed to implement the system is minimal. The present invention also allows musically-correct one-finger chords, as well as individual chord notes, to be triggered with full expression from the chord progression section while providing the user with indicators for playing specific chord progressions, in a variety of song keys.

The thirdsecond method of composition, on the other hand, allows a user to trigger one-finger chords in real-time, thus allowing the user some creative control over which chord progression is actually formed. Although this method has the potential to become an adequate method of composition, it currently falls short in several aspects. There are five distinct needs which must be met, before a person with little or no musical training can effectively compose a complete piece of music with total creative control, just as a trained musician would. Any series of notes and/or note groups can be generated on-the-fly simultaneously, and provided to the user as needed, utilizing only one set of triggers. This allows for unlimited system flexibility during composition and/or performance:

(1) A means is needed for assigning a particular section of a musical instrument as a chord progression section in which individual chords and/or chord notes can be triggered in real-time with one or more fingers. Further, the instrument should provide a means for dividing this chord progression section into particular song keys, and providing indicators scales so that a user understands the predetermined song key and chord progression number and/or relative position. For example a song in the key of E Major defines a chord progression 1-4-5, as described more fully below.

Shimaya, U.S. Pat. No. 5,322,966, teaches a designated chord progression section, but the chord progression section disclosed in Shimaya follows the chromatic progression of the keyboard, from C to B. Shimaya provides no allowance for dividing this chord progression section into particular song keys and scales. One of the most basic tools of a composer is the freedom to compose in a selected key. Another basic tool allows a musician to compose using specific chord progressions based on the song keyparticular key and a scale. As in the previous example, when composing a song in the key of E Major, the musician should be permitted to play a chord progression of 1-4-5-6-2-7-3, or any other progression chosen by the musician. The indicators provided by the present invention can also indicate relative positions in the customary scale and/or customary scale equivalent of a selected song key, thus eliminating the confusion between major song keys, and their relative minor equivalents.

In our culture's music, there are thousands of songs based on a simple 1-4-5 chord progression. Yet, most people with little or no musical training, and using known systems and methods, have no concept of the meaning of a musical key or a chord progression.

Further, there currently exists no adequate method of creating chord progressions which allow an individual with little or no musical training to compose and perform music with the flexibility and musical know-how of a trained musician, while maintaining creative control. An individual using current methods is limited strictly to a chromatic chord progression in the key of C. Such systems are unduly limited since most modern music is composed using specific song keys and chord progressions based on a particular scale. The present invention also, however, allows for the use of chromatics at the discretion of the user. The inexperienced composer who uses the present invention is made fully aware at all times of what he is actually playing. The user can add "non-scale" chromatic chords if desired, not just add them out of ignorance.

(2) There also remains a need for a musical instrument that provides a user the option to play chords with one or more fingers in the chord progression section as previously described, while the individual notes of the currently triggered chord are simultaneously generated and made available for playing in separate fixed chord locations on the instrument. Individual notes can be sounded in different octaves when played. Regardless of the different chords which are being played in the chord progression section, the individual notes of each currently triggered chord can be generated and made available for playing in these same fixed chord location(s) on the instrument in real-time. The fundamental note and the alternate note (fifth) of the chord can be made available in their own fixed locations for composing purposes, and chord notes can be reconfigured in any way in real-time for unlimited system flexibility.

This fixed chord location feature of the present invention allows a user with little or no musical training to properly compose a complete music piece. For example, by specifying this fixed chord location, and identifying or indicating the fundamental and alternate bass note locations of each chord, the user can easily compose entire basslines, arpeggios, and specific chord harmonies with no musical training, while maintaining complete creative control.

One obstacle that an individual with little or no training encounters when playing a musical instrument is the need for physical skill to accurately play all of the notes of a particular chord. Chord notes are usually spread out on a keyboard, and therefore are usually very difficult to identify and play efficiently, without extensive training and practice. The fixed-location feature of the present invention virtually eliminates the difficult physical aspects of playing chords on a musical instrument. An individual can play all of the individual notes of each chord in the progression, without movement of the user's hand from the fixed chord section.

(3) There also remains a need for a way to trigger chords with one or more fingers in the chord progression section, while scale notes and/or non-scale notes are simultaneously generated and made available for playing in separate fixed locations on the instrument. These scale notes and non-scale notes can also be played in different octaves. This method of generating providing scale and/or non-scale notes to be played from a fixed locations on the instrument allows unlimited real-time system flexibility, during both composition and/or re-performance playback dramatically reduces the amount of skill needed to compose and perform music. For example, a pentatonic scale can be made to take up only 5 positions in the fixed scale location, thus allowing the user to compose a song's entire melody line without moving his hand.

(4) There also remains a need for a way to trigger chords with one or more fingers in the chord progression section, while the entire chord is simultaneously generated and made available for playing from one or more keys in a separate fixed location, and can be sounded in different octaves when played. This feature allows the user to play right hand chords, inversions, the root position of a chord, and popular voicing of a chord at any time the user chooses and with dramatically reduced physical skill, yet retains the creativity and flexibility of a trained musician.

(5) Finally, there needs to be a means for adding to or modifying a composition once a basic progression and melody are decided upon and recorded by the user. A user with little or no musical training is thus able to add additional musically correct parts and/or non-scale parts to the composition, to remove portions of the composition that were previously recorded, or to simply modify the composition in accordance with the taste of the musician. The on-the-fly note generation methods of the present invention allows any note, series of notes, harmonies, note groups, chord voicings, inversions, instrument configurations, etc. to be accessible at any time by the user to achieve professional composition and/or re-performance results.

Techniques for automating the performance of music on an electronic instrument are also well known, and primarily involve the use of indication systems which display to the user the notes to play on the electronic instrument to achieve the desired performance. These techniques are primarily used as teaching aids of traditional music theory and performance (e.g., Shaffer et al., U.S. Pat. No. 5,266,735). These current methods provide high tech "cheat sheets". The user must follow along to an indication system and play all chords, notes, and scales just as a trained musician would. These methods do nothing to actually reduce the demanding physical skills required to perform the music.

There are three distinct needs which must be met before a person with little or no musical training can effectively perform music while maintaining the high level of creativity and interaction of a trained musician.

The first need involves performing music, such as playing entire melody lines, from a reduced number of keys in a fixed location. This technique dramatically reduces the amount of physical skill needed to perform music and/or melody lines. A user may perform a song at different skill levels. This allows an inexperienced user to play the melody of a song from a fixed location on the instrument without moving his hand.

Additional notes, entire chords, and harmonies are also provided to allow the user to improvise just as a trained professional would, as well as for performance enhancement.

The second need involves playing all of the individual chord notes in a song's chord progression from a fixed location on the instrument. This dramatically reduces the amount of physical skill needed to perform music, while allowing a user total creative control in playing basslines, arpeggios, and chordal melodies from the fixed location.

The third need involves playing the entire chord in a song's chord progression with one or more keys from a fixed location on the instrument. This method also dramatically reduces the amount of physical skill needed to perform music, while still allowing a user total creative control in playing all inversions, chord voicings, and harmonies without moving his hand from the fixed chord location. The fixed location note generation methods of the present invention allow any previously recorded music to be played Fixed locations of the chord section and melody section can be combined in a variety of ways to implement these methods from on a broad range of musical instruments, as well as and' with unlimited system flexibility due to all of the various notes, note groups, setup configurations, harmonies, etc. that are accessible to the user at any time to provide the user with different skill levels for performance.

It is a further object of the present invention to complete the system by allowing multiple instruments to be effectively utilized together for interactive composition and/or performance among multiple musicians, with no need for knowledge of music theory, and while still maintaining the highest levels of creativity and flexibility that a trained musician would have.

SUMMARY OF THE INVENTION

There currently exists no such adequate means of composing and performing music with little or no musical training. It is therefore an object of the present invention to allow one to compose and perform music with dramatically reduced physical skill requirements and no need for knowledge of music theory while still maintaining the highest levels of creativity and flexibility that a trained musician would have. The fixed location methods of the present invention solves these problems while still allowing the user to maintain creative control.

These and other features of the present invention will be apparent to those of skill in the art from a review of the following detailed description, along with the accompanying drawings.

DETAILED DESCRIPTION OF A PREFERRED EMBODIMENT

The present invention is primarily software based and the software is in large part a responsibility driven object oriented design. The software is a collection of collaborating software objects, where each object is responsible for a certain function.

Figure 1A:
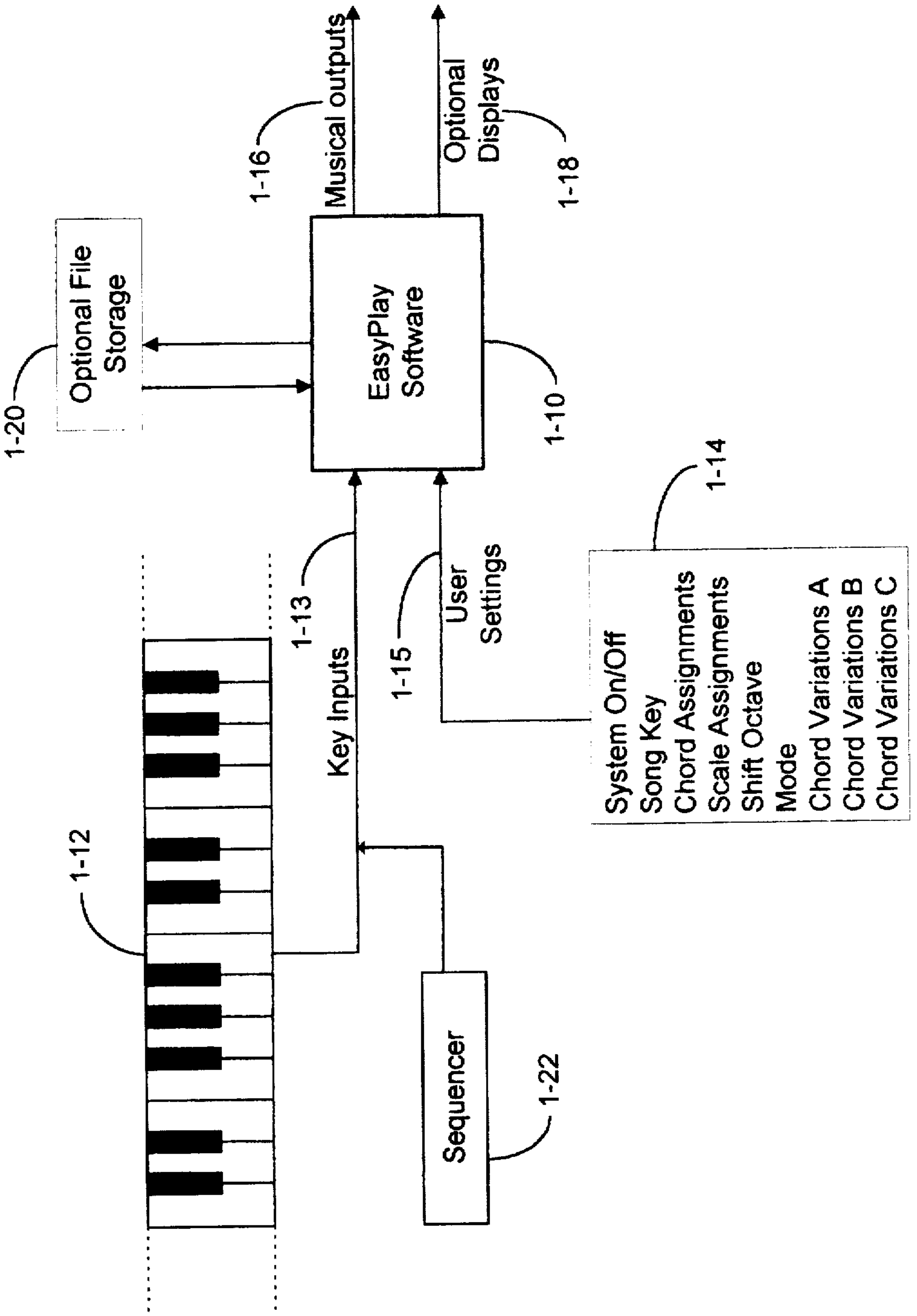
FIG. 1A is a schematic diagram of a composition and performance instrument of the present invention.
Figure 1B:
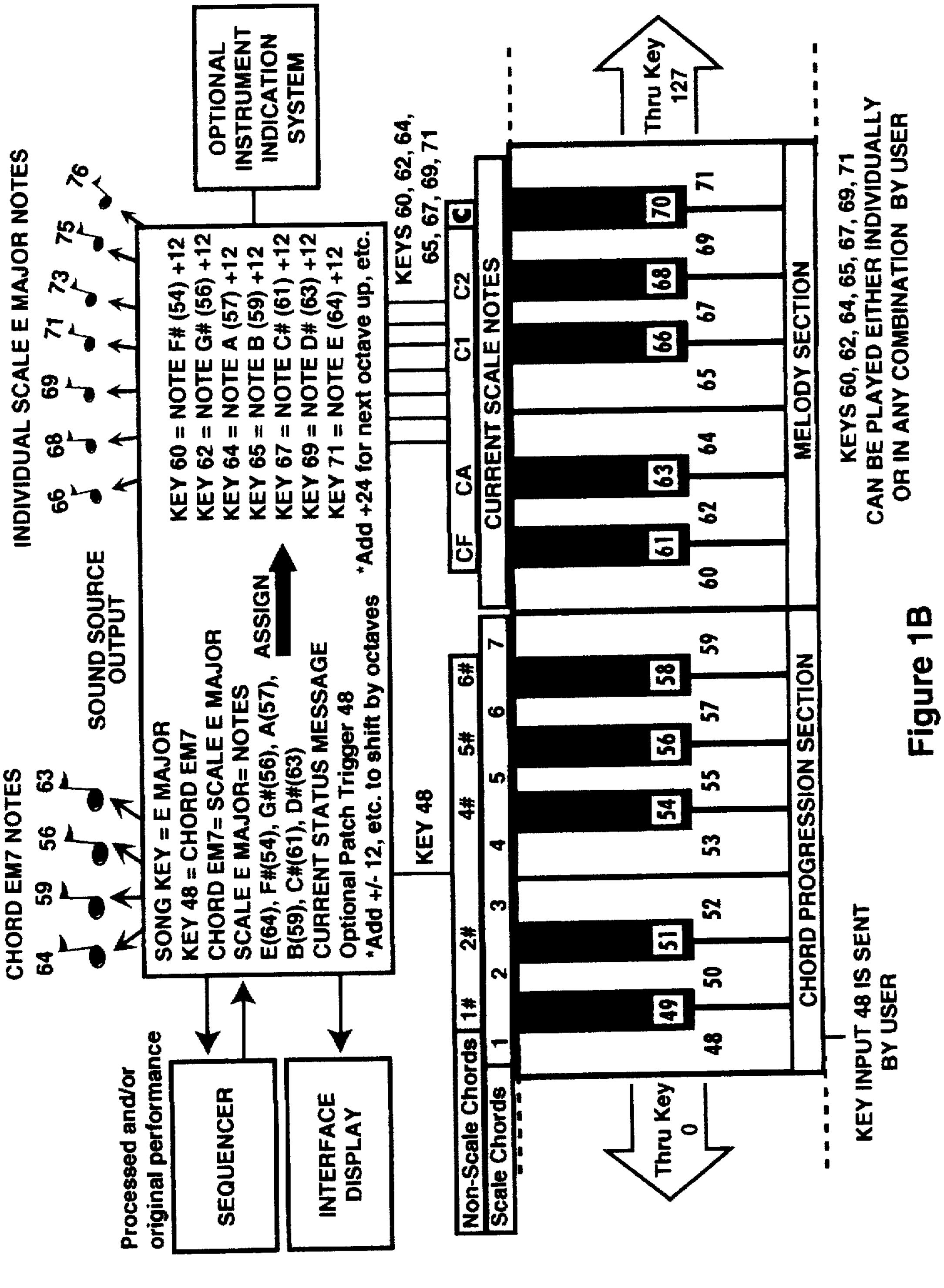
FIG. 1B is a general overview of the chord progression method and the fixed scale location method.
Figure 1C:
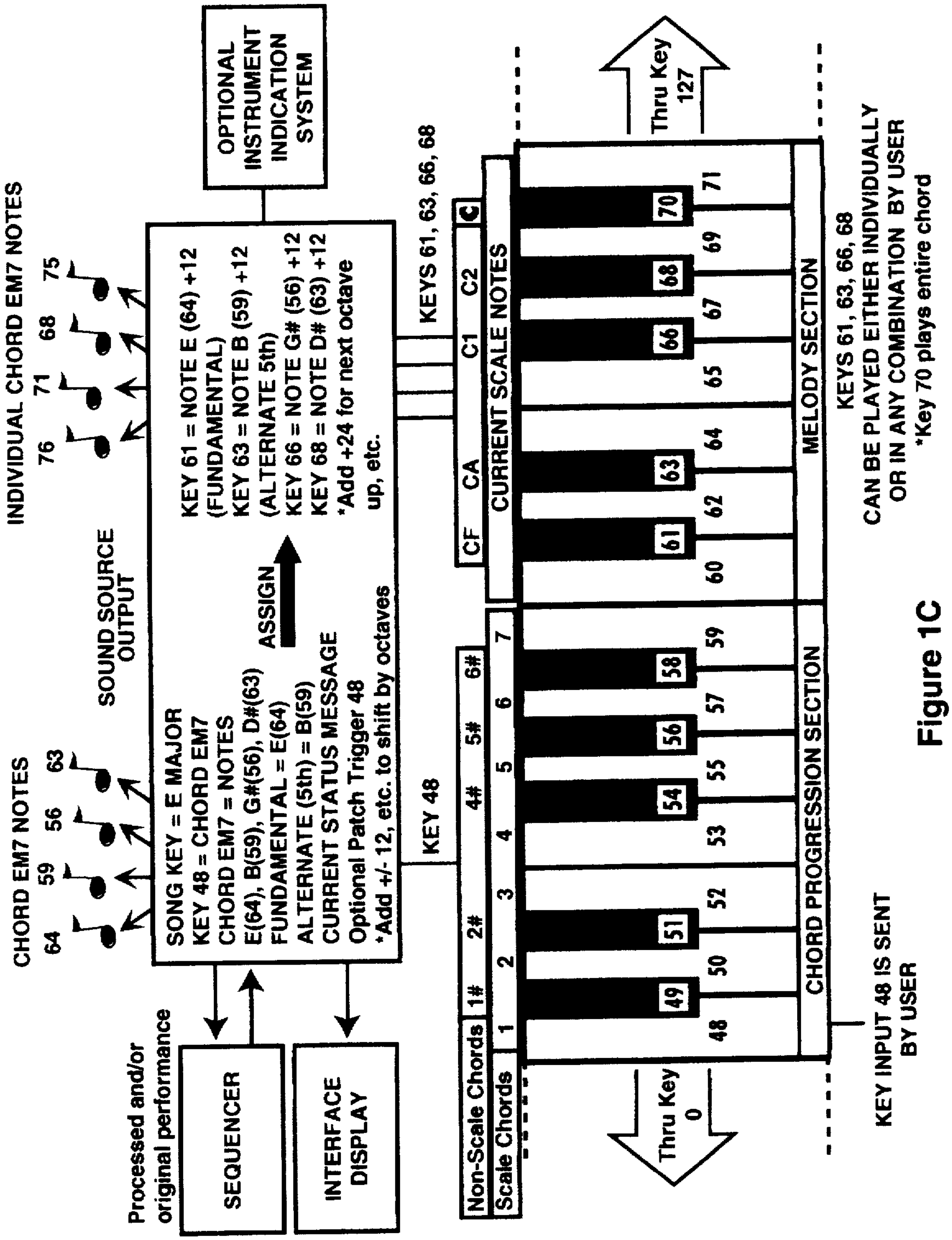
FIG. 1C is a general overview of the chord progression method and the fixed chord location method
Figure 2:
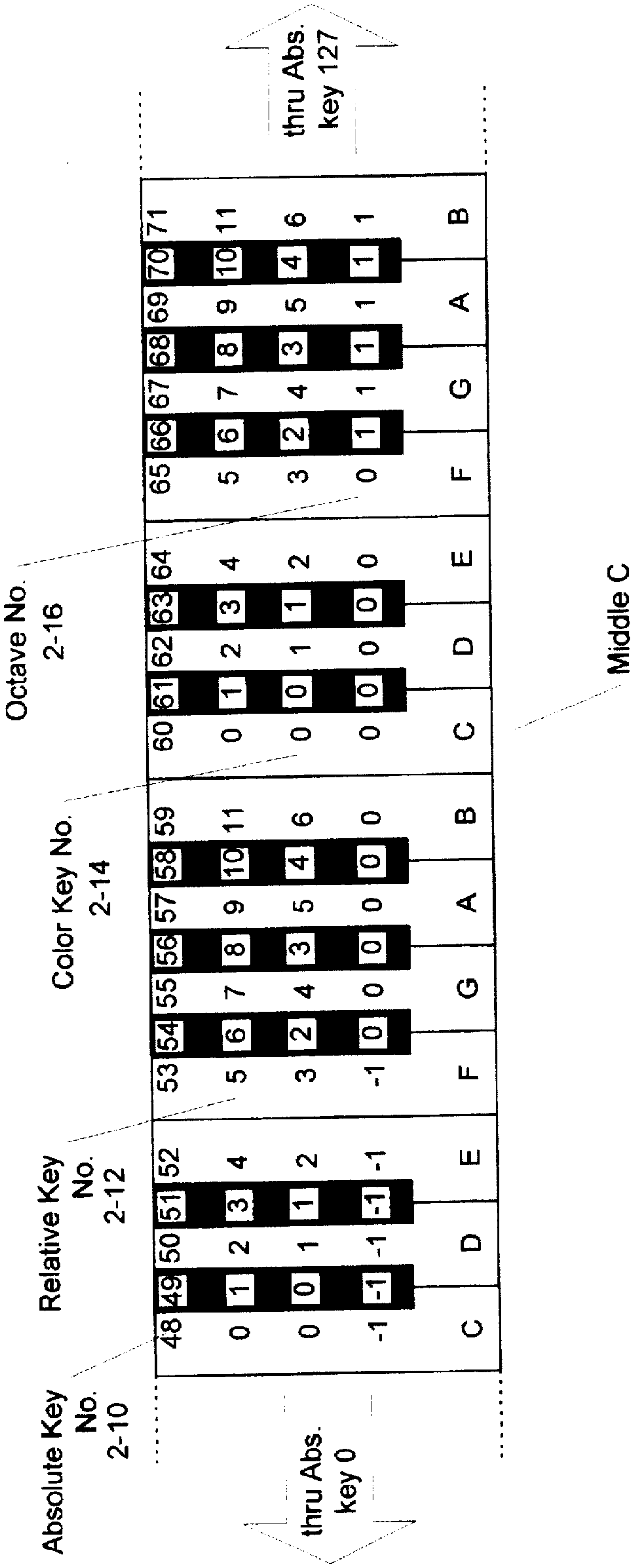
FIG. 2 is a detail drawing of a keyboard of the present invention defining key elements.
Figure 3:
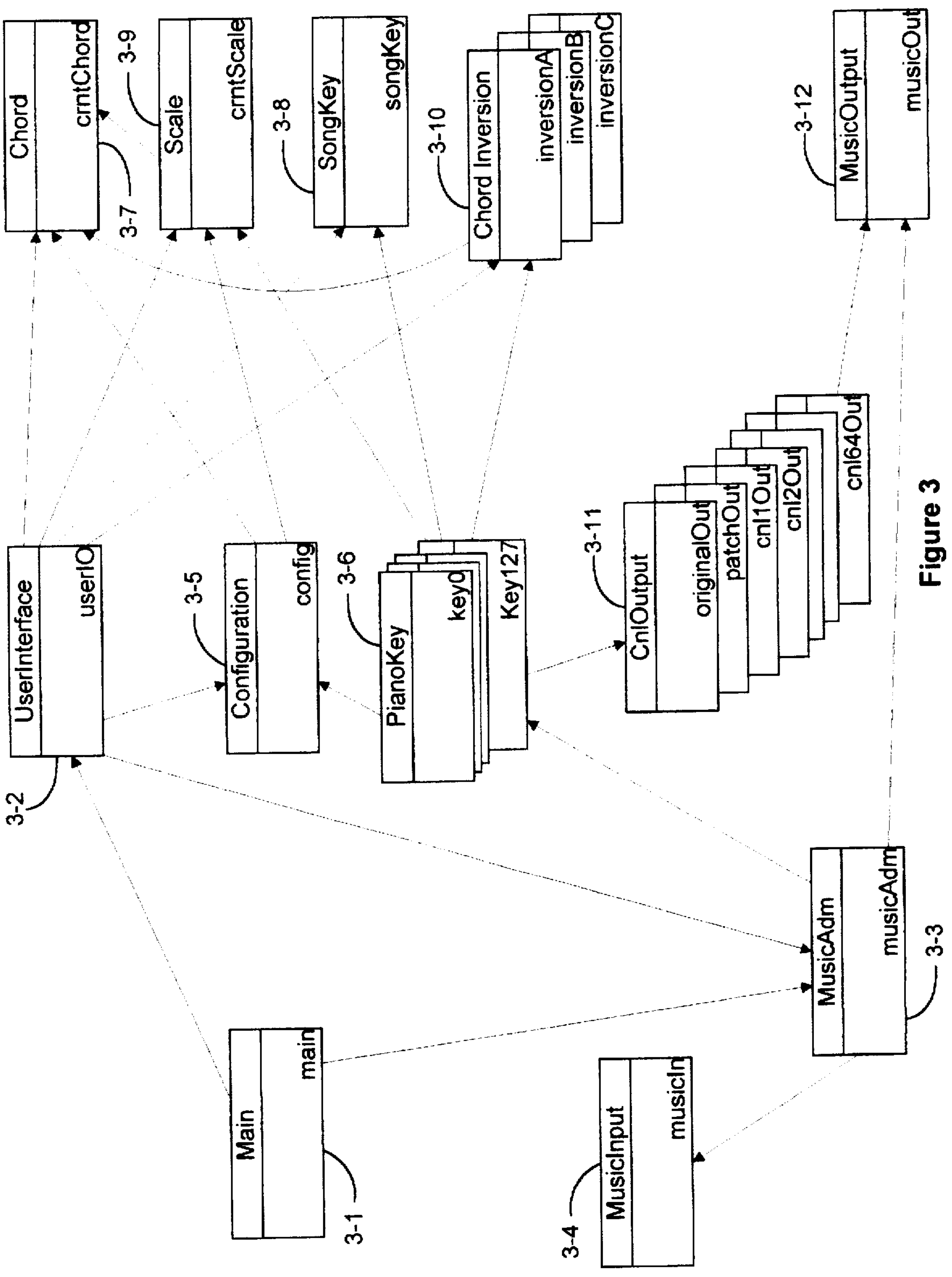
FIG. 3 is an overall logic flow block diagram of the system of the present invention.

For a more complete understanding of a preferred embodiment of the present invention, the following detailed description is divided to (1) show a context diagram of the software domain (FIG. 1); (2) describe the nature of the musical key inputs to the software (FIG. 2); (3) show a diagram of the major objects (FIG. 3); (3) identify the responsibility of each major object; (4) list and describe the attributes of each major object; (5) list and describe the services or methods of each object, including flow diagrams for those methods that are key contributors to the present invention; and (6) describe the collaboration between each of the main objects.

Referring first to FIG. 1, a computer 1-10 memory and processing elements in the usual manner. The computer 1-10 preferably has The EasyPlayEasy Composer program installed thereon. The EasyPlayEasy Composer program comprises an off-the shelf program, and provides computer assisted musical composition software. This program accepts inputs from a keyboard 1-12 or other user interface element and a user-selectable set of settings 1-14. The keyboard 1-12 develops a set of key inputs 1-13 and the settings 1-14 provides the user settings input group 1-15

It should be appreciated that the keyboard may comprise a standard style keyboard, or it may include a computer keyboard or other custom-made input device, as desired. For example, gloves are gaining in popularity as input devices for electronic instruments. The computer 1-10 sends outputs to musical outputs 1-16 for tone generation or other optional displays 1-18. The optional displays 1-18 provide the user with information which includes the present configuration, chords, scales and notes being played (output).

The EasyPlay software in the computer 1-10 takes key inputs and translates them into musical note outputs. This software may exist separately from its inputs and outputs such as in a personal computer and/or other processing device, with the disclosed invention being utilized as a "master input controller" used in conjunction with said computer and/or processing device, or the software may be incorporated along with its inputs and outputs as any one of its inputs or outputs or in combination with any or all of its inputs or outputs. It is also possible to have a combination of these methods. All of these, whether utilized separately or together in any combination could be used to create the "instrument" as described herein. The Easy Composer Software in the computer 1-10 takes key inputs and translates them into musical note outputs. This software may exist separately from its inputs and outputs such as in a personal computer, or it may be incorporated within the same physical instrument as any one of its inputs or outputs or in combination with any or all of its inputs or outputs.

The User settings input group 1-14 contains settings and configurations specified by the user that influence the way the software interprets the Key inputs 1-13 and translates these into musical notes at the musical outputs 1-16. The user settings 1-15 may be input through a computer keyboard, push buttons, hand operated switches, foot operated switches, or any combination of such devices. Some or all of these settings may also be input from the Key inputs 1-13. The user settings 1-15 include a System on/off setting, a song key setting, chord assignments, scale assignments, and various modes of operation.

The key inputs 1-13 are the principle musical inputs to the EasyPlayEasy Composer software. The key inputs 1-13 contain musical chord requests, scale requests, melodic note requests, chord note requests and configuration requests and settings. These inputs are described in more detail in FIG. 2. The preferred source of the key inputs or input controllers is a digital electronic (piano) keyboard that is readily available from numerous vendors. This provides the user with the most familiar and conventional way of inputting musical requests to the software. The EasyPlayEasy Composer software in the computer 1-10, however, may accept inputs 1-13 from other sources such as computer keyboards, or any other input controllers comprising various switching devices, which may or may not be velocity sensitive. A sequencer 1-22 or other device may simultaneously provide prerecorded input to the computer 1-10, allowing the user to add another "voice" to a composition, and for re-performance.

The system may also include an optional non-volatile file storage device 1-20. The storage device 1-20 may be used to store and later retrieve the settings and configurations. This convenience allows the user to quickly and easily configure the system to a variety of different configurations. The storage device 1-20 may comprise a magnetic disk, tape, or other device commonly found on personal computers and other digital electronic devices. These configurations may also be stored in ROM or RAM to provide real-time setups from an input controller, user interface, or external device such as a CD, etc. The system may also include an optional non-volatile file storage device 1-20. The storage device 1-20 may be used to store and later retrieve the settings and configurations. This convenience allows the user to quickly and easily configure the system to a variety of different configurations. The storage device 1-20 may comprise a magnetic disk, tape, or other device commonly found on personal computers and other digital electronic devices.

The musical outputs 1-16 provide the main output of the system. The outputs 1-16 contain the notes, or note identifying information representative of the notes, that the user intends to be sounded (heard) as well as other information, or musical data, relating to how notes are sounded (loudness, etc.). In addition, other data such as configuration and key inputs 1-13 are encoded into the output stream to facilitate iteratively playing back and refining the results. The present invention can be used to generate sounds by coupling intended output with a sound source, such as a computer sound card, external sound source, internal sound source, software-based sound source, etc. which are all known in the art. The sound source described herein may be a single sound source, or multiple sound sources acting as a unit to generate sounds of any or all of the various notes or note groups described herein. An original performance can also be output (unheard) along with the processed performance (heard), and recorded for purposes of re-performance, substitutions, etc. The present invention does not actually generate any sounds, but rather sends notes to an instrument or device (such as a MIDI synthesizer) which generates the sound. MIDI is an acronym that stands for Musical Instrument Digital Interface, an international standard. Even though the preferred embodiment is described using the specifications of MIDI, any adequate protocol could be used to accomplish the same results.

FIG. 2 shows how the system parses key inputs 1-13. Only two octaves are shown in FIG. 2, but the pattern repeats for all other lower and higher octaves. Each key input 1-13 has a unique absolute key number 2-10, shown on the top row of numbers in FIG. 2. The present invention may use a MIDI keyboard and, in such a case, the absolute key numbers are the same as the MIDI note numbers as described in the MIDI specification. The absolute key number 2-10 (or note number), along with velocity, is input to the computer for manipulation by the software. The software assigns other identifying numbers to each key as shown in rows 2 through 4 in FIG. 2. The software assigns to each key a relative key number 2-12 as shown in row 2. This is the key number relative to a C chromatic scale and ranges from 0–11 for the 12 notes of the scale. For example, every 'F' key on the keyboard is identified with relative number 5. Each key is also assigned a color (black or white) key number 2-14. Each white key is numbered 0–6 (7 keys) and each black key is numbered 0–4 (5 keys). For example, every 'F' key is identified as color (white) key number 3 (the 4th white key) and every 'F' as color (black) key number 2 (the 3rd black key). The color key number is also relative to the C scale. The 4th row shown on FIG. 2 is the octave number 2-16. This number identifies which octave on the keyboard a given key is in. The octave number 0 is assigned to absolute key numbers 54 through 65. Lower keys are assigned negative octave numbers and higher keys are assigned positive octave numbers. The logic flow description that follows will refer to all 4 key identifying numbers.

FIG. 3 is a block diagram of the structure of the software showing the major objects. Each object has its own memory for storing its variables or attributes. Each object provides a set of services or methods (subroutines) which are utilized by other objects. A particular service for a given object is invoked by sending a message to that object. This is tantamount to calling a given subroutine within that object. This concept of message sending is described in numerous text books on software engineering and is well known in the art. The lines with arrows in FIG. 3 represent the collaborations between the objects. The lines point from the caller to the receiver.

Each object forms a part of the software; the objects work together to achieve the desired result. Below, each of the objects will be described independent of the other objects. Those services which are key to the present invention will include flow diagrams.

Figure 4:
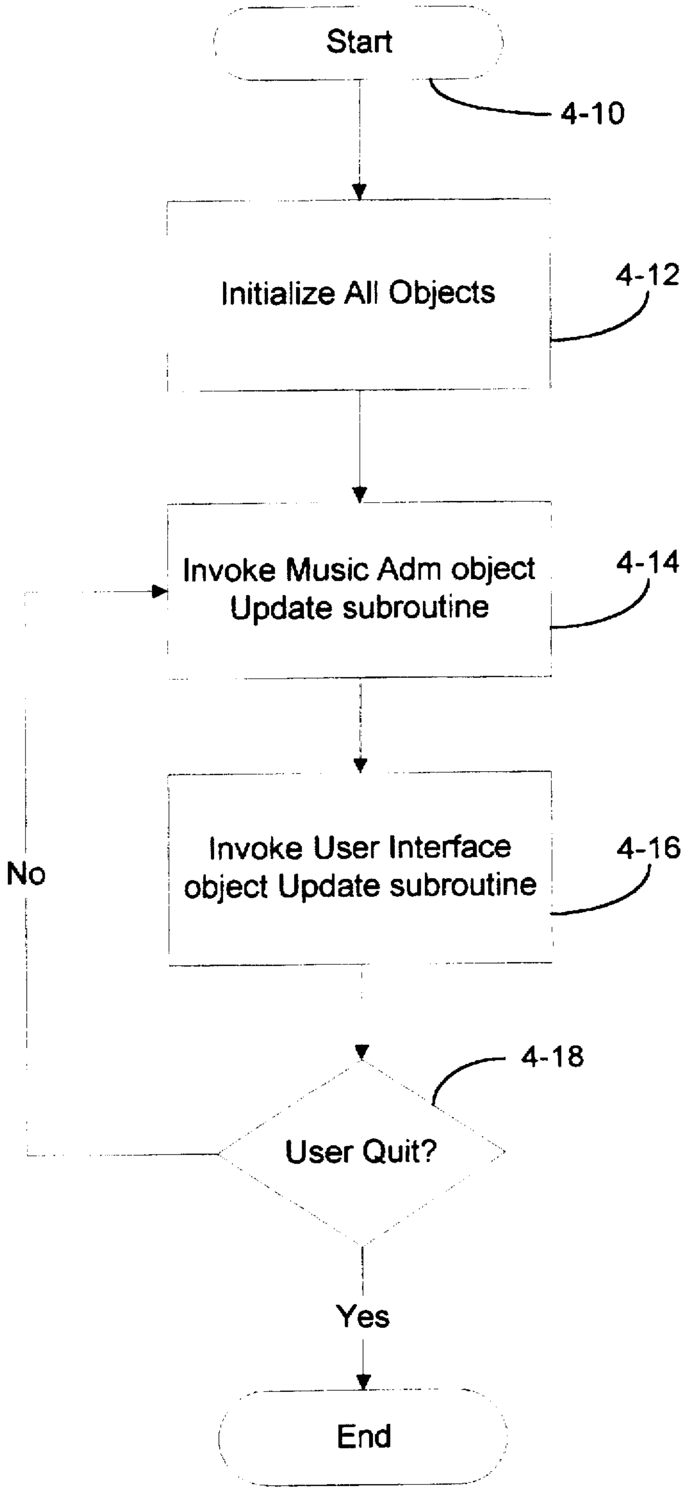
FIG. 4 is a high level logic flow diagram of the system.

The Main block 3-1 is the main or outermost software loop. The Main block 3-1 repeatedly invokes services of other objects. FIG. 4 depicts the logic flow for the Main object 3-1. It starts in step 4-10 and then invokes the initialization service of every object in step 4-12. Steps 4-14 and 4-16 then repeatedly invoke the update services of a Music Administrator object 3-3 and a User Interface object 3-2. The objects 3-3 and 3-2 in turn invoke the services of other objects in response to key (music) inputs 1-13 and user interface inputs. The user interface object 3-2 2 in step 4-18 determines whether or not the user wants to terminate the program.

Thus, the Main Object 3-1 calls the objects 3-3 and 3-2 to direct the overall action of the system and the lower level action of the dependent objects will now be developed.

Tables 1 and 2

Among other duties, the User Interface object 3-2 calls up a song key object 3-8. The object 3-8 contains the one current song key and provides services for determining the chord fundamental for each key in the chord progression section. The song key is stored in the attribute songKey and is initialized to C (See Table 2 for a list of song keys). The attribute circleStart (Table 1) holds the starting point (fundamental for relative key number 0) in the circle of 5ths or 4ths. The Get Key and Set Key services return and set the songKey attribute, respectively. The service 'SetMode()' sets the mode attribute. The service SetCircle Start() sets the circle Start attribute.

When mode=normal, the 'Get-Chord Fundamental for relative key number Y' determines the chord fundamental note from Table 2. The relative key number Y is added to the current song key. If this sum is greater than 11, then 11 is subtracted from the sum. The sum becomes the index into Table 2 where the chord fundamental note is located and returned.

The chord fundamentals are stored in Table 2 in such a way as to put the scale chords on the white keys (index values of 0, 2, 4, 5, 7, 9, and 11) and the non-scale chords on the black keys (index values 1, 3, 6, 8, and 10). This is also the preferred method for storing the fundamental for the minor song keys. Optionally the fundamental for the minor keys can be stored using the offset shown in Table 2's chord indication row, to allow either the major or its respective relative minor scale to be used to result in the same chord assignments. This is because a single given song key actually defines both a customary scale, and a customary scale equivalent, as shown in Table 2. Each major song key defines a "relative" minor scale equivalent, and each "relative"minor song key defines a major scale equivalent. This means that a chord for a given song key can be assigned which can represent a specific relative position in either its customary scale or its customary scale equivalent, when utilizing the offset shown in Table 2's chord indication row. A single song key, as described herein, can be conveyed to the user using the major song key name, relative minor song key name, or both, and a variety of different relative position indicator combinations can be provided. When using both, the song key shall still be considered a single song key, and a chord can be said to represent a specific relative position in the major song key's customary scale or customary scale equivalent. Optionally non-traditional song key names could be substituted for traditional song key names. An example of such non-traditional name substitutes would be song keys 1–12, red song key, green song key, or blue song key, etc. Regardless of any substitute names and/or plurality of additional song key names (traditional or non-traditional) which may be conveyed to the user during song key selection, a selected song key corresponding to any given input controller will still define one customary scale and one customary scale equivalent which matches that defined by its customarily-named song key equivalent, said customarily -named song key equivalent will be readily apparent during performance due to the fact that customary song keys have developed over a period of centuries and are well known.

Regardless of how a chord is assigned to be performed from a fixed physical position as described herein, it can be said to represent a relative position in either the song key's customary scale, or in the song key's customary scale equivalent. Any number of the various indicators shown in Table 2 can be provided to the user, and in any combination and/or combinations. All indications such as relative position, scale or non-scale, song key name, etc. can be provided to the user by displaying them on an interface, such as a computer interface, LED, etc. or by providing them on the input controller itself, such as through printing, etching, molding, color-coding, etc. Said indicators could also be provided to the user which are intended to be attached or placed on the input controller, such as those which may consist of a printed indicator sheet or sheets, decals, LEDs, lighting systems, etc. or may be provided through the use of instructions or examples for the creation of said indicators, such as by description or illustration in a manual or through some other means.

It should be noted that the indicators which are actually provided to the user which are shown in Table 2, can be changed or varied to provide non-customary indicators, although not preferred. These non-customary indicators will identify a chord's non-customary relative position, but will not identify a customary relative position as defined by a song key's customary scale and/or customary scale equivalent. For example, the indicators for the popular chords 1-4-5 may be provided to user as 1-2-3, A-B-C, or color-coded, etc. or represented by certain icons or letters found on input controllers such as computer keyboards, and the like. Said input controllers could be used to sound the specific chords and/or chord notes needed as described herein. Any indicator will do, so long as it conveys to the user a non-customary relative position. As an improvement to the usage of these non-customary indicators, a description or explanation could be provided, such as in a manual or through some other means, describing which customary indicator equivalent each non-customary indicator represents, such as red, green, blue is equal to 1-4-5 chords, respectively. Any indicators provided to the user which will allow the user to consistently identify a chord's relative position during a performance will work, although the preferred method is to provide customary indicators which will allow the user to actually identify a chord's customary relative position as defined by a song key's customary scale and/or customary scale equivalent as described herein for purposes of learning, dramatic confusion reduction, and for communication with other musicians.

The methods of the present invention could also be used for other forms of music such as those using other customary scales, such as Indian scales, Chinese scales, etc., by carrying out all processing described herein relative to those other customary scales.

Sending the message 'Get chord fundamental for relative key number Y' to the song key object calls a function or subroutine within the song key object that takes the relative key number as a parameter and returns the chord fundamental. When mode=circle5 or circle4, the relative key number Y is added to circleStart and the fundamental is found in Table 2 in circle of 5th and circle of 4th rows respectively. The service 'GetSongKeyLable()' returns the key label for use by the user interface.

The service 'GetIndicationForKey(relativeKeyNumber)' is provided as an added feature to the preferred 'fixed location' method which assigns the first chord of the song key to the first key, the 2nd chord of the song key to the 2nd key etc. As an added feature, instead of reassigning the keys, the chords may be indicated on a computer monitor or above the appropriate keys using an alphanumeric display or other indication system. This indicates to the user where the first chord of the song key is, where the 2nd chord is etc. The service 'GetIndicationForKey(relativeKeyNumber)' returns the alpha-numeric indication that would be displayed. The indicators are in Table 2 in the row labeled 'Chord Indications'. The song key object locates the correct indicator by subtracting the song key from the relative key number. If the difference is less than 0, then 12 is added. This number becomes the table index where the chord indication is found. For example, if the song key is E MAJOR, the service GetIndicationForKey(4) returns indication '1' since 4 (relative key)−4 (song key)=0 (table index). GetIndicationForKey(11) returns '5' since 11 (relative key) −4 (song Key)=7 (table index) and GetIndicationForKey(3) returns '7' since 3(relative key)−4(song key)+12=11 (table index). If the indication system is used, then the user interface object requests the chord indications for each of the 11 keys each time the song key changed. The chord indication and the key labels can be used together to indicate the chord name as well (D, F#, etc.)

TABLE 1

| SongKey Object Attributes and Services |
|---|
| attributes: |
| 1. songKey |
| 2. mode |
| 3. circleStart |
| Services: |
| 1. SetSongKey(newSongKey); |
| 2. GetSongKey( ); songKey |
| 3. GetChordFundamental(relativeKeyNumber): fundamental |
| 4. GetSongKeyLabel( ); textLabel |
| 5. GetIndicationForKey(relativeKeyNumber); indication |
| 6. SetMode(newMode); |
| 7. setCircleStart(newStart) |

TABLE 2

| Song key and Chord Fundamental | | | | | | | | | | | | |
|---|---|---|---|---|---|---|---|---|---|---|---|---|
| Table Index | 0 | 1 | 2 | 3 | 4 | 5 | 6 | 7 | 8 | 9 | 10 | 11 |
| Song Key | C | C# | D | D# | E | F | F# | G | G# | A | A# | B |
| Song Key attribute | 0 | 1 | 2 | 3 | 4 | 5 | 6 | 7 | 8 | 9 | 10 | 11 |
| Chord Fundamental | 60 | 61 | 62 | 63 | 64 | 65 | 54 | 55 | 56 | 57 | 58 | 59 |
| Circle of 5ths | C | G | D | A | E | B | F# | C# | G# | D# | A# | F |
| | (60) | (55) | (62) | (57) | (64) | (59) | (54) | (61) | (56) | (63) | (58) | (65) |
| Circle of 4ths | C | F | Bb | Eb | Ab | Db | Gb | B | E | A | D | G |
| | (60) | (65) | (58) | (63) | (56) | (61) | (54) | (59) | (64) | (57) | (62) | (55) |
| Key Label | C | C# | D | D# | E | F | F# | G | G# | A | A# | B |
| Chord indication | '1' | '1#' | '2' | '2#' | '3' | '4' | '4#' | '5' | '5#' | '6' | '6# | '7' |
| Relative minor | '3' | '3# | '4' | '4#' | '5' | '6' | '6#' | '7' | '7#' | '1' | '1#' | '2' |

For example, if the current song key is D Major, then the current song key value is 2. If a message is received requesting the chord fundamental note for relative key number 5, then the song key object returns 55, which is the chord fundamental note for the 7th (2+5) entry in Table 2. This means that in the song key of D, an F piano key should play a G chord, but how the returned chord fundamental is used is entirely up to the object receiving the information. The song key object (3-8) does its part by providing the services shown.

Figure 5:
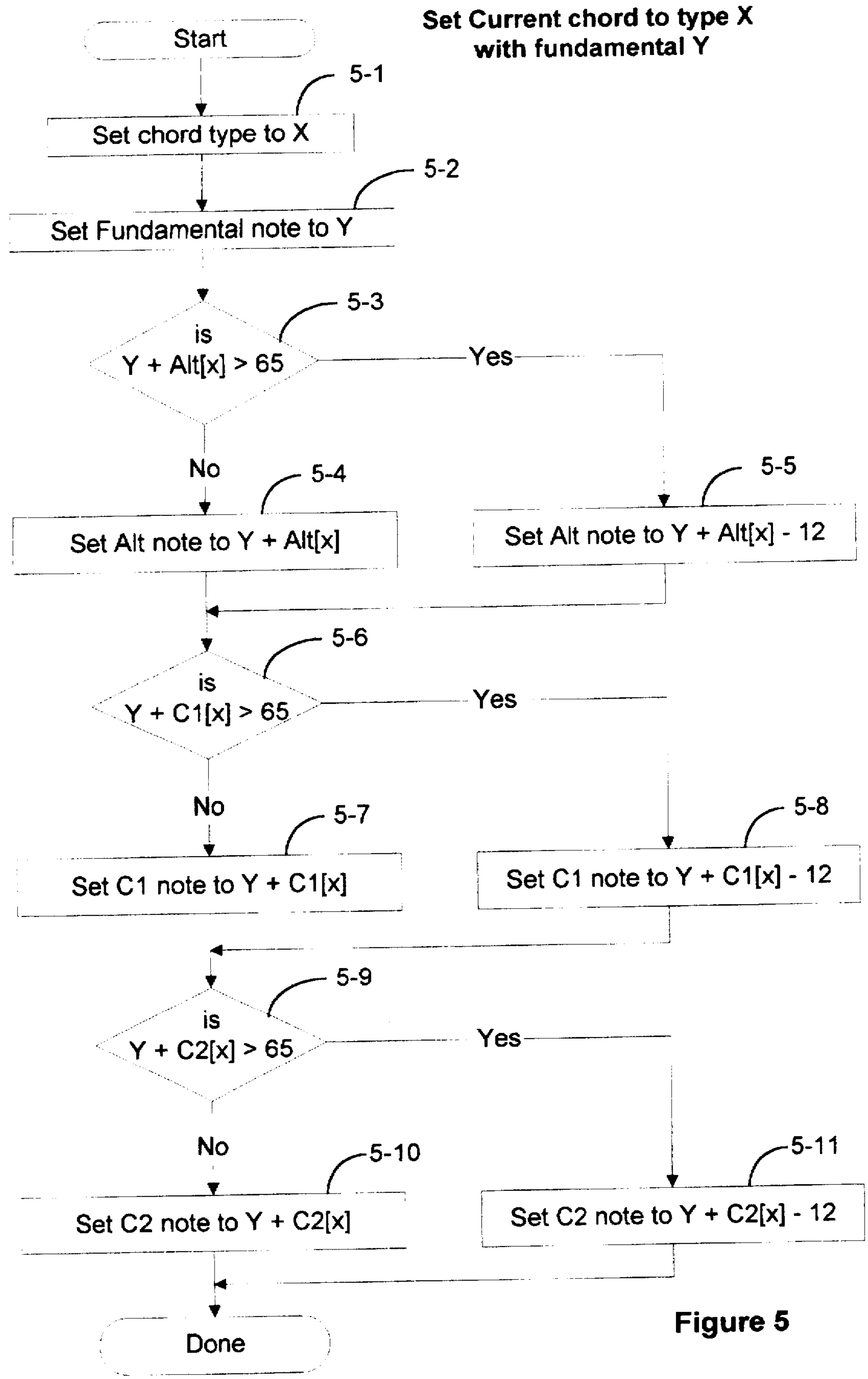
FIG. 5 is a logic flow diagram of chord objects 'Set Chord' service.

FIG. 5 and Tables 3 and 4

There is one current chord object 3-7. Table 3 shows the attributes and services of the chord object which include the current chord type and the four notes of the current chord. The current chord object provides nine services.

The 'GetChord()' service returns the current chord type (major, minor, etc.) and chord fundamental note. The 'CopyNotes()' service copies the notes of the chord to a destination specified by the caller. Table 4 shows the possible chord types and the chord formulae used in generating chords. The current chord type is represented by the index in Table 4. For example, if the current chord type is =6, then the current chord type is a suspended 2nd chord.

FIG. 5 shows a flow diagram for the service that generates and sets the current chord. Referring to FIG. 5, this service first sets the chord type to the requested type X in step 5-1. The fundamental note Y is then stored in step 5-2. Generally, all the notes of the current chord will be contained in octave number 0 which includes absolute note numbers 54 through 65 (FIG. 2). Y will always be in this range. The remaining three notes, the Alt note, C1 note, and C2 note of the chord are then generated by adding an offset to the fundamental note. The offset for each of these note is found in Table 4 under the columns labeled Alt, C1 and C2. Four notes are always generated. In the case where a chord has only three notes, the C2 note will be a duplicate of the C1 note.

Referring back to FIG. 5, step 5-3 determines if the sum of the fundamental note and the offset for the Alt note (designated Alt[x]) is less than or equal to 65 (5-3). If so, then the Alt note is set to the sum of the fundamental note plus the offset for the Alt note in step 5-4. If the sum of the fundamental note and the offset for the Alt note is greater than 65, then the Alt note is set to the sum of the fundamental note plus the offset of the Alt note minus 12 in step 5-5. Subtracting 12 yields the same note one octave lower.

Similarly, the C1 and C2 notes are generated in steps 5-6 through 5-11. For example, if this service is called requesting to set the current chord to type D Major (X=0, Y=62), then the current chord type will be equal to 0, the fundamental note will be 62 (D), the Alt note will be 57 (A, 62+7−12), the C1 note will be 54 (F#, 62+4−12) and the C2 note also be 54 (F#, 62+4−12). New chords may also be added simply by extending Table 4, including chords with more than 4 notes. Also, the current chord object can be configured so that the C1 note is always the 3rd note of the chord. A mode may be included where the 5th(ALT) is omitted from any chord simply by adding an attribute such as 'drop5th' and adding a service for setting 'drop5th' to be true or false and modifying the SetChordTo() service to ignore the ALT in Table 4 when 'drop5th' is true.

The service 'isNoteInChord(noteNumber)' will scan chordNote[] for noteNumber. If noteNumber is found it will return True (1). If it is not found, it will return False (0).

The remaining services return a specific chord note (fundamental, alternate, etc.) or the chord label.

TABLE 3

Chord Object Attributes and Services

Attributes:

1. chordType
2. chordNote [4]

Services:

1. SetChordTo(ChordType; Fundamental);
2. GetChordType( ); chordType
3. CopyChordNotes(destination);
4. GetFundamental( ); chordNote[0]
5. GetAlt( ); chordNote[1]
6. GetC1( ); chordNote[2]
7. GetC2( ); chordNote[3]
8. GetChordLabel( ); textLabel
9. isNoteInChord(noteNumber); True/False

TABLE 4

Chord Note Generation

| Index | Type | Fund | Alt | C1 | C2 | Label |
|---|---|---|---|---|---|---|
| 0 | Major | 0 | 7 | 4 | 4 | "" |
| 1 | Major seven | 0 | 7 | 4 | 11 | "M7" |
| 2 | minor | 0 | 7 | 3 | 3 | "m" |
| 3 | minor seven | 0 | 7 | 3 | 10 | "m7" |
| 4 | seven | 0 | 7 | 4 | 10 | "7" |
| 5 | six | 0 | 7 | 4 | 9 | "6" |
| 6 | suspended 2nd | 0 | 7 | 2 | 2 | "sus2" |
| 7 | suspended 4th | 0 | 7 | 5 | 5 | "sus4" |
| 8 | Major 7 diminished 5th | 0 | 6 | 4 | 11 | "M7(−5)" |
| 9 | minor six | 0 | 7 | 3 | 9 | "m6" |
| 10 | minor 7 diminished 5th | 0 | 6 | 3 | 10 | "m7(−5)" |
| 11 | minor Major 7 | 0 | 7 | 3 | 11 | "m(M7)" |
| 12 | seven diminished 5 | 0 | 6 | 4 | 10 | "7(−5)" |
| 13 | seven augmented 5 | 0 | 8 | 4 | 10 | "7(+5)" |
| 14 | augmented | 0 | 8 | 4 | 4 | "aug" |
| 15 | diminished | 0 | 6 | 3 | 3 | "dim" |
| 16 | diminished 7 | 0 | 6 | 3 | 9 | "dim7" |

FIGS. *6a* and *6b* and Tables 5, 6a, 6b, and 7

As shown in FIG. 3, there is one Current Scale object 3-9. This object is responsible for generating the notes of the current scale. It also generates the notes of the current scale with the notes common to the current chord removed. It also provides the remaining notes that are not contained in the current scale or the current chord.

Referring to Table 5, the attributes of the current scale include the scale type (Major, pentatonic, etc.), the root note and all other notes in three scales. The scaleNote[7] attribute contains the normal notes of the current scale. The remainScaleNote[7] attributes contains the normal notes the current scale less the notes contained in the current chord. The remainNonScaleNote[7] attribute contains all remaining notes (of the 12 note chromatic scale) that are not in the current scale or the current chord. The combinedScaleNote [11] attribute combines the normal notes of the current scale (scaleNote[]) with all notes of the current chord that are not in the current scale (if any).

Each note attribute (. . . Note[]) contains two fields, a note number and a note indication (text label). The note number field is simply the value (MIDI note number) of the note to be sounded. The note indication field is provided in the event that an alpha numeric, LED (light emitting diode) or other indication system is available. It may provide a useful indication on a computer monitor as well. This 'indication' system indicates to the user where certain notes of the scale appear on the keyboard. The indications provided for each note include the note name, (A, B, C#, etc.), and note position in the scale (indicated by the numbers 1 through 7). Also, certain notes have additional indications. The root note is indicated with the letter 'R', the fundamental of the current chord is indicated by the letter 'F', the alternate of the current chord is indicated by the letter 'A', and the C1 and C2 notes of the current chord by the letters 'C1' and 'C2', respectively. All non-scale notes (notes not contained in scaleNote[]) have a blank ('') scale position indication. Unless otherwise stated, references to the note attributes refer to the note number field.

The object provides twelve main services. FIGS. *6a* and *6b* show a flow diagram for the service that sets the scale type. This service is invoked by sending the message 'Set scale type to Y with root note N' to the scale object. First, the scale type is saved in step 6-1. Next, the root or first note of the scale, designated note[0], is set to N in step 6-2. The remaining notes of the scale are generated in step 6-3 by adding an offset for each note to the root note. The offsets are shown for each scale type in Table 6a. As with the current chord object, all the scale notes will be in octave 0 (FIG. 2). As each note is generated in step 6-3, if the sum of the root note and the offset is greater than 65, then 12, or one octave, is subtracted, forcing the note to be between 54 and 65. As shown in Table 6a, some scales have duplicate offsets. This is because not all scales have 7 different notes. By subtracting 12 from some notes to keep them in octave 0, it is possible that the duplicated notes will not be the highest note of the resulting scale. Note that the value of 'Z' (step 6-3) becomes the position (in the scale) indication for each note, except that duplicate notes will have duplicate position indications.

Step 6-4 then forces the duplicate notes (if any) to be the highest resulting note of the current scale. It is also possible that the generated notes may not be in order from lowest to highest.

Figure 6A:
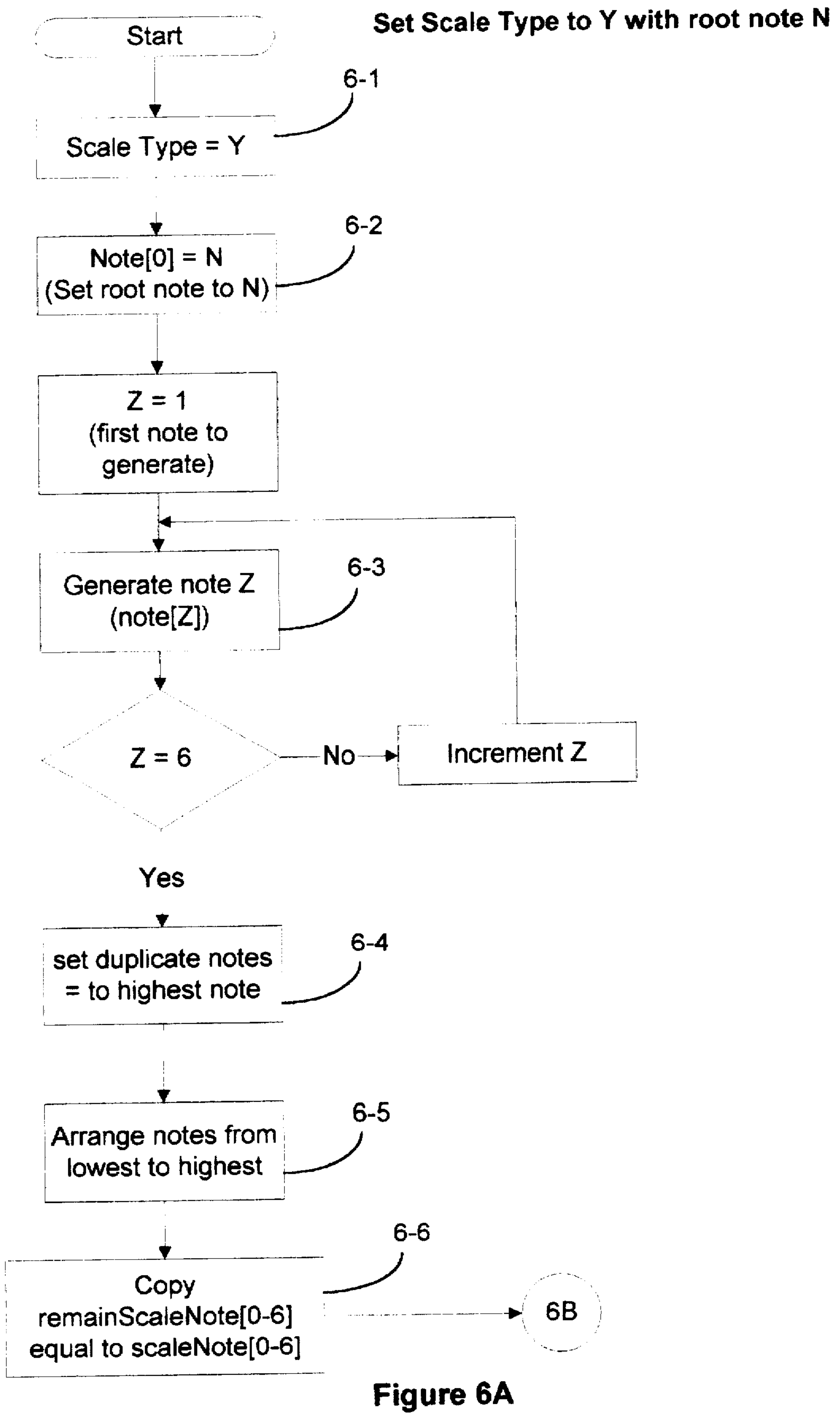
FIGS. 6*a* and 6*b* together are a logic flow diagram of scale objects 'Set scale' service.
Figure 6B:
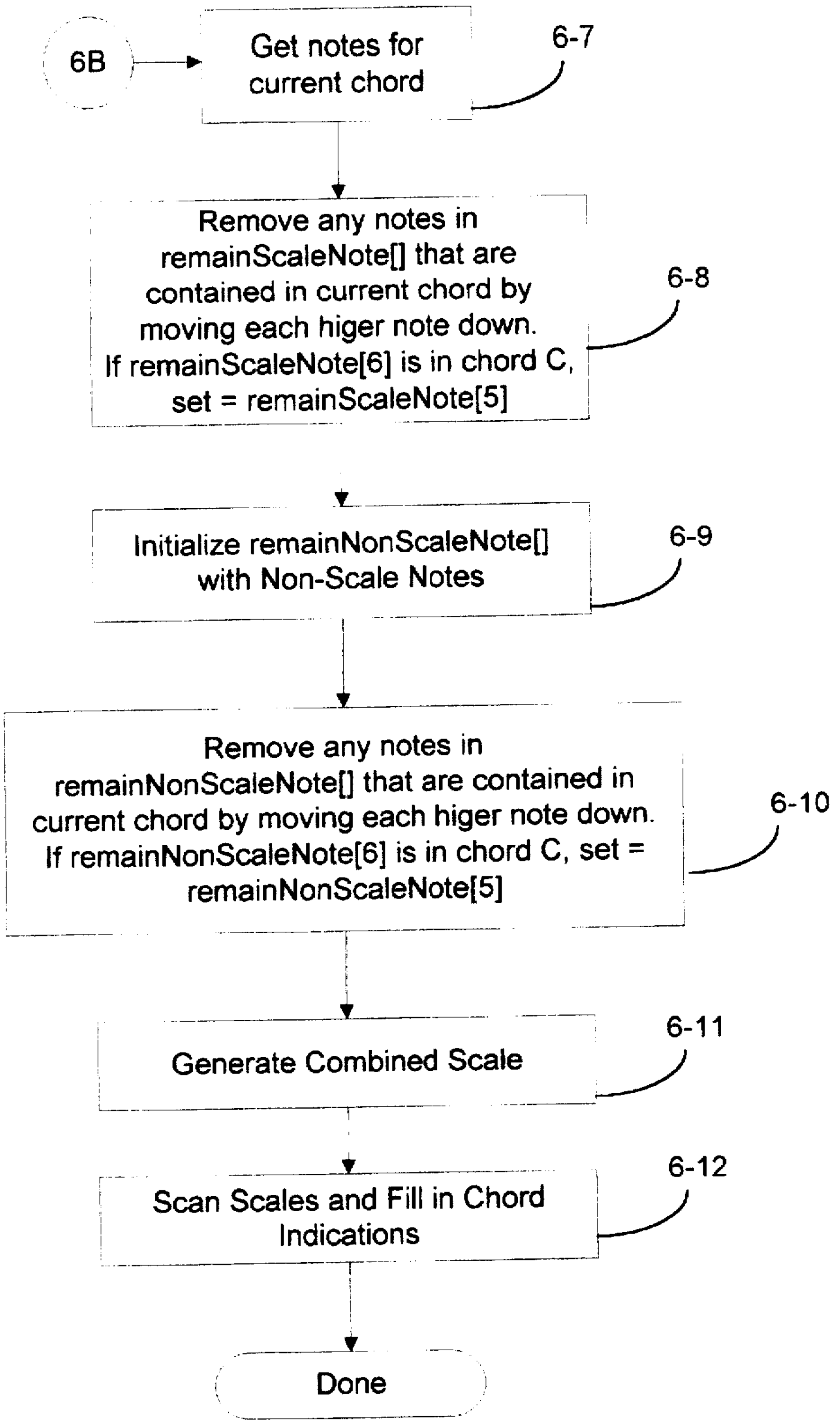

Step 6-5, in generating the current scale, rearranges the notes from lowest to highest. As an example, Table 7 shows the values of each attribute of the current scale after each step 6-1 through 6-5 shown in FIG. 6 when the scale is set to C Major Pentatonic. Next, the remaining scales notes are generated in step 6-6. This is done by first copying the normal scale notes to remainScaleNote[] array. Next, the notes of the current chord are fetched from the current chord object in step 6-7.

Then, step 6-8 removes those notes in the scale that are duplicated in the chord. This is done by shifting the scale notes down, replacing the chord note. For example, if remainScaleNote[2] is found in the current chord, then remainScaleNote[2] is set to remainScaleNote[3], remainScaleNote[3] is set to remainScaleNote[4], etc. (remainScaleNote[6] is unchanged). This process is repeated for each note in remainScaleNote[] until all the chord notes have been removed. If remainScaleNote[6] is in the current chord, it will be set equal to remainScaleNote[5]. Thus, the remainScaleNote[] array contains the notes of the scale less the notes of the current chord, arranged from highest to lowest (with possible duplicate notes as the higher notes).

Finally, the remaining non-scale notes (remainNonScaleNote[]) are generated. This is done in a manner similar to the remaining scale notes. First, remainNonScaleNote[] array is filled with all the non-scale notes as determined in step 6-9 from Table 6b in the same manner as the scale notes were determined from Table 6a. The chord notes (if any) are then removed in step 6-10 in the same manner as for remainScaleNotes[]. The combineScaleNote[] attribute is generated in step 6-11. This is done by taking the scaleNote[] attribute and adding any note in the current chord (fundamental, alternate, C1, or C2) that is not already in scaleNote[] (if any). The added notes are inserted in a manner that preserves scale order (lowest to highest).

The additional indications (Fundamental, Alternate, C1 and C2) are then filled in step 6-12. The GetScaleType() service returns the scale type. The service GetScaleNote(n) returns the nth note of the normal scale. Similarly, services GetRemainScaleNote(n) and GetRemainNonScaleNote(n) return the nth note of the remaining scale notes and the remaining non-scale notes respectively. The services, 'GetScaleNoteIndication' and 'GetCombinedNoteIndication', return the indication field of the scaleNote[] and combinedScaleNote[] attribute respectively. The service 'GetScaleLabel()' returns the scale label (such as 'C MAJOR' or 'f minor').

The service 'GetScaleThirdBelow(noteNumber)' returns the scale note that is the third scale note below noteNumber. The scale is scanned from scaleNote[0] through scaleNote [6] until noteNumber is found. If it is not found, then combinedScaleNote[] is scanned. If it is still not found, the original note Number is returned (it should always be found as all notes of interest will be either a scale note or a chord note). When found, the note two positions before (where noteNumber was found) is returned as scaleThird. The 2nd position before a given position is determined in a circular fashion, i.e., the position before the first position (scaleNote [0] or combinedScaleNote[0] is the last position (scaleNote [6] or combinedScaleNote[10]. Also, positions with a duplicate of the next lower position are not counted. I.e., if scaleNote[6] is a duplicate of scaleNote[5] and scaleNote[5] is not a duplicate of scaleNote[4], then the position before scaleNote[0] is scaleNote[5]. If scaleThird is higher than noteNumber, it is lowered by one octave (=scaleThird−12) before it is returned. The service 'GetBlockNote(nthNote, noteNumber)' returns the nthNote chord note in the combined scale that is less (lower) than noteNumber. If there is no chord note less than noteNumber, 0 is returned.

The services 'isNoteInScale(noteNumber)' and 'isNoteInCombinedScale(noteNumber)' will scan the scale Note[] and combinedScaleNote[] arrays respectively for noteNumber. If noteNumber is found it will return True (1). If it is not found, it will return False (0).

A configuration object 3-5 collaborates with the scale object 3-9 by calling the SetScaleTo service each time a new chord/scale is required. This object 3-9 collaborates with a current chord object 3-7 to determine the notes in the current chord (CopyNotes service). The PianoKey objects 3-6 collaborate with this object by calling the appropriate GetNote service (normal, remaining scale, or remaining non-scale) to get the note(s) to be sounded. If an indication system is used, the user interface object 3-2 calls the appropriate indication service ('Get . . . NoteIndication()') and outputs the results to the alphanumeric display, LED display, or computer monitor.

The present invention has eighteen different scale types (index 0–17), as shown in Table 6a. Additional scale types can be added simply by extending Tables 6a and 6b.

The present invention may also derive one or a combination of 2nds, 4ths, 5ths, 6ths, etc. and raise or lower these derived notes by one or more octaves to produce scalic harmonies.

TABLE 5

Scale Object Attributes and Services

Attributes:

1. scaleType
2. rootNote
3. scaleNote[7]
4. remainScaleNote[7]
5. remainNonScaleNote[7]
6. combinedScaleNote[11]

Services:

1. SetScaleTo(scaleType, rootNote);
2. GetScaleType( ); scaleType
3. GetScaleNote(noteNumber); scaleNote[noteNumber]
4. GetRemainScaleNote(noteNumber); remainScaleNote[noteNumber]
5. GetRemainNonScaleNote(noteNumber); remainNonScaleNote[noteNumber]
6. GetScaleThirdBelow(noteNumber); scaleThird
7. GetBlockNote(nthNote, noteNumber); combinedScaleNote[derivedValue]
8. GetScaleLabel( ); textLabel
9. GetScaleNoteIndication(noteNumber); indication
10. GetCombinedScaleNoteIndication(noteNumber); indication
11. isNoteInScale(noteNumber); True/False
12. isNoteInCombinedScale(noteNumber); True/False TABLE 6a Normal Scale Note Generation

| Index | Scale type and label | 2nd note offset | 3rd note offset | 4th note offset | 5th note offset | 6th note offset | 7th note offset |
|---|---|---|---|---|---|---|---|
| 0 | minor | 2 | 3 | 5 | 7 | 8 | 10 |
| 1 | MAJOR | 2 | 4 | 5 | 7 | 9 | 11 |
| 2 | MAJ. PENT. | 2 | 4 | 7 | 9 | 9 | 9 |
| 3 | min. pent. | 3 | 5 | 7 | 10 | 10 | 10 |
| 4 | LYDIAN | 2 | 4 | 6 | 7 | 9 | 11 |
| 5 | DORIAN | 2 | 3 | 5 | 7 | 9 | 10 |
| 6 | AEOLIAN | 2 | 3 | 5 | 7 | 8 | 10 |
| 7 | MIXOLYDIAN | 2 | 4 | 5 | 7 | 9 | 10 |
| 8 | MAJ. PENT + 4 | 2 | 4 | 5 | 7 | 9 | 9 |
| 9 | LOCRIAN | 1 | 3 | 5 | 6 | 8 | 10 |
| 10 | mel. minor | 2 | 3 | 5 | 7 | 9 | 11 |
| 11 | WHOLE TONE | 2 | 4 | 6 | 8 | 10 | 10 |
| 12 | DIM. WHOLE | 1 | 3 | 4 | 6 | 8 | 10 |
| 13 | HALF/WHOLE | 1 | 3 | 4 | 7 | 9 | 10 |
| 14 | WHOLE/HALF | 2 | 3 | 5 | 8 | 9 | 11 |
| 15 | BLUES | 3 | 5 | 6 | 7 | 10 | 10 |
| 16 | harm. minor | 2 | 3 | 5 | 7 | 8 | 11 |
| 17 | PHRYGIAN | 1 | 3 | 5 | 7 | 8 | 10 |

TABLE 6b

Non-Scale Note Generation

| Index | Scale type and label | 1st note offset | 2nd note offset | 3rd note offset | 4th note offset | 5th note offset | 6th note offset | 7th note offset |
|---|---|---|---|---|---|---|---|---|
| 0 | minor | 1 | 4 | 6 | 9 | 11 | 11 | 11 |
| 1 | MAJOR | 1 | 3 | 6 | 8 | 10 | 10 | 10 |
| 2 | MAJ. PENT. | 1 | 3 | 5 | 6 | 8 | 10 | 11 |
| 3 | min. pent. | 1 | 2 | 4 | 6 | 8 | 9 | 11 |
| 4 | LYDIAN | 1 | 3 | 5 | 8 | 10 | 10 | 10 |
| 5 | DORIAN | 1 | 4 | 6 | 8 | 11 | 11 | 11 |
| 6 | AEOLIAN | 1 | 4 | 6 | 9 | 11 | 11 | 11 |
| 7 | MIXOLYDIAN | 1 | 3 | 6 | 8 | 11 | 11 | 11 |
| 8 | MAJ. PENT + 4 | 1 | 3 | 6 | 8 | 10 | 11 | 11 |
| 9 | LOCRIAN | 2 | 4 | 7 | 9 | 11 | 11 | 11 |
| 10 | mel. minor | 1 | 4 | 6 | 8 | 10 | 10 | 10 |
| 11 | WHOLE TONE | 1 | 3 | 5 | 7 | 9 | 11 | 11 |
| 12 | DIM. WHOLE | 2 | 5 | 7 | 9 | 11 | 11 | 11 |
| 13 | HALF/WHOLE | 2 | 5 | 6 | 8 | 11 | 11 | 11 |
| 14 | WHOLE/HALF | 1 | 4 | 6 | 7 | 10 | 10 | 10 |
| 15 | BLUES | 1 | 2 | 4 | 8 | 9 | 11 | 11 |
| 16 | harm. minor | 1 | 4 | 6 | 9 | 10 | 10 | 10 |
| 17 | PHRYGIAN | 2 | 4 | 6 | 9 | 11 | 11 | 11 |

TABLE 7

Example Scale Note Generation
Example: Set current scale to type 2
(Major Pentatonic) with root note 60 (C)

| After (see FIG. 6) | Scale Type | note[0] (root) | note [1] | note [2] | note [3] | note [4] | note [5] | note [6] |
|---|---|---|---|---|---|---|---|---|
| 6-1 | 2 | — | — | — | — | — | — | — |
| 6-2 | 2 | 60(C) | — | — | — | — | — | — |
| 6-3 (Z = 1) | 2 | 60(C) | 62(D) | — | — | — | — | — |
| 6-3 (Z = 2) | 2 | 60(C) | 62(D) | 64(E) | — | — | — | — |
| 6-3 (Z = 3) | 2 | 60(C) | 62(D) | 64(E) | 55(G) | — | — | — |
| 6-3 (Z = 4) | 2 | 60(C) | 62(D) | 64(E) | 55(G) | 57(A) | — | — |
| 6-3 (Z = 5) | 2 | 60(C) | 62(D) | 64(E) | 55(G) | 57(A) | 57(A) | — |
| 6-3 (Z = 6) | 2 | 60(C) | 62(D) | 64(E) | 55(G) | 57(A) | 57(A) | 57(A) |
| 6-4 | 2 | 60(C) | 62(D) | 64(E) | 55(G) | 57(A) | 64(E) | 64(E) |
| 6-5 | 2 | 55(G) | 57(A) | 60(C) | 62(D) | 64(E) | 64(E) | 64(E) |

Figure 7A:
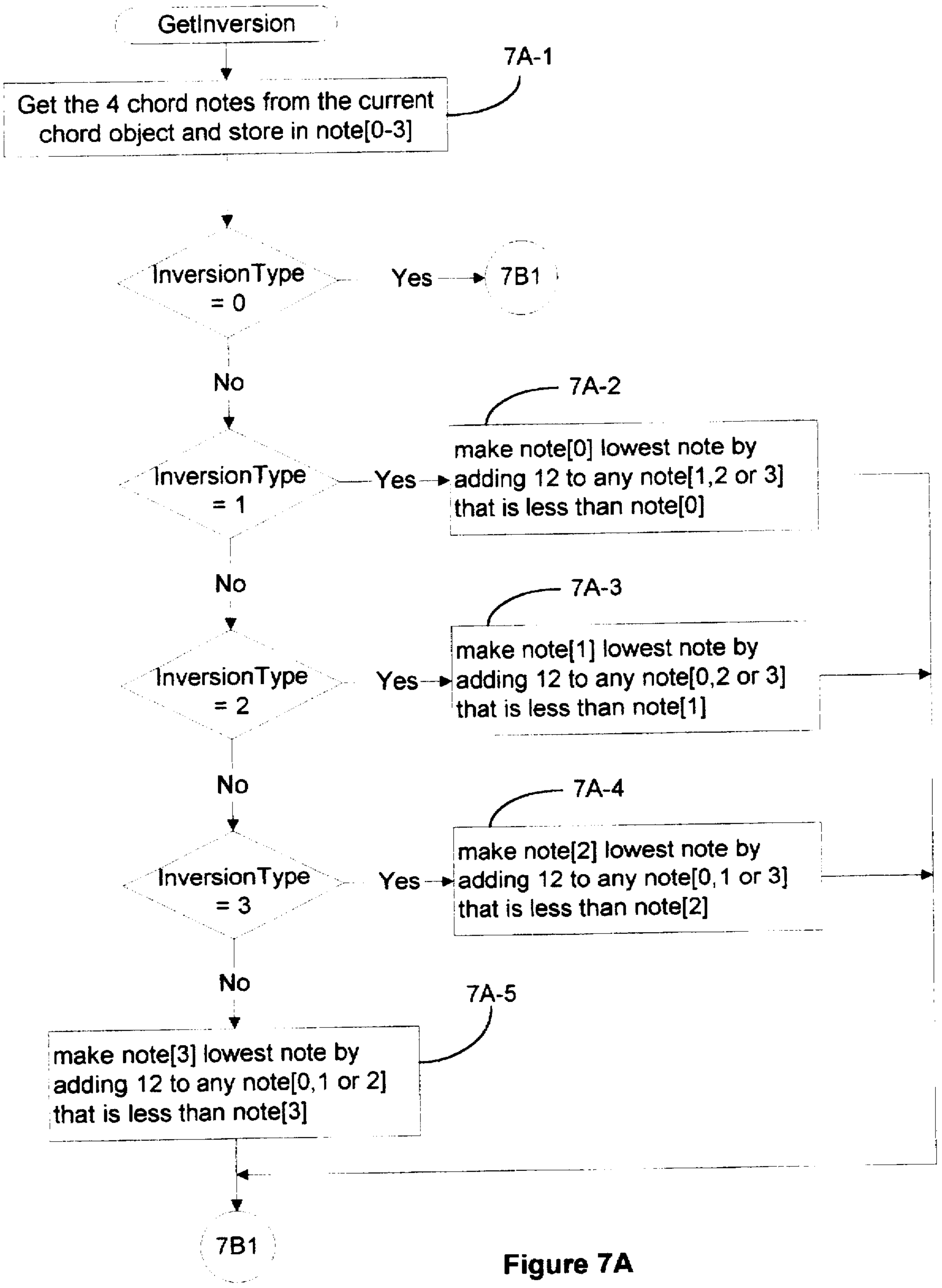
FIGS. 7*a*, 7*b*, 7*c*, and 7*d* together are a logic flow diagram of chord inversion objects.
Figure 7B:
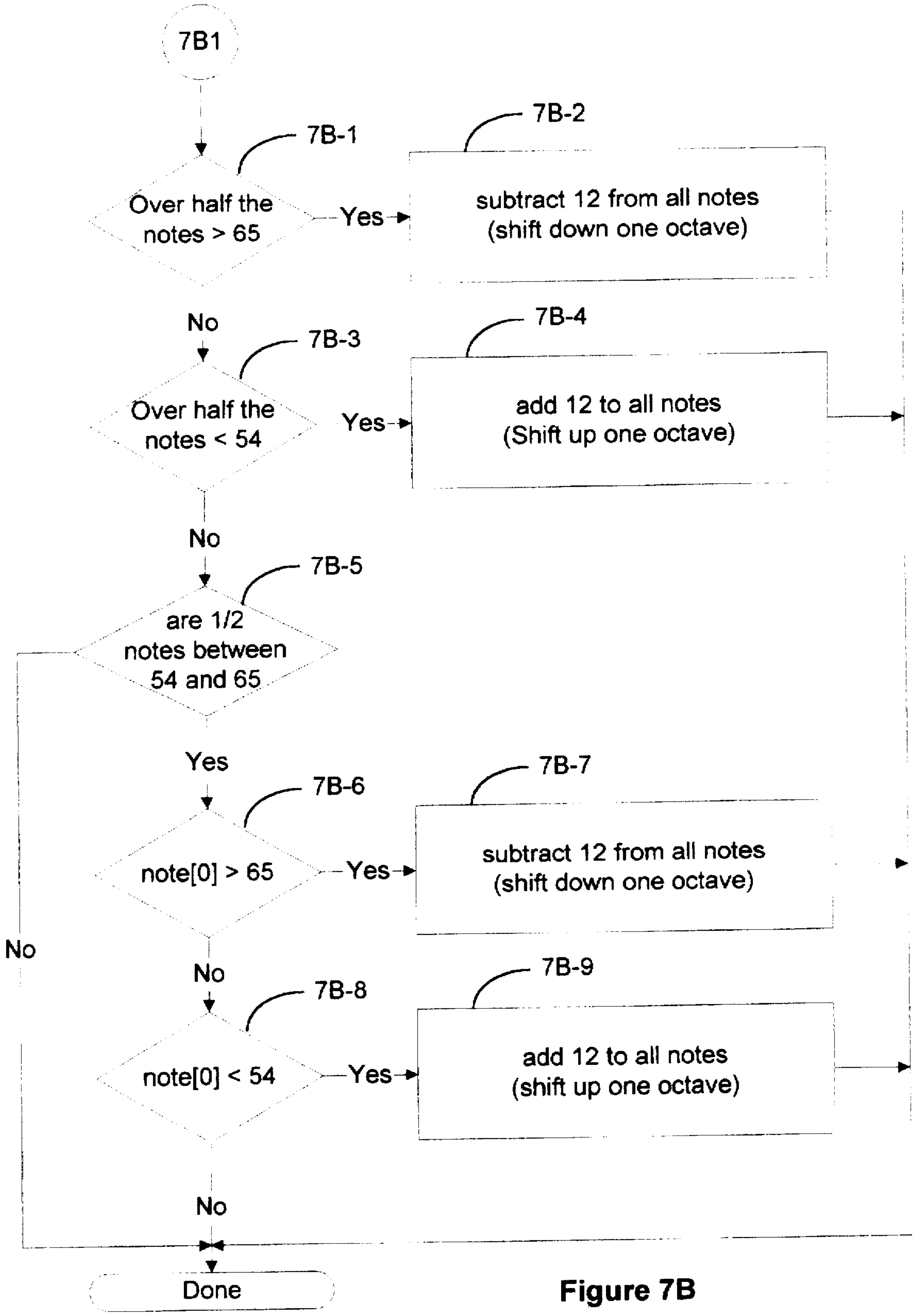
Figure 7C:
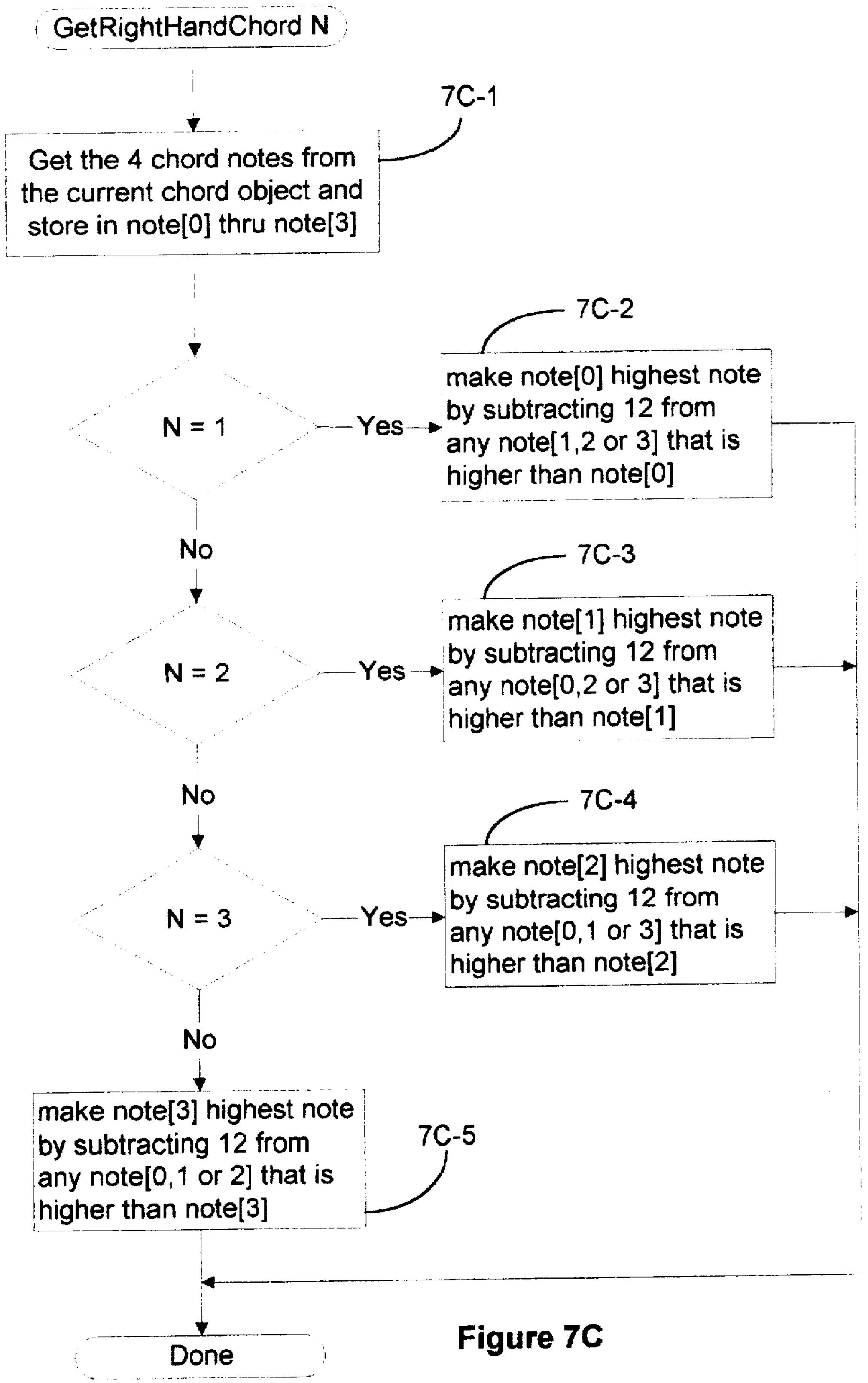

FIGS. 7*a*, 7*b* and 7*c* and Table 8

The present invention further includes three or more Chord Inversion objects 3-10. InversionA is for use by the Chord Progression type of PianoKey objects 3-6. InversionB is for the black melody type piano keys that play single notes 3-6 and inversionC is for the black melody type piano key that plays the whole chord 3-6. These objects simultaneously provide different inversions of the current chord object 3-7. These objects have the "intelligence" to invert chords. Table 8 shows the services and attributes that these objects provide. The single attribute inversionType, holds the inversion to perform and may be 0, 1, 2, 3, or 4.

TABLE 8

Chord Inversion Object Attributes and Services

Attributes:

1. inversionType

Services:

1. SetInversion(newInversionType);
2. GetInversion(note[ ]);
3. GetRightHandChord(note[ ], Number);
4. GetRightHandChordWithHighNote(note [ ],HighNote);

TABLE 8-continued

Chord Inversion Object Attributes and Services

5. GetFundamental( ); Fundamental
6. GetAlternate( ); Alternate
7. GetC1( ); C1
8. GetC2( ); C2

The SetInversion() service sets the attribute inversionType. It is usually called by the user interface 3-2 in response to keyboard input by the user or by the user pressing a foot switch that changes the current inversion.

For services 2, 3, and 4 of Table 8, note[ ], the destination for the chord, is passed as a parameter to the service by the caller.

FIGS. 7A, and 7B show a flow diagram for the GetInversion() service. The GetInversion service first (7A-1) gets all four notes of the current chord from the current chord object (3-7) and stores these in the destination (note[0] through note [3]). At this point, the chord is in inversion 0 where it is known that the fundamental of the chord is in note [0], the alternate is in note [1], the C1 note is in note [2] and C2 is in note [3] and that all of these notes are within one octave (referred to as 'popular voicing)'. If inversionType is 1, then 7A-2 of FIG. 7A will set the fundamental to be the lowest note of the chord. This is done by adding one octave (12) to every other note of the chord that is lower than the fundamental (note[0]). If inversionType is 2, then 7A-3 of FIG. 7A will set the alternate to be the lowest note of the chord. This is done by adding one octave (12) to every other note of the chord that is lower than the alternate (note[1]). If inversionType is 3, then 7A-4 of FIG. 7A will set the C1 note to be the lowest note of the chord. This is done by adding one octave (12) to every other note of the chord that is lower than the C1 note (note[2]). If inversionType is none of the above (then it must be 4) then 7A-5 of FIG. 7A will set the C2 note to be the lowest note of the chord. This is done by adding one octave (12) to every other note of the chord that is lower than the C2 note (note[3]). After the inversion is set then processing continues with FIG. 7B. 7B1 of FIG. 7B checks if over half of the different notes of the chord have a value that is greater than 65. If so, then 7B-2 drops the entire chord one octave by subtracting 12 from every note. If not, 7B-3 checks if over half of the different notes of the chord are less than 54. If so, then 7B-4 raises the entire chord by one octave by adding 12 to every note. If more than half the notes are not outside the range 54–65, then 7B-5 checks to see if exactly half the notes are outside this range. If so, then 7B-6 checks if the fundamental note (note[0]) is greater than 65. If it is, then 7B-7 lowers the entire chord by one octave by subtracting 12 from every note. If the chord fundamental is not greater than 65, then 7B-8 checks to see if it (note[0]) is less than 54. If it is , then 7B-9 raises the entire chord one octave by adding 12 to every note. If preferred, inversions could also be shifted so as to always keep the fundamental note in the 54–65 range.

FIG. 7C shows a flow diagram for the service GetRightHand Chord(). The right hand chord to get is passed as a parameter (N in FIG. 7C). 7C-1 first gets the current chord from the current chord object. If the right hand chord desired is 1 (N=1), meaning that the fundamental should be the highest note, then 7C-2 subtracts 12 (one octave) from any other note that is higher than the fundamental (note[0]). If the right hand chord desired is 2, meaning that the alternate should be the highest note, then 7C-3 subtracts 12 (one octave) from any other note that is higher than the alternate (note[1]). If the right hand chord desired is 3, meaning that the C1 note should be the highest note, then 7C-4 subtracts 12 (one octave) from any other note that is higher than the C1 note (note[2]). If the right hand chord desired is not 1, 2 or 3, then it is assumed to be 4, meaning that the C2 note should be the highest note and then 7C-5 subtracts 12 (one octave) from any other note that is higher than the C2 note (note[3]).

Figure 7D:
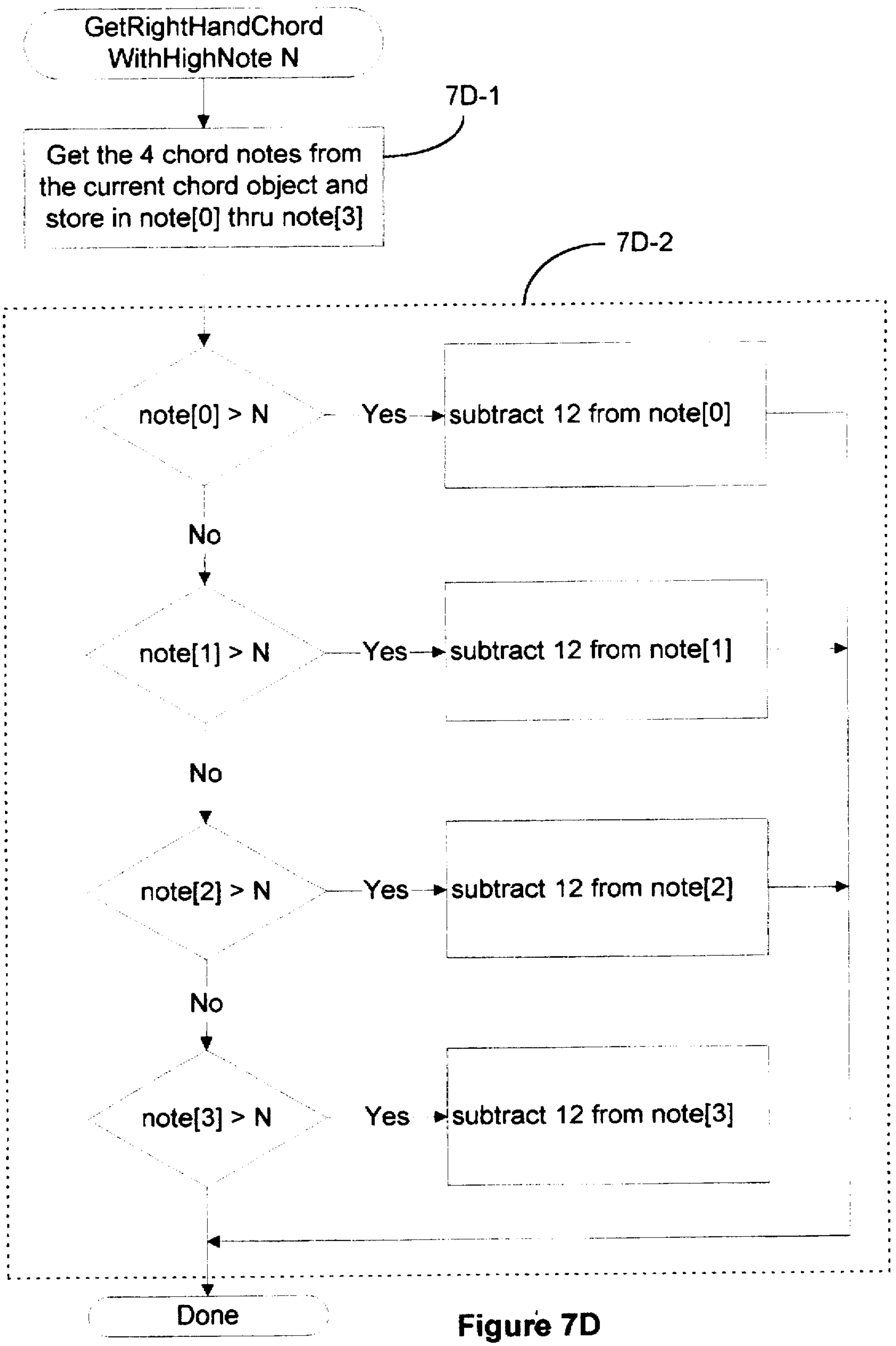

FIG. 7D shows a flow diagram for the service GetRightHandChordWithHighNote(). This service is called by the white melody keys when the scale note they are to play is a chord note the mode calls for a right hand chord. It is desirable to play the scale note as the highest note, regardless of whether it is the fundamental, alternate, etc. This service returns the right hand chord with the specified note as the highest. First, the 4 notes of the chord are fetched from the current chord object (7D-1). The flow diagram of FIG. 7D indicated by 7D-2 checks each note of the chord and lowers it one octave (by subtracting 12) if it is higher than the specified note. This will result in a chord that is the current chord with the desired note as the highest.

Services 5, 6, 7 and 8 of table 8 each return a single note as specified by the service name (fundamental, alternate, etc.). These services first perform the same sequence as in FIG. 7A (7A-1 through 7A-5). This puts the current chord in the inversion specified by the attribute inversionType. These services then return a single note and they differ only in the note they return. GetFundamental() returns the fundamental (note [0]). GetAlternate() returns the alternate (note [1]). Get C1() returns the C1 note (note[2]) and GetC2 returns the C2 note (note [3]).

Tables 9a and 9b

Referring again to FIG. 3, there are two Compose Bass objects 3-13, 'bass0' and 'bass1'. These objects know what the bass offset is for each input channel and what output channel should receive the original performance for a particular compose bass setting. The present invention sends the processed music to channel 1. The original music performed by the user is accepted from channel 3. Original Input from channels 4 through 9 are accepted with implied bass offsets (see Table 9b). The original performance is also output to enable the user to record and replay an original performance, such as for use with a lighting system or other indication system which will allow the user to see the original performance and perform along to it by depressing the correctly indicated keys in a manner known in the art. It could also be used for replaying a performance with new chord/scale substitutions, etc. The compose bass settings affect input from channel 3 only. When the bass setting is not 0, original input from channel 3 will be output to another channel (see Table 9b).

The attribute bassSetting contains the bass offset. The service SetBass(), called by the user interface (3-2), sets the bassSetting attribute to a new setting. The GetBassOfstForCnl() service provides the bass offset for that channel. The GetOutputCnlForInputCnl() service provides the destination channel for the specified input channel. The latter two services are call by the pianoKey 3-6 objects.

Table 10

A Main Configuration Memory 3-5 contains one or more sets or banks of chord assignments and scale assignments for each chord progression key. It responds to messages from the user interface 3-2 telling it to assign a chord or scale to a particular key. The Memory 3-5 responds to messages from the piano key objects 3-6 requesting the current chord or scale assignment for a particular key, or to switch to a different assignment set or bank. The response to these messages may result in the configuration memory 3-5 sending messages to other objects, thereby changing the present configuration. The configuration object provides memory storage of settings that may be saved and recalled from a named disk file. These setup configurations may also be stored in memory, such as for providing factory setups, or for allowing real-time switching from a user input, user interface, or from an internal or external storage device such as a CD, etc. The number of storage banks or settings is arbitrary. A user could have several different configurations saved. It is provided as a convenience to the user. The present invention preferably uses the following configuration:

There are two song keys stored in songKey[2]. There are two chord banks, one for each song key called chordTypeBank1[60] and chordTypeBank2[60]. Each chord bank hold sixty chords, one for each chord progression key. There are two scale banks, one for each song key, called scaleBank1[60][2] and scaleBank2[60][2]. Each scale bank holds 2 scales (root and type) for each of the sixty chord progression keys. The currentChordFundamental attribute holds the current chord fundamental. The attribute currentChordKeyNum holds the number of the current chord progression key and selects one of sixty chords in the selected chord bank or scales in the selected scale bank. The attribute songKeyBank identifies which one of the two song keys is selected (songKey[songKeyBank]), which chord bank is selected (chordTypeBank1[60] or chordTypeBank2 [60]) and which scale bank is selected (scaleBank1[60][2] or scaleBank2[60][2]). The attribute scaleBank[60] identifies which one of the two scales is selected in the selected scale bank (scaleBank1or2[currentChordKeyNum] [scaleBank [currentChordKeyNum]]).

The following discussion assumes that songKeyBank is set to 0. The service 'SetSongKeyBank(newSongKeyBank)' sets the current song key bank (songKeyBank= newSongKeyBank). 'SetScaleBank(newScaleBank)' service sets the scale bank for the current chord (scaleBank [currentChordKeyNum] =newScaleBank). 'AssignSongKey (newSongKey)' service sets the current song key (songKey [songKeyBank] =newSongKey).

The service 'AssignChord(newChordType, keyNum)' assigns a new chord (chordTypeBank1[keyNum] =newChordType). The service 'AssignScale(newScaleType, newScaleRoot, keyNum)' assigns a new scale (scaleBank1 [keyNum] [scaleBank[currentChordKeyNum]] =newScaleType and newScaleRoot).

The service SetCurrentChord(keyNum, chordFundamental)

1. sets currentChordFundamental=chordFundamental;
2. sets currentChordKeyNum=keyNum; and
3. sets the current chord to chordBank1 [currentChordKeyNum] and fundamental currentChordFundamental The service SetCurrentScale(keyNum) sets the current scale to the type and root stored at scaleBank1 [currentChordKeyNum] [scaleBank[currentChordKeyNum] ].

The service 'Save(destinationFileName)' saves the configuration (all attributes) to a disk file. The service 'Recall (sourceFileName)' reads all attributes from a disk file.

The chord progression key objects 3-6 (described later) use the SetCurrentChord() and SetCurrentScale() services to set the current chord and scale as the keys are pressed. The control key objects use the SetSongKeyBank() and SetScaleBank() services to switch key and scale banks respectively as the user plays. The user interface 3-2 uses the other services to change (assign), save and recall the configuration. The present invention also contemplates assigning a song key to each key by extending the size of songKey[2] to sixty (songKey[60]) and modifying the SetCurrentChord() service to set the song key every time it is called. This allows chord progression keys on one octave to play in one song key and the chord progression keys in another octave to play in another song key. The song keys which correspond to the various octaves or sets of inputs can be selected or set by the user either one at a time, or simultaneously in groups.

TABLE 10

| Configuration Objects Attributes and Services |
|---|
| Attributes: |
| 1. songKeyBank |
| 2. scaleBank[60] |
| 3. currentChordKeyNum |
| 4. currentChordFundamental |
| 5. songKey[2] |
| 6. chordTypeBank1[60] |
| 7. chordTypeBank2[60] |
| 8. scaleBank1[60][2] |
| 9. scaleBank2[60][2] |
| Services: |
| 1. SetSongKeyBank(newSongKeyBank); |
| 2. SetScaleBank(newScaleBank); |
| 3. AssignSongKey(newSongKey); |
| 4. AssignChord(newChordType, keyNum); |
| 5. AssignScale(newScaleType, newScaleRoot, keyNum); |
| 6. SetCurrentChord(keyNum, chordFundamental); |
| 7. SetCurrentScale(keyNum); |
| 8. Save(destinationFileName); |
| 9. Recall(sourceFileName); |

Figure 8:
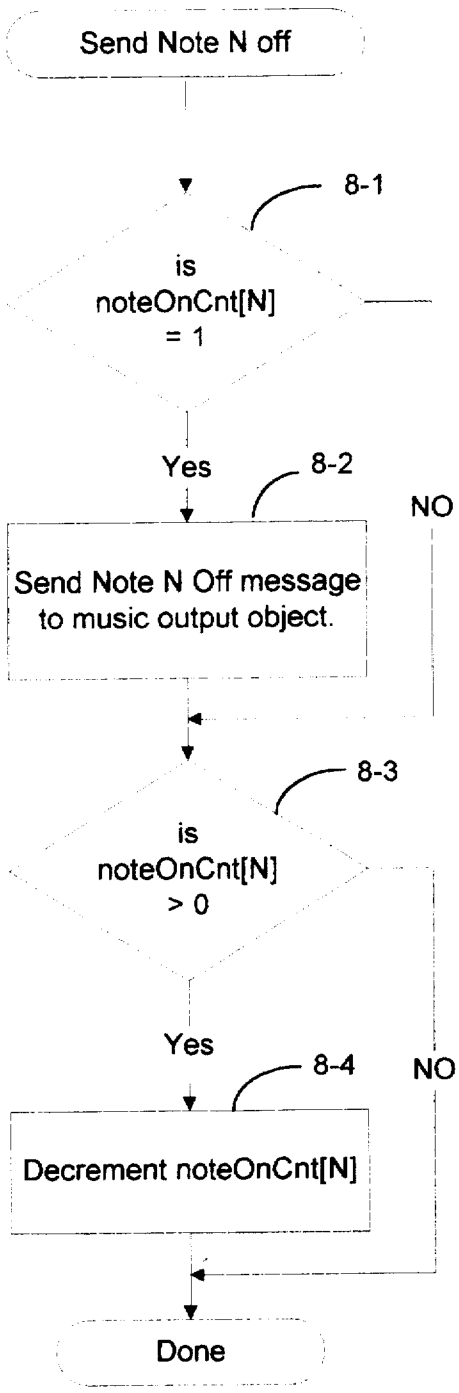
FIG. 8 is a logic flow diagram of channel output objects 'Send note off' service.

FIGS. 8 and 9 and Table 11

Each Output Channel object 3-11 (FIG. 3) keeps track of which notes are on or off for an output channel and resolves turning notes on or off when more than one key may be setting the same note(s) on or off. Table 11 shows the Output Channel objects attributes and services. The attributes include (1) the channel number and (2) a count of the number of times each note has been sent on. At start up, all notes are assumed to be off. Service (1) sets the output channel number. This is usually done just once as part of the initialization. In the description that follows, n refers to the note number to be sent on or off.

Figure 9A:
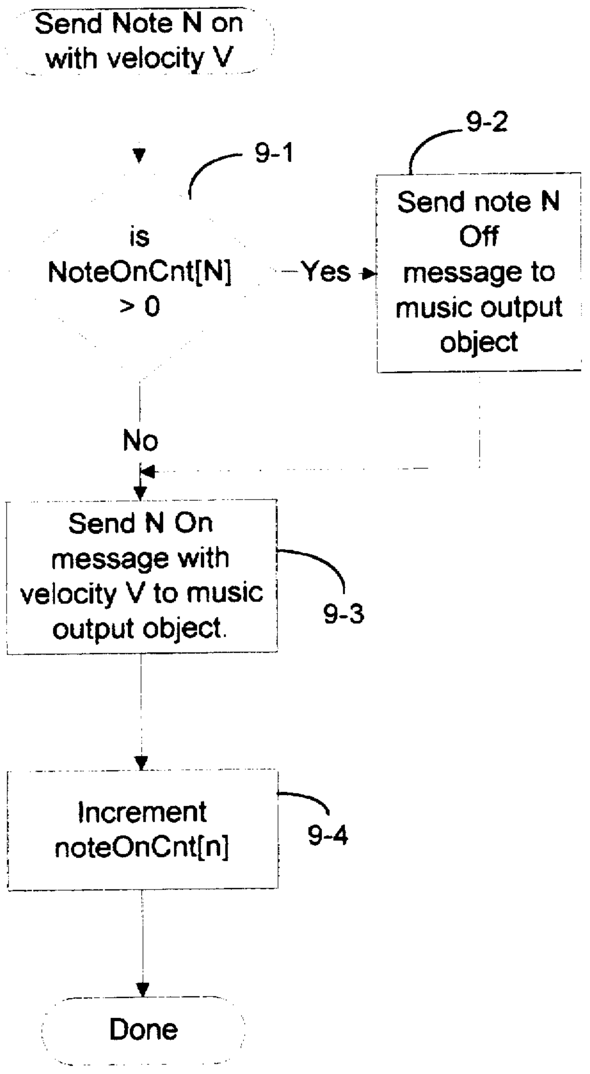
FIG. 9*a* is a logic flow diagram of channel output objects 'Send note on' service.

FIG. 9*a* shows a flow diagram for service 2, which sends a note on message to the music output object 3-12. The note to be sent (turned on) is first checked if it is already on in step 9-1, indicated by noteOnCnt[n] >0. If on, then the note will first be sent (turned) off in step 9-2 followed immediately by sending it on in step 9-3. The last action increments the count of the number of times the note has been sent on in step 9-4.

Figure 9B:
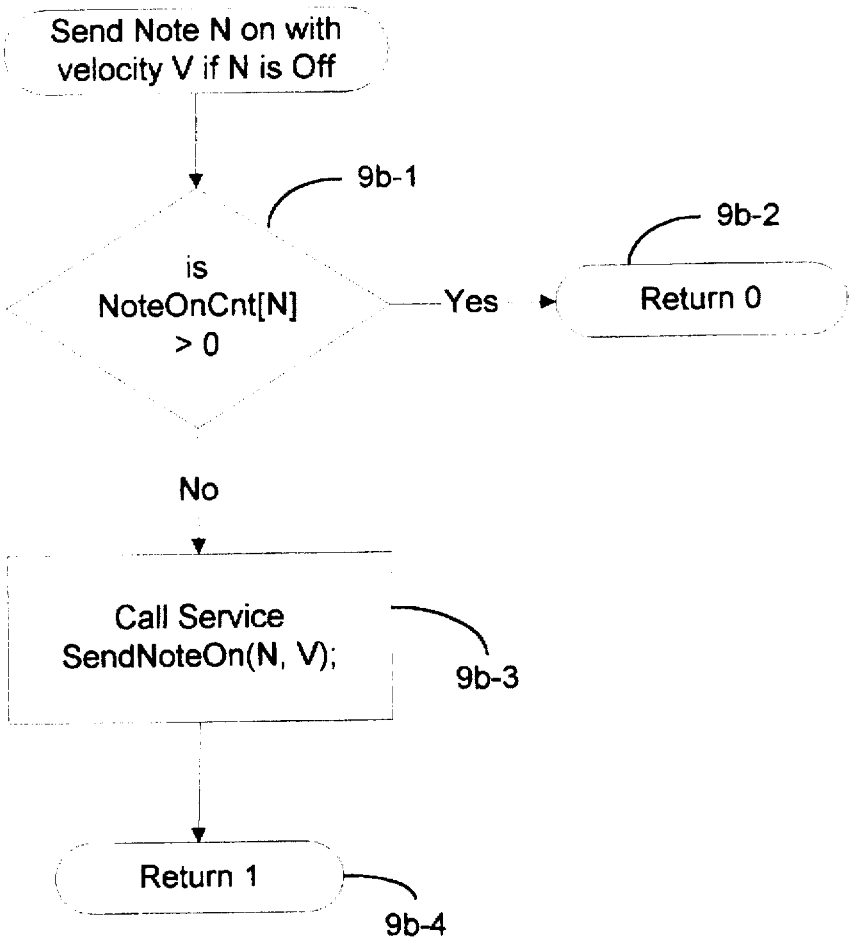
FIG. 9*b* is a logic flow diagram of channel output objects 'Send note on if off' services

FIG. 9*b* shows a flow diagram for service 3 which sends a note on message only if that note is off. This service is provided for the situation where keys want to send a note on if it is off but do not want to re-send the note if already on. This service first checks if the note is on in step 9*b*-1 and if it is, returns 0 in step 9*b*-2 indicating the note was not sent. If the note is not on, then the Send note on service is called in step 9*b*-3 and a 1 is returned by step 9*b*-4, indicating that the note was sent on and that the calling object must therefore eventually call the Send Note Off service.

FIG. 8 shows the flow diagram for the sendNoteOff service. This service first checks if the noteOnCnt[n] is equal to one in step 8-1. If it is, then the only remaining object to send the note on is the one sending it off, then a note off message is sent by step 8-2 to the music output object 3-12. Next, if the noteOnCnt[n] is greater than 0, it is decremented.

All objects which call the SendNoteOn service are required (by contract so to speak) to eventually call the SendNoteOff service. Thus, if two or more objects call the SendNoteOn service for the same note before any of them call the SendNoteOff service for that note, then the note will be sent on (sounded) or re-sent on (re-sounded) every time the SendNoteOn service is called, but will not be sent off until the SendNoteOff service is called by the last remaining object that called the SendNoteOn service.

The remaining service in Table 11 is SendProgramChange. The present invention sends notes on/off and program changes, etc., using the MIDI interface. The nature of the message content preferably conforms to the MIDI specification, although other interfaces may just as easily be employed. The Output Channel object 3-11 isolates the rest of the software from the 'message content' of turning notes on or off, or other control messages such as program change. The Output Channel object 3-11 takes care of converting the high level functionality of playing (sending) notes, etc. to the lower level bytes required to achieve the desired result.

TABLE 11

| Output Channel Objects Attributes and Services |
|---|
| Attributes: |
| 1. channelNumber |
| 2. noteOnCnt[128] |
| Services: |
| 1. SetChannelNumber(channelNumber); |
| 2. SendNoteOn(noteNumber, velocity); |
| 3. SendNoteOnIfOff(noteNumber, velocity); noteSentFlag |
| 4. SendNoteOff(noteNumber); |
| 5. SendProgramChange(PgmChangeNum); |

Figure 10A:
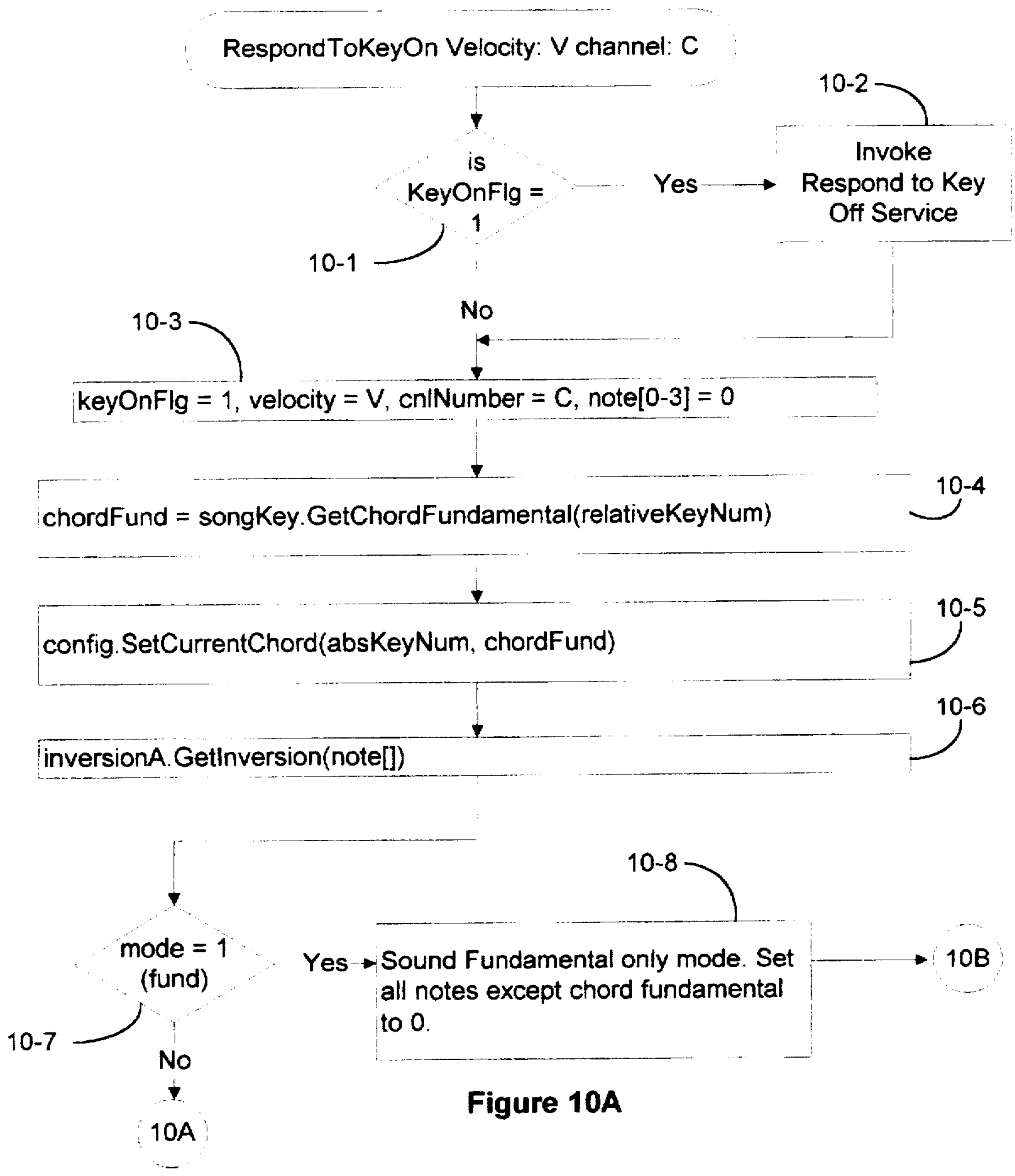
FIGS. 10*a* and 10*b* are logic flow diagrams of PianoKey::Chord Progression Key objects 'Respond to key on' service.
Figure 10B:
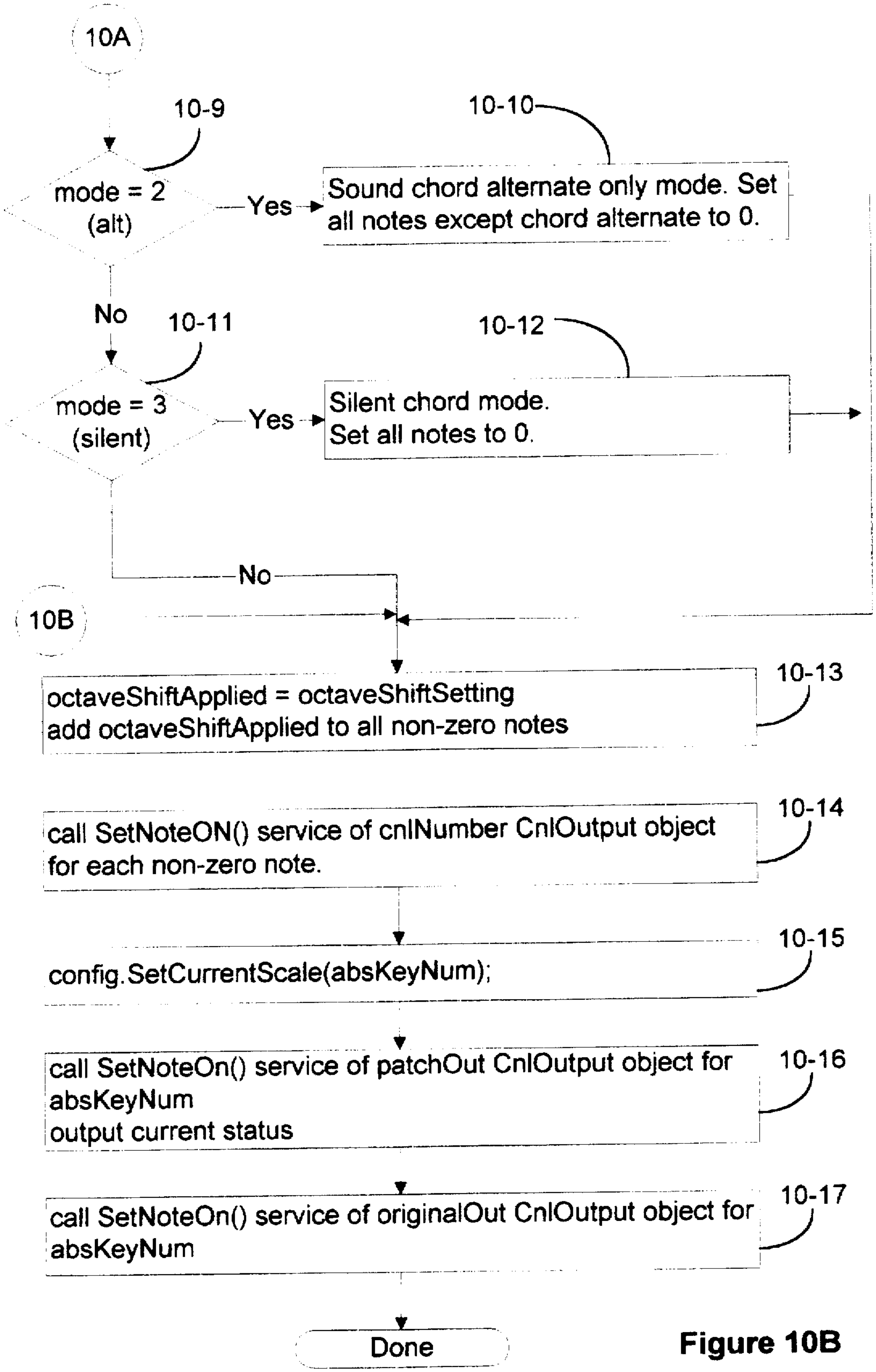
Figure 11:
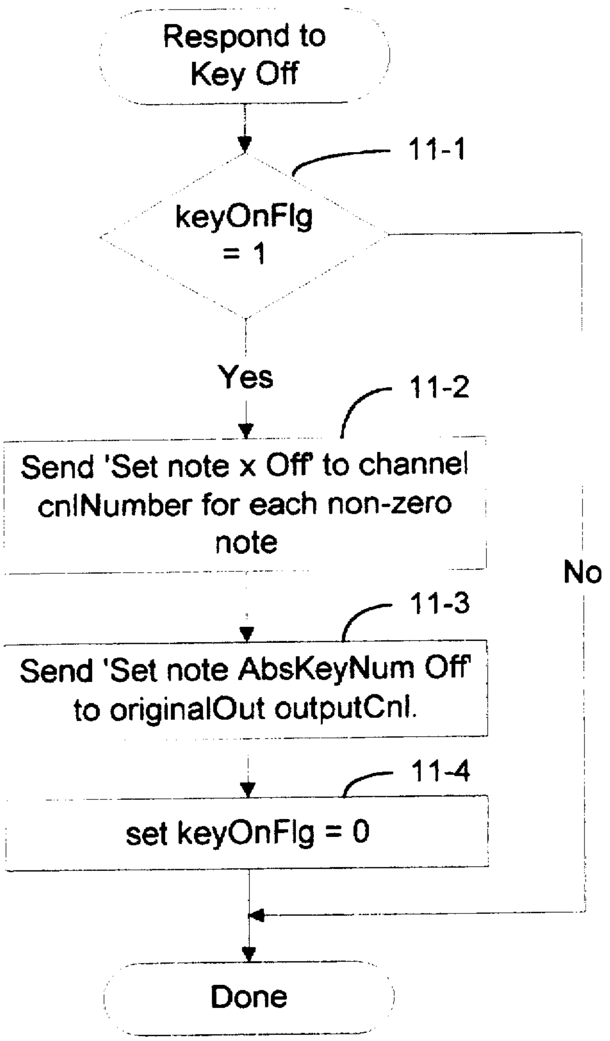
FIG. 11 is a logic flow diagram of PianoKey::Chord Progression Key objects 'Respond to key off' service.

FIGS. 10*a*, 10*b* and 11 and Table 12

There are four kinds of PianoKey objects 3-6: (1) ChordProgressionKey, (2) WhiteMelodyKey, (3)

BlackMelodyKey, and (4) ControlKey. These objects are responsible for responding to and handling the playing of musical (piano) key inputs. These types specialize in handling the main types of key inputs which include the chord progression keys (keys 0–59), the white melody keys (white keys greater than 59, the black melody keys (black keys greater than 59), and control keys (certain black chord progression keys). There are two sets of 128 PianoKey objects for each input channel. One set, referred to as chordKeys is for those keys designated (by user preference) as chord progression keys and the other set, refered to as melodyKeys are for those keys not designated as chord keys. The melodyKeys with relative key numbers (FIG. 2) of 0, 2, 4, 5, 7, 9 and 11 will always be the WhiteMelodyKey type while melodyKeys with relative key numbers of 1, 3, 6, 8 and 10 will always be the BlackMelodyKey type.

The first three types of keys usually result in one or more notes being played and sent out to one or more output channels. The control keys are special keys that usually result in configuration or mode changes as will be described later. There are 128 instances of PianoKey objects, one for each piano key, in an array called PianoKey[128]. These objects receive piano key inputs from the music administrator object 3-3 and configuration input from the user interface object 3-2. They collaborate with the song key object 3-8, the current chord object 3-7, the current scale object 3-9, the chord inversion objects 3-10 and the configuration object 3-5, in preparing their response, which is sent to one or more of the many instances of the CnlOutput objects 3-11.

The output of the ControlKey objects may be sent to many other objects, setting their configuration or mode.

The ChordProgressionKey type of PianoKey 3-6 is responsible for handling the piano key inputs that are designated as chord progression keys (the instantiation is the designation of key type, making designation easy and flexible). These include all keys with absolute key numbers 0 through 59 with the exception of a few which are reserved for ControlKeys (see description for ControlKeys).

Table 12 shows the ChordProgressionKeys attributes and services. The attribute mode, a class attribute that is common to all instances of the ChordProgressionKey objects, stores the present mode of operation. With minor modification, a separate attribute mode could be used to store the present mode of operation of each individual key input, allowing all of the individual notes of a chord to be played independently and simultaneously when establishing a chord progression. The mode may be normal (0), Fundamental only (1), Alternate only (2) or silent chord (3), or expanded further. The class attribute correctionMode controls how the service CorrectKey behaves and may be set to either Normal=0 or SoloChord=1, SoloScale=2, or SoloCombined=3. The class attribute octaveShiftSetting is set to the number of octaves to shift the output. Positive values shift up, negative shift down. =1-The absKeyNum is used for outputting patch triggers to output channel 2 (patchOut instance of output object). The relativeKeyNum is used to determine the chord to play. The cnlNumberoutputCnl attribute stores the destination channel for the next key off response. The keyOnFlag indicates if the object has responded to a key on since the last key off. The velocity attribute holds the velocity with which the key was pressed. The chordNote[4] attributes holds the (up to) four notes of the chord last output. The attribute octaveShiftApplied is set to octaveShiftSetting when notes are turned on for use when correcting notes (this allows the octaveShiftSetting to change while a note is on).

TABLE 12

| PianoKey::ChordProgressionKey Attributes and Services |
|---|
| Class Attributes: |
| 1. mode |
| 2. correctionMode |
| octaveShiftSetting |
| Instance Attributes: |
| 1. absoluteKeyNumber |
| 2. relativeKeyNumber |
| 3. cnlNumberoutputCnl |
| 4. keyOnFlag |
| 5. velocity |
| 6. chordNote[4] |
| octaveShiftApplied |
| Services: |
| 1. RespondToKeyOn(sourceChannel, velocity); |
| 2. RespondToKeyOff(sourceChannel); |
| 3. RespondToProgramChange(sourceChannel); |
| 4. SetMode(newMode); |
| 5. CorrectKey( ); |
| 6. SetCorrectionMode(newCorrectionMode); |
| SetOctaveShift(numberOctaves); |

FIGS. 10*a* and 10*b* depict a flow diagram for the service 'RespondToKeyOn()', which is called in response to a chord progression key being pressed. If the KeyOnFlg is 1 in step 10-1, indicating that the key is already pressed, then the service 'RespondToKeyOff()' is called by step 10-2. Then, some of the attributes are initialized in step 10-3.

Then, the chord fundamental for the relative key number is fetched from the song key object in step 10-4. The main configuration memory 3-5 is then requested to set the current chord object 3-7 based on the presently assigned chord for the absKeyNum attribute in step 10-5. The notes of the current chord are then fetched in step 10-6 from the chord inversion object A 3-10 (which gets the notes from the current chord object 3-7. If mode attribute=1 (10-7) then all notes of the chord except the fundamental are discarded (set to 0) in step 10-8. If the mode attribute=2 in step 10-9, then all notes of the chord except the alternate are discarded by step 10-10. If the mode attribute=3 in step 10-11, then all notes are discarded in step 10-12. The Octave shift setting (octaveShiftSetting) is stored in octaveShiftApplied and then bass offset is then fetched from the ComposeBass object bass0 and added to each note to turn on in step 10-13. All notes that are non zero are then output to channel cnlNumber1 in step 10-14. The main configuration object 3-5 is then requested to set the current scale object 3-9 per current assignment for absoluteKeyNumber attribute 10-15. A patch trigger=to the absKeyNum is sent to patchOut channel 2 in step 10-16. In addition, the current status is also sent out on patchOut channel 2 (see table 17 for description of current status). When these patch triggers/current status are recorded and played back into the EasyPlayeasy composer software, it will result in the RespondToProgramChange() service being called for each patch trigger received. By sending out the current key, chord and scale for each key pressed, it will assure that the EasyPlayeasy composer software will be properly configured when another voice is added to the previously recorded material. The absKeyNum attribute is output to originalOut-output channel per current bass setting (10-17).

FIG. 11 shows a flow diagram for the service 'RespondToKeyOff()'. This service is called in response to a chord progression key being released. If the key has already been released in step 11-1, indicated by keyOnFlg=

0, then the service does nothing. Otherwise, it sends note off messages to channel cnlNumber1 for each non -zero note, if any, in step 11-2. It then sends a note off message to originalOut channeloutputCnl for AbsKeyNum in step 11-3. Finally it sets the keyOnFlg to 0 in step 11-4.

The service 'RespondToProgramChange()' is called in response to a program change (patch trigger) being received. The service responds in exactly the same way as the 'RespondToKeyOn()' service except that no notes are output to any object. It initializes the current chord object and the current scale object. The 'SetMode()' service sets the mode attribute. The 'setCorrectionMode()' service sets the correctionMode attribute.

The service CorrectKey() is called in response to a change in the song key, current chord or scale while the key is on (keyOnFlg=1). This enables the key to correct the notes it has sent out for the new chord or scale. There are two different correction modes (see description for correctionMode attribute above). In the normal correction mode (correctionMode=0), this service behaves exactly as RespondToKeyOn() with one exception. If a new note to be turned on is already on, it will remain on. It therefore does not execute the same identical initialization sequence (FIG. 10*a*) in this mode. It first determines the notes to play (as per RespondToKeyOn() service) and then turns off only those notes that are not already on and then turns on any new notes. The solo correction mode (correctionMode=1) takes this a step further. It turns off only those notes that are not in the new current chord (correctionMode=1), scale (correctionMode=2) or combined chord and scale (correctionMode=3). If a note that is already on exists anywhere in the current chord, scale or combined chord and scale it will remain on. The current chord objects service isNoteInChord() and the current scale objects services isNoteInScale and isNoteInCombinedScale() are used to determine if each note already on should be left on or turned off. The output channel for the original key is determined as for the white melody key as described below).

FIGS. 12*a* through 12*k* and Table 13

The WhiteMelodyKey object is responsible for handling all white melody key events. This involves, depending on mode, getting notes from the current scale object and/or chord inversion object and sending these notes out.

The class attributes for this object include mode, which may be set to one of Normal=0, RightHandChords=1, Scale3rds=2, RHCand3rds=3, RemainScale=4 or RemainNonScale=5. The class attributes numBlkNotes hold the number of block notes to play if mode is set to 4 or 5. The attribute correctionMode controls how the service CorrectKey behaves and may be set to either Normal=0 or SoloChord=1, SoloScale=2, or SoloCombined=3. The class attribute octaveShiftSetting is set to the number of octaves to shift the output. Positive values shift up, negative shift down. Instance variables include absoluteKeyNumber and colorKeyNumber and octave (see FIG. 2). The attribute cnlNumberoutputCnl holds the output channel number the notes were sent out to. keyOnFlag indicates whether the Key in pressed or not. Velocity hold the velocity of the received 'Note On' and note[4] holds the notes that were sounded (if any). The attribute octaveShiftApplied is set per octaveShiftSetting and octave attributes when notes are turned on for use when correcting notes.

TABLE 13

| PianoKey::WhiteMelodyKey Attributes and Services |
|---|
| Class Attributes: |
| 1. mode |
| 2. numBlkNotes |
| 3. CorrectionMode |
| octaveShiftSetting |
| Instance Attributes: |
| 1. absoluteKeyNumber |
| 2. colorKeyNumber |
| 3. octave |
| 4. cnlNumberoutputCnl |
| 5. keyOnFlag |
| 6. velocity |
| 7. note[4] |
| octaveShiftApplied |
| Services: |
| 1. RespondToKeyOn(sourceChannel, velocity); |
| 2. RespondToKeyOff(sourceChannel); |
| 3. CorrectKey( ); |
| 4. SetMode(newMode); |
| 5. SetCorrectionMode(newCorrectionMode); |
| 6. SetNumBlkNotes(newNumBlkNotes); |
| SetOctaveShift(numberOctaves); |

FIGS. 12*a* through 12*j* provide a flow diagram of the service 'RespondToKeyOn()'. This service is called in response to a white melody key being pressed. It is responsible for generating the note(s) to be sounded. It is entered with the velocity of the key press and the channel the key was received on.

The RespondToKeyOn() service starts by initializing itself in step 12*a*-1. This initialization will be described in more detail below. It then branches to a specific sequence that is dependent on the mode, as shown in flow diagram 12*a*-2. These specific sequences actually generate the notes and will be described in more detail below. It finishes by outputting the generated notes in step 12*a*-3.

Figure 12A:
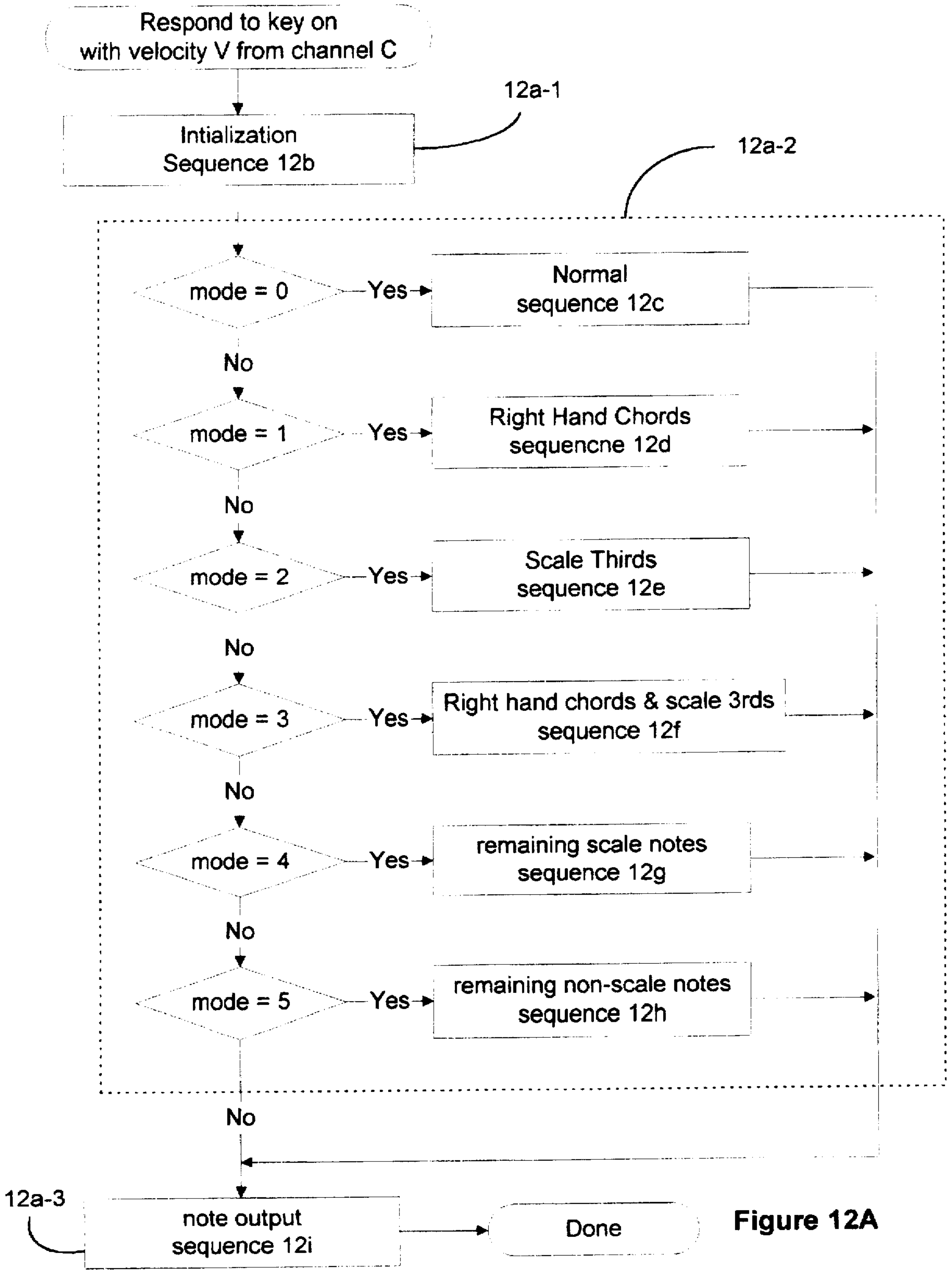
FIGS. 12*a*, through 12*j* together are a logic flow diagram of PianoKey::Melody Key objects 'Respond to key on' service.
Figure 12B:
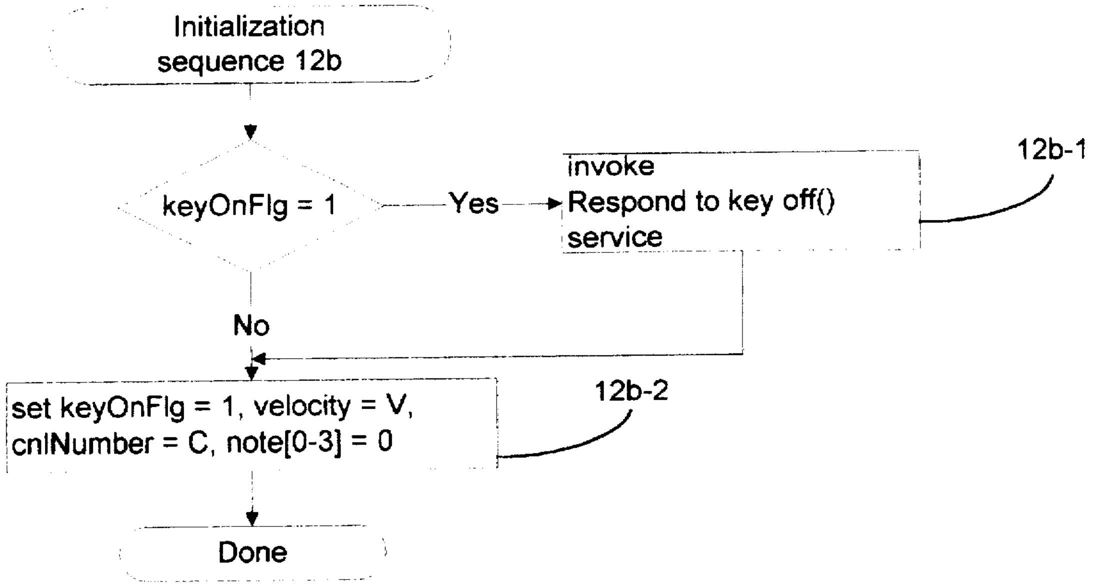
FIG. 12*k* is a logic flow diagram of PianoKey::Melody Key objects 'Respond to key off' service.

The initialization sequence, shown in FIG. 12*b*, first checks if the key is already pressed. If it is (keyOnFlg=1), the service 'RespondToKeyOff()' service will be called in step 12*b*-1. Then, keyOnFlg is set to 1, indicating the key is pressed, the velocity and cnlNumberoutputCnl attributes are set and the notes are cleared by being set to 0 in step 12*b*-2.

Figure 12I:
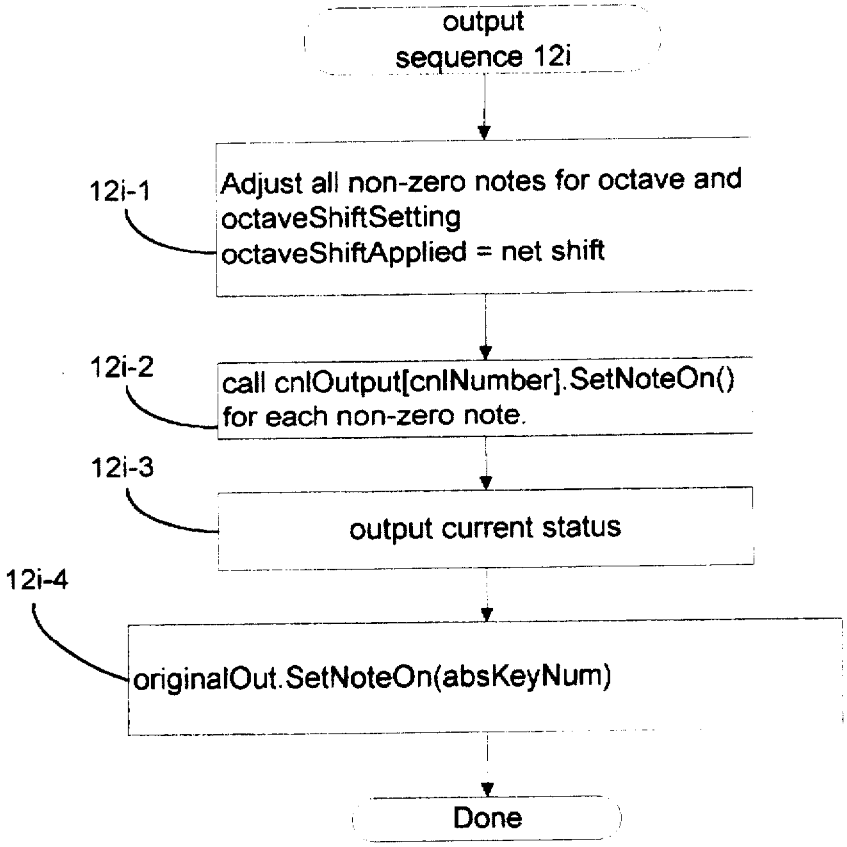
Figure 12C:
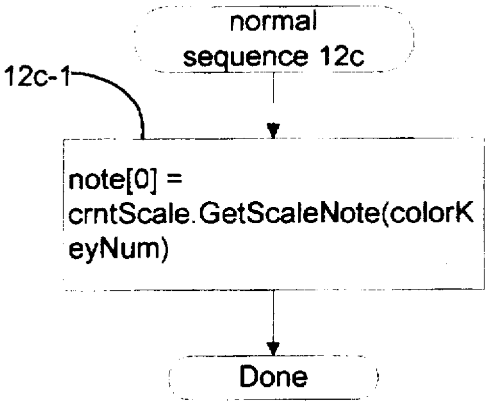

FIG. 12*c* depicts a flow diagram of the normal (mode=0) sequence. This plays a single note (note[0]) that is fetched from the current scale object based on the particular white key pressed (colorKeyNum).

Figure 12D:
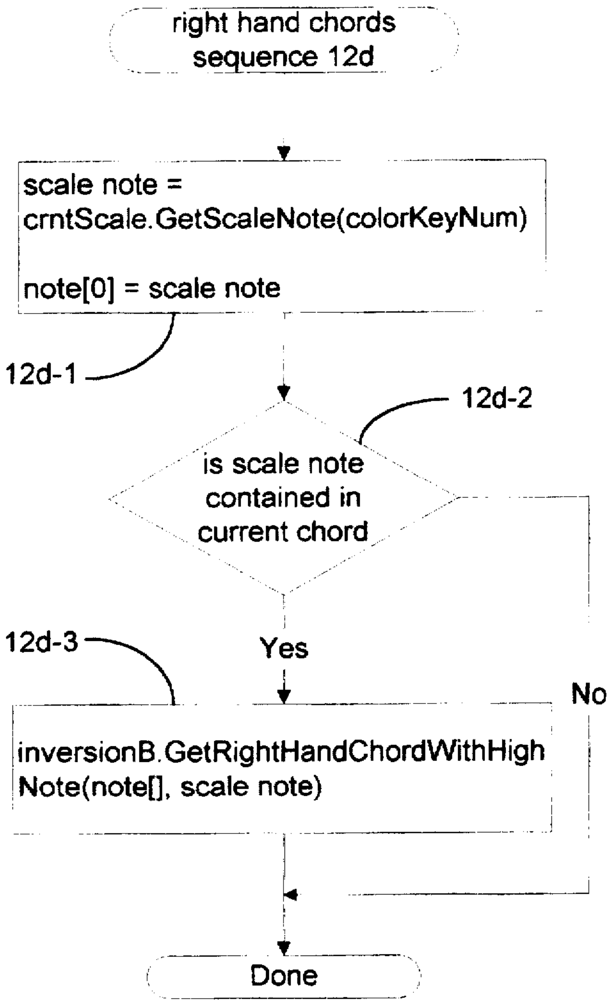

FIG. 12*d* gives a flow diagram of the right hand chord (mode=1) sequence. This sequence first fetches the single normal note as in normal mode in step 12*d*-1. It then checks if this note (note[0]) is contained in the current chord in step 12*d*-2. If it is not, then the sequence is done. If it is, then the right hand chord is fetched from chord inversion B object with the scale note (note[)]) as the highest note in step 12*d*-3.

Figure 12E:
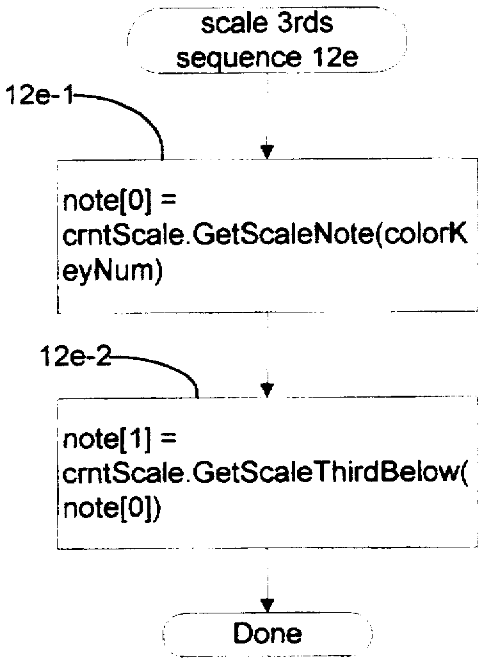

FIG. 12*e* gives a flow diagram of the scale thirds (mode=2) sequence. This sequence sets note[0] to the normal scale note as in normal mode (12*e*-1). It then sets note[1] to be the scale note one third below note[0] by calling the service 'GetScaleThird(colorKeyNum)' of the current scale object.

Figure 12F:
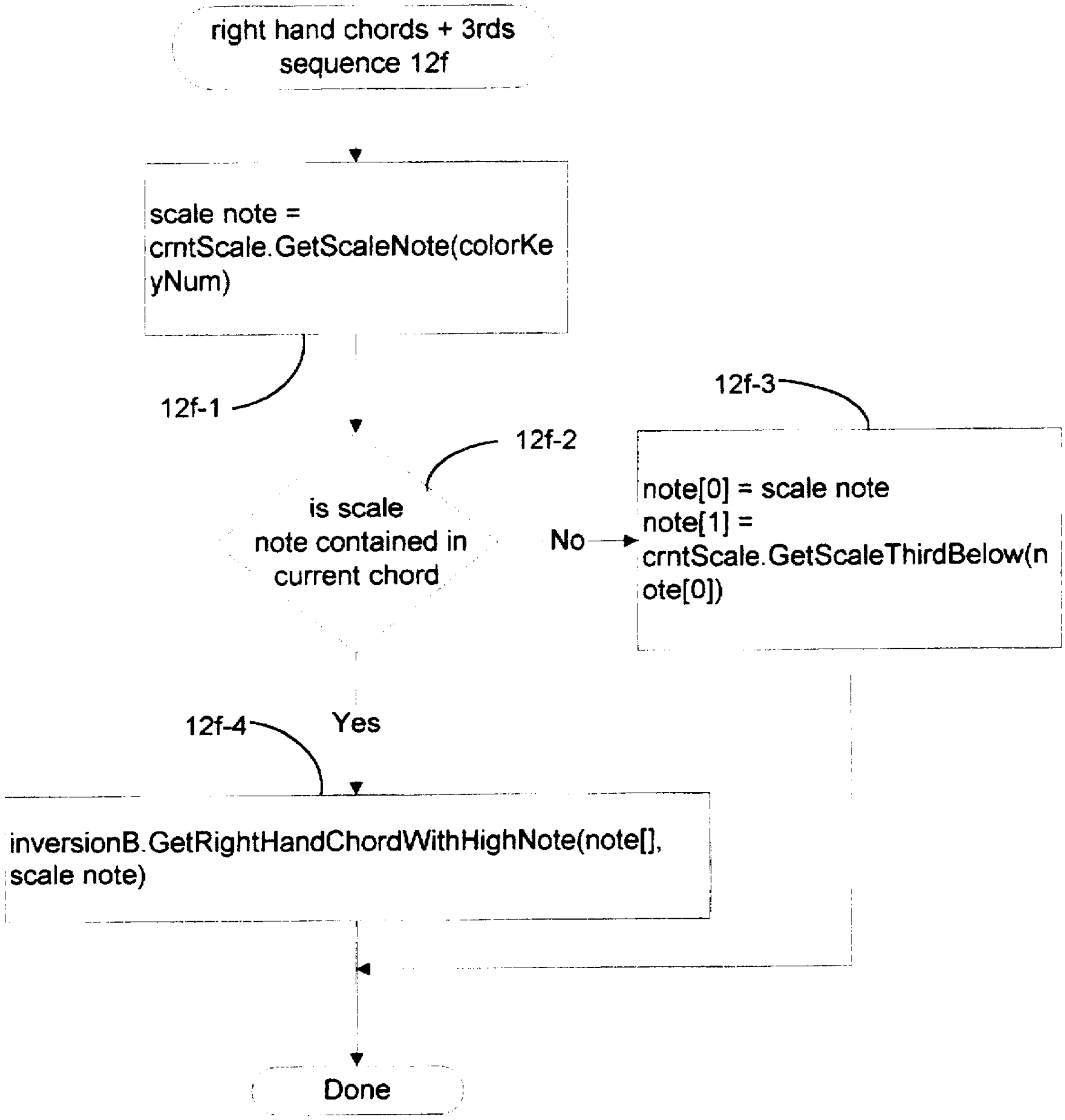

FIG. 12*f* gives a flow diagram of the right hand chords plus scale thirds (mode=3) sequence. This sequence plays a right hand chord exactly as for mode=1 if the normal scale note is in the current chord (12*f*-1, 12*f*-2, and 12*f*-4 are identical to 12*d*-1, 12*d*-2, and 12*d*-3 respectively). It differs in that if the scale note is not in the current chord, a scale third is played as mode 2 in step 12*f*-3.

Figure 12G:
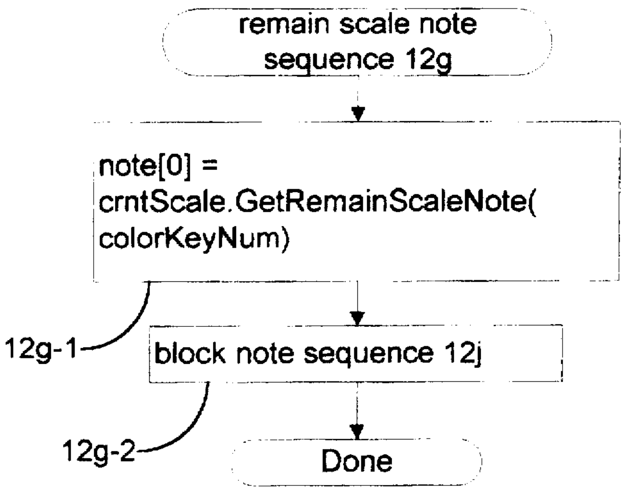

FIG. 12g depicts a flow diagram of the remaining scale note (mode=4) sequence. This sequence plays scale notes that are remaining after current chord notes are removed. It sets note[0] to the remaining scale note by calling the service 'GetRemainScaleNote(colorKeyNumber)' of the current scale object instep 12g-1. It then adds chord (block) notes based on the numBlkNotes attributes in step 12g-2. FIG. 12j shows a flow diagram for getting block notes.

Figure 12H:
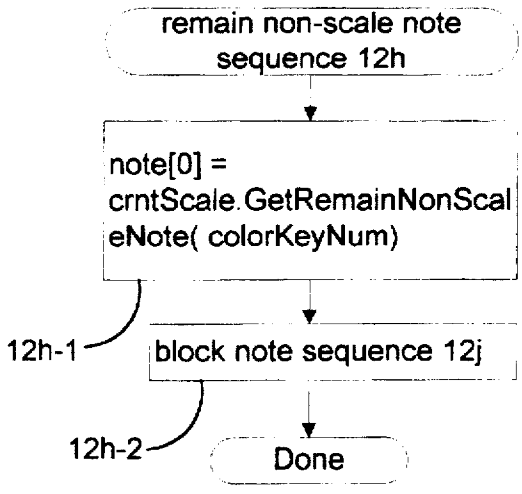
Figure 12J:
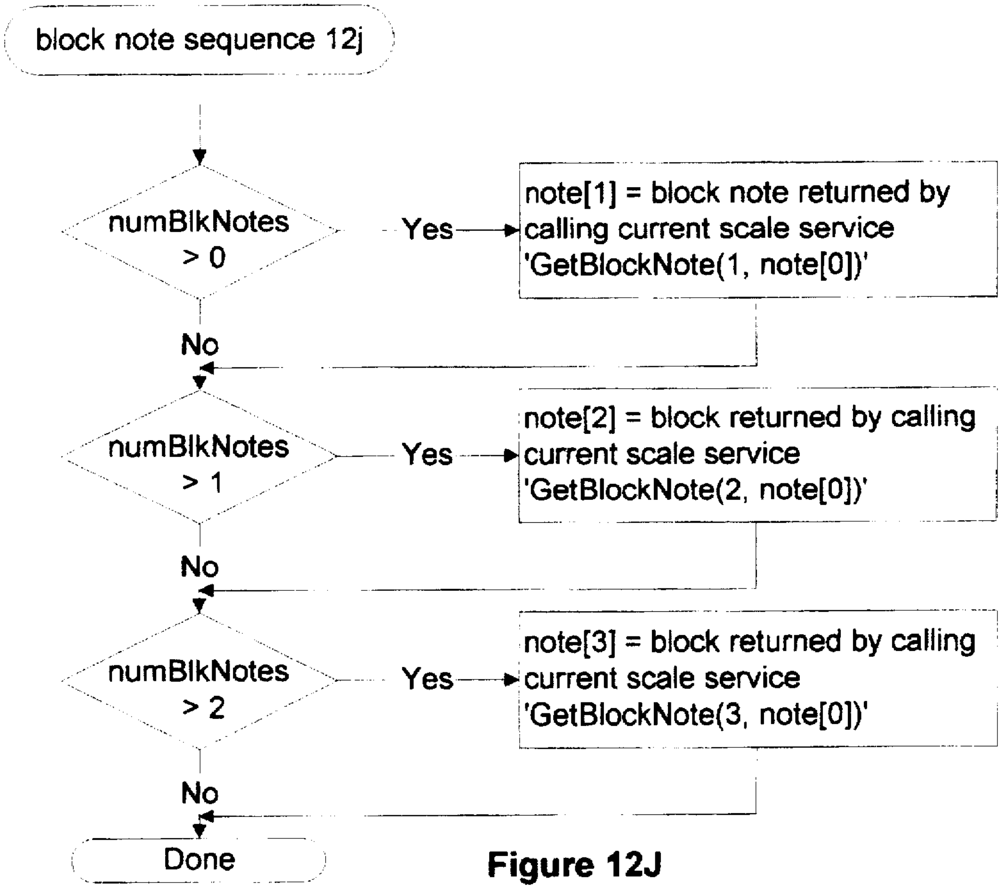

FIG. 12h gives a flow diagram of the remaining non-scale notes (mode=5) sequence. This sequence plays notes that are remaining after scale and chord notes are removed. It sets note[0] to the remaining non scale note by calling the service 'GetRemainNonScaleNote(colorKeyNumber)' of the current scale object in step 12h-1. It then adds chord (block) notes based on the numBlkNotes attributes in step 12h-2.

FIG. 12j shows a flow diagram for getting block notes.

FIG. 12i shows a flow diagram of the output sequence. This sequence includes adding the bass offset to each note and adjusting each note for the octave of the key pressed and the shiftOctaveSetting attribute in step 12i-1. The net shift is stored in shiftOctaveApplied. Next, each nonzero note is output to the cnlNumbercompOut instance of the CnlOutput object in step 12i-2. The current status is also sent out to patchOut channel 2 in step 12i-3 (see Table 17). Last, the original note (key) is output to the originalOutproper channel in step 12i-4.

Figure 12K:
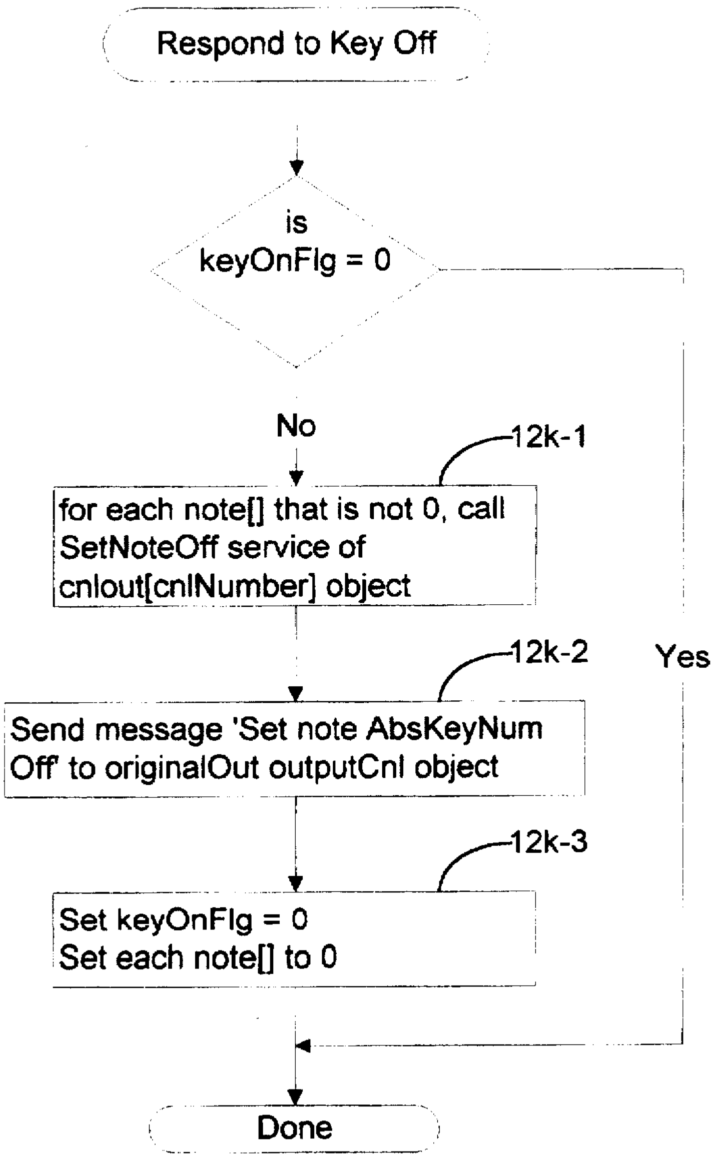

FIG. 12k provides a flow diagram for the service 'RespondToKeyOff()'. This service is called in response to a key being released. If the key has already been released (keyOnFlg=0) then this service does nothing. If the key has been pressed (keyOnFlg=1) then a note off is sent to channel 1cnlNumber for each non-zero note in step 12k-1. A note off message is sent for absoluteKeyNumber to originalOut output channel per channel number and bass setting in step 12k-2. Then the keyOnFlg is cleared and the notes are cleared in step 12k-3.

The service CorrectKey() is called in response to a change in the current chord or scale while the key is on (keyOnFlg=1). This enables the key to correct the notes it has sent out for the new chord or scale. There are four different correction modes (see description for correctionMode attribute above). In the normal correction mode (correctionMode=0), this service behaves exactly as RespondToKeyOn() with one exception. If a new note to be turned on is already on, it will remain on. It therefore does not execute the same identical initialization sequence (FIG. 12b) in this mode. It first determines the notes to play (as per RespondToKeyOn() service) and then turns of only those notes that are not already on and then turns on any new notes. The solo correction modes (correctionMode=1, 2, or 3) takes this a step further. It turns off only those notes that are not in the new current chord (correctionMode=1), scale (correctionMode=2) or combined chord and scale (correctionMode=3). If a note that is already on exists anywhere in the current chord, scale or combined chord and scale it will remain on. The current chord objects service is NoteInChord() and the current scale objects services isNoteInScale and is NoteInCombinedScale() are used to determine if each note already on should be left on or turned off.

When in solo mode (correctionMode=1, 2, or 3), the original key (absKeyNum) that will be output to a unique channel, as shown in step 12i-4 of FIG. 12i. The output channel is determined by adding the correction mode multiplied by 9 to the channel determined in 12i-4. For example, if correctionMode is 2 then 18 is added to the channel number determined in step 12i-4. This allows the software to determine the correction mode when the original performance is played back.

Step 12b-2 of FIG. 12b decodes the correctionMode and channel number. The original key channels are local to the software and are not MIDI channels, as MIDI is limited to 16 channels.

The services SetMode(), SetCorrectionMode() and SetNumBlkNotes() set the mode, correctionMode and numBlkNotes attributes respectively using simple assignment (example: mode=newMode).

FIG. 13 and Table 14

The BlackMelodyKey object is responsible for handling all black melody key events. This involves, depending on mode, getting notes from the current scale object and/or chord inversion object and sending the notes out.

The class attributes for this object include mode, which may be set to one of Normal=0, RightHandChords=1 or Scale3rds=2. The attribute correctionMode controls how the service CorrectKey behaves and may be set to either Normal=0 or SoloChord=1, SoloScale=2, or SoloCombined=3. The class attribute octaveShiftSetting is set to the number of octaves to shift the output. Positive values shift up, negative shift down. Instance variables include absoluteKeyNum and colorKeyNum and octave (see FIG. 2). The attribute destChannel holds the destination channel for the key on event. keyOnFlag indicates whether the Key in pressed or not. Velocity holds the velocity the key was pressed with and note[4] holds the notes that were sounded (if any).

TABLE 14

| PianoKey::BlackMelodyKey Attributes and Services |
|---|
| Class Attributes: |
| 1. mode |
| 2. correctionMode |
| octaveShiftSetting |
| Instance Attributes: |
| 1. absoluteKeyNum |
| 2. colorKeyNum |
| 3. octave |
| 4. destChannel |
| 5. keyOnFlag |
| 6. velocity |
| 7. note[4] |
| octaveShiftApplied |
| Services: |
| 1. ResondToKeyOn(sourceChannel, velocity); |
| 2. RespondToKeyOff(sourceChannel); |
| 3. CorrectKey( ); |
| 4. SetMode(newMode); |
| 5. SetCorrectionMode(newCorrectionMode); |
| SetOctaveShift(numberOctaves); |

FIGS. 13a through 13f shows a flow diagram for the RespondToKeyOn() service. This service is called in response to the black melody key being pressed. It is responsible for generating the note(s) to be sounded. It is entered with the velocity of the key press and the channel the key was received on. It starts by initializing itself in step 13a-1, as described below. Next, it branches to a specific sequence that is dependent on the mode in step 13a-2. These specific sequences generate the notes. It finishes by outputting the generated notes in step 13a-3.

Figure 13A:
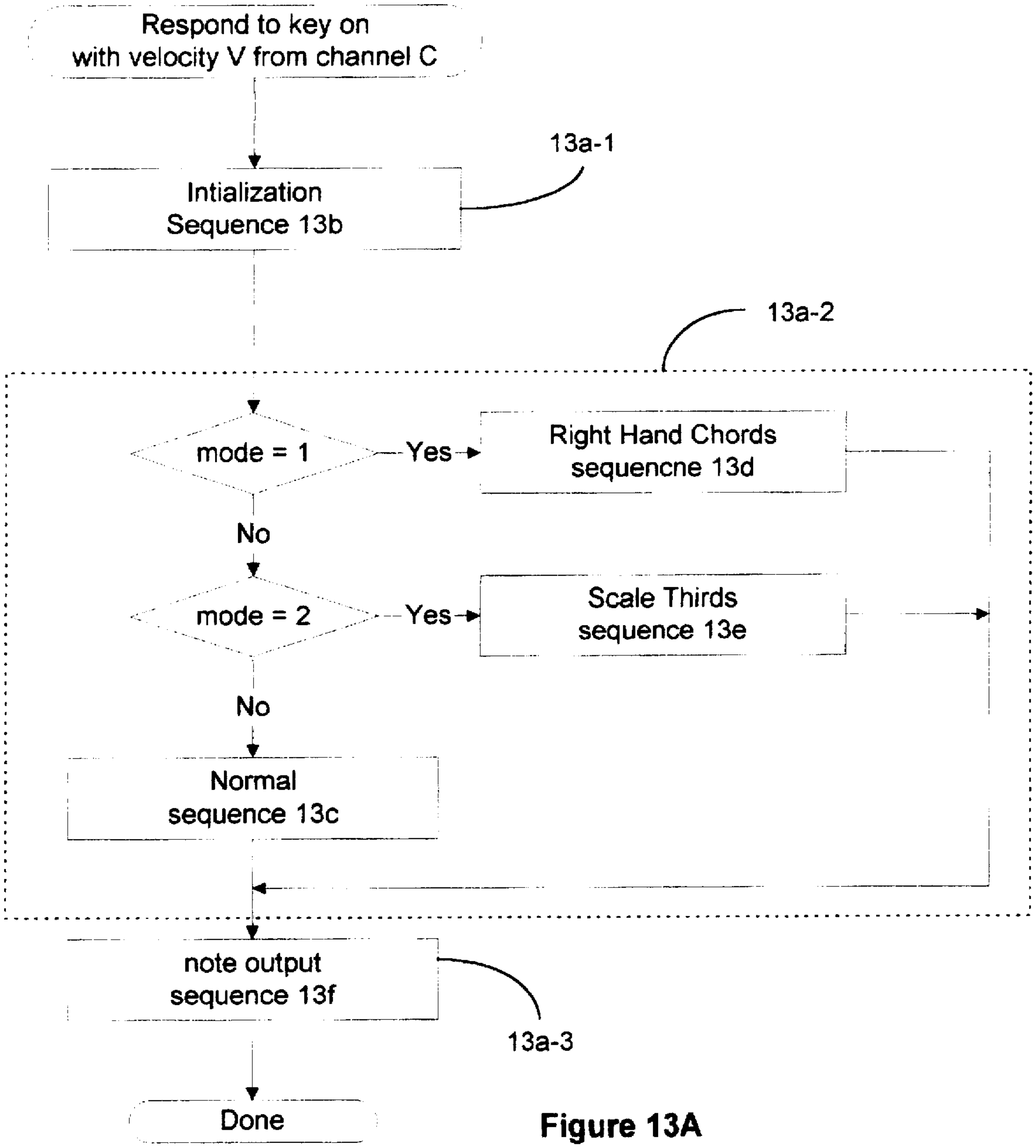
FIGS. 13*a* through 13*f* together are a logic flow diagram of the PianoKey::MelodyKey objects 'Respond To Key On' service.
Figure 13B:
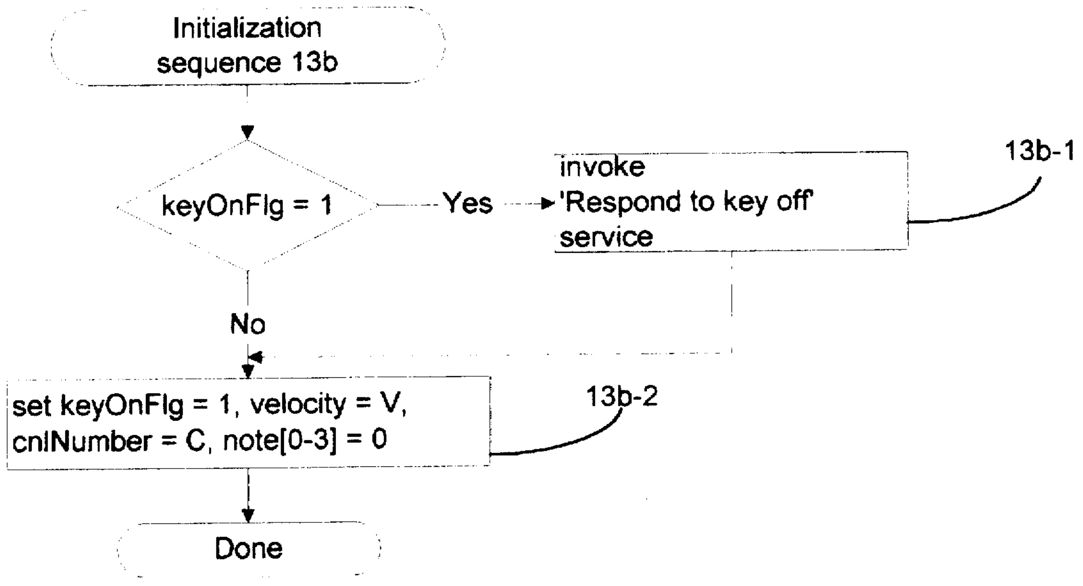

The initialization sequence, shown in FIG. 13b, first checks if the key is already pressed. If it is (keyOnFlg=1), the service 'RespondToKeyOff()' service will be called in step 13b-1. Then, keyOnFlg is set to 1, indicating the key is pressed, the velocity and destCnl attributes are set and the notes are cleared by being set to 0 in step 13*b*-2.

Figure 13F:
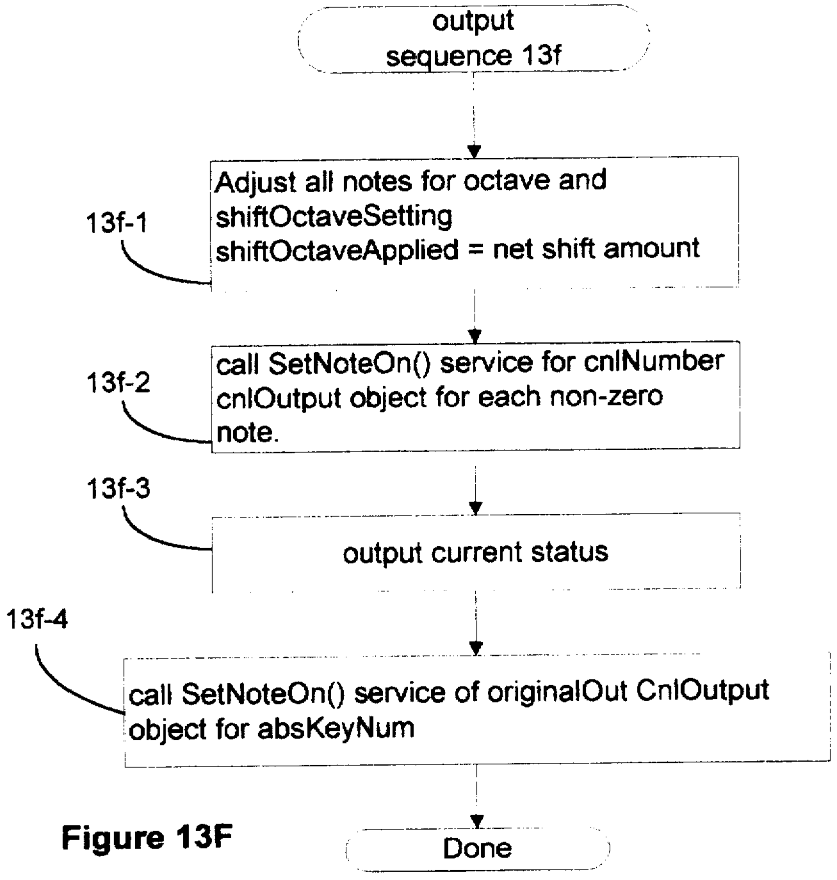
Figure 13C:
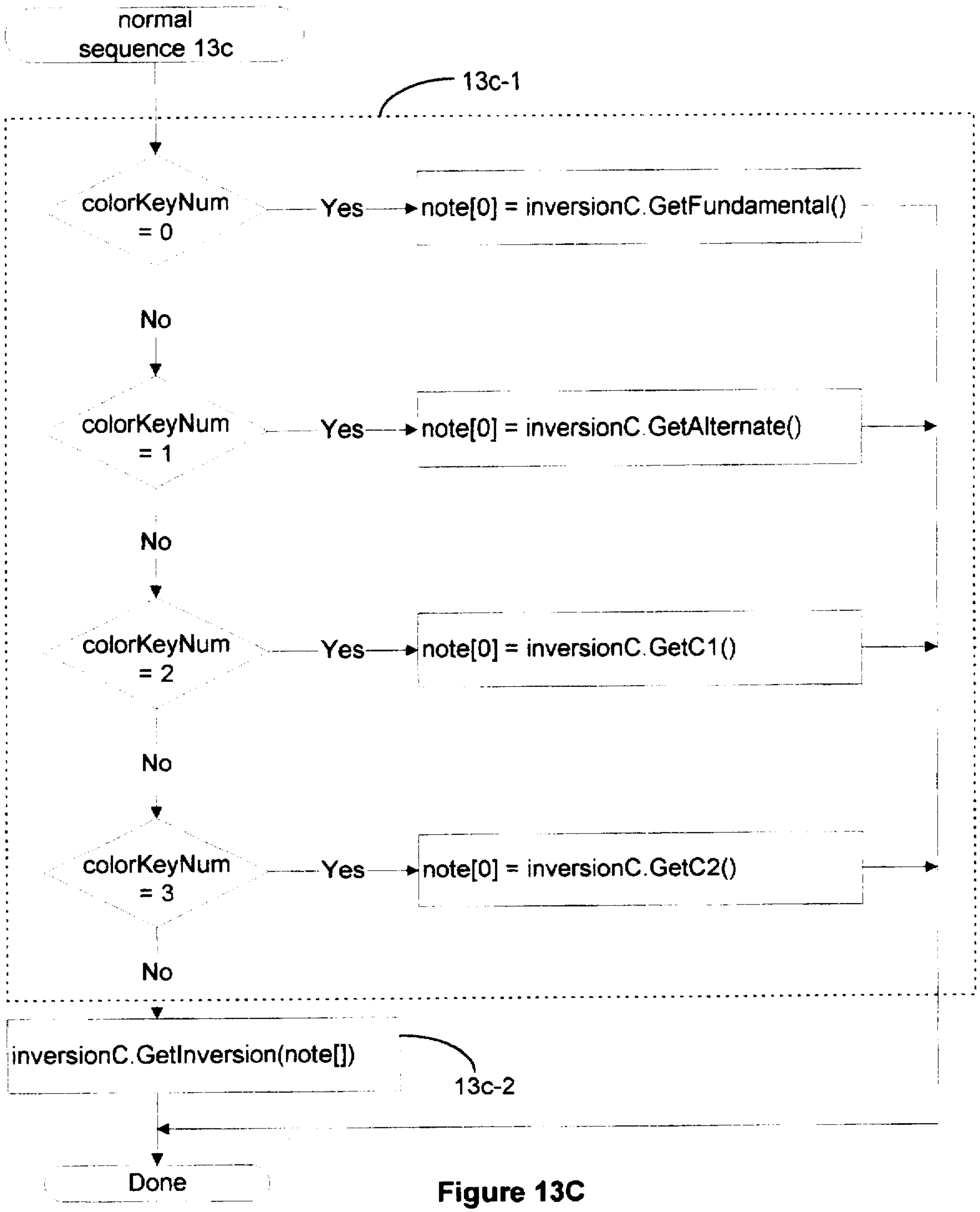

FIG. 13*c* shows a flow diagram of the normal (mode=0) sequence. The note(s) played depends on which black key it is (colorKeyNum). Black (colorKeyNum) keys 0, 1, 2, and 3 get the fundamental, alternate, C1 and C2 note of inversionC, respectively as simply diagrammed in the sequence 13*c*-1 of FIG. 13C. Black (colorKeyNum) key 4 gets the entire chord by calling the GetInverion() service of inversionC (13*c*-2).

Figure 13D:
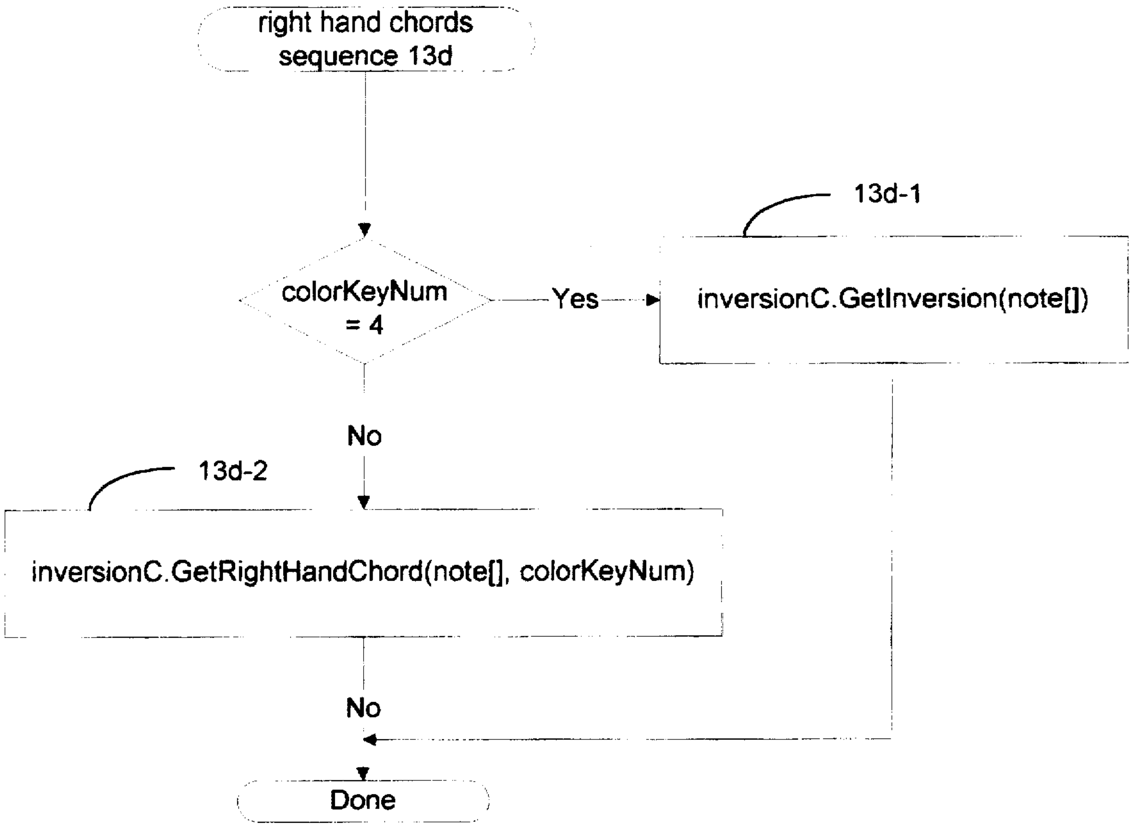

FIG. 13*d* shows a flow diagram of the right hand chords (mode=1) sequence. If the colorKeyNum attribute is 4 (meaning this is the 5th black key in the octave), then the current chord in the current inversion of inversionC is fetched and played in step 13*d*-1. Black keys 0 through 3 will get right hand chords 1 through 4 respectively.

Figure 13E:
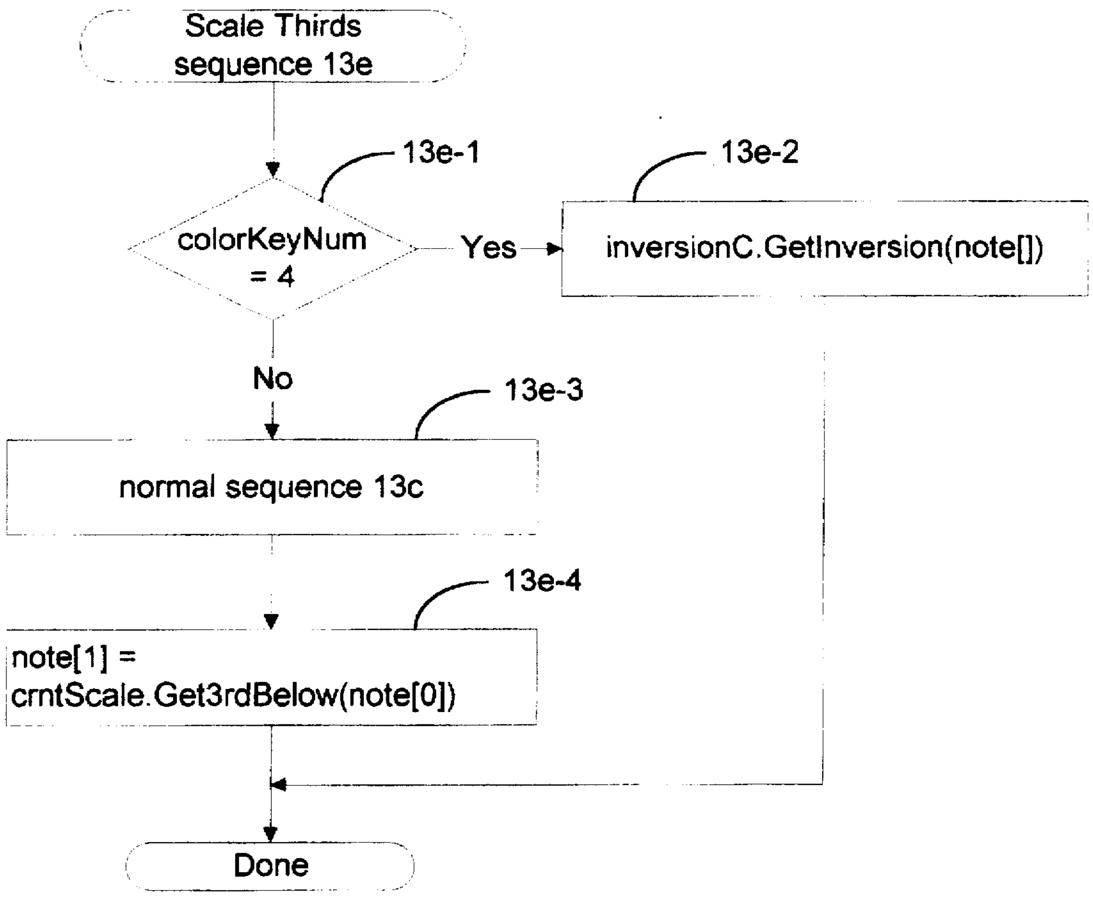

FIG. 13*e* shows a flow diagram of the scale thirds (mode=2) sequence. 13*e*-1 checks if this is the 5th black key (colorKeyNum=4). If it is, the 13*e*-2 will get the entire chord from inversionC object. If it is not the 5th black key, then the normal sequence shown in FIG. 13*c* is executed (13*e*-3). Then the note one scale third below note[0] is fetched from the current scale object (13*e*-4).

FIG. 13*f* shows a flow diagram of the output sequence. This sequence includes adding the bass offset to each note and adjusting each note for the octave of the key pressed and the octaveShiftSetting attribute in step 13*f*-1. The net shift is stored in octaveShiftApplied. Next, each non-zero note is output to the compOut instance of the CnlOutput object in step 13*f*-2. The current status is also sent out to channel 2 in step 13*f*-3 (see Table 17). Finally, the original note (key) is output to the proper channel in step 13*f*-4.

The service RespondToKeyOff() sends note offs for each note that is on. It is identical the flow diagram shown in FIG. 12*k*.

The service CorrectKeyOn() is called in response to a change in the current chord or scale while the key is on (keyOnFlg=1). This enables the key to correct the notes it has sent out for the new chord or scale. There are four different correction modes (see description for correctionMode attribute above).

In the normal correction mode (correctionMode=0), this service behaves exactly as RespondToKeyOn() with one exception. If a new note to be turned on is already on, it will remain on. It therefore does not execute the same identical initialization sequence (FIG. 13*b*) in this mode. It first determines the notes to play (as per RespondToKeyOn() service) and then turns off only those notes that are not already on and then turns on any new notes. The solo correction modes (correctionMode=1, 2, or 3) takes this a step further. It turns off only those notes that are not in the new current chord (correctionMode=1), scale (correctionMode=2) or combined chord and scale correctionMode=3). If a note that is already on exists any wherein the current chord, scale or combined chord and scale it will remain on. The current chord objects service isNoteInChordo and the current scale objects services isNoteInScale and isNoteInCombinedScale() are used to determine if each note already on should be left on or turned off. The output channel for the original key is determined as for the while melody key as described above. It should be noted that all note correction methods described by the present invention are illustrative only, and could easily be expanded to allow note correction based on any single note, such as chord fundamental or fifth, or any note group.

The services SetMode() and SetCorrectionMode() set the mode and correctionMode attributes respectively using simple assignment (example: mode=newMode).

Table 15

Since the black chord progression keys play non-scale chords, they are seldom used in music production. These keys become more useful as a control (function) key or toggle switches that allows the user to easily and quickly make mode and configuration changes on the fly. Note that any key can be used as a control key, but the black chord progression keys (non-scale chords) are the obvious choice. The keys chosen to function as control keys are simply instantiated as the desired key type (as are all the other key types). The present invention uses 4 control keys. They are piano keys with absKeyNum of 49, 51, 54 and 56. They have three services, RespondToKeyOn(), RespondToProgramChange and RespondToKeyOff(). Presently, the RespondToKeyOff() service does nothing (having the service provides a consistent interface for all piano key objects, relieving the music administrator object 3-3 from having to treat these keys differently from other keys. The RespondToKeyOn() service behaves as follows. Key 49 calls config.setSongKeyBank(), key 51 calls config.SongKeyBank(1), key 54 calls config.SetScaleBank (0), and key 56 calls config.SetScaleBank(1). Note that these same functions can be done via the user interface. A program change equal to the absKeyNum attribute is also output as for the chord progression keys (see 10-16). The service RespondToProgramChange() service is identical to the RespondToKeyOn() service. It is provided to allow received program changes (patch triggers) to have the same controlling effect as pressing the control keys.

TABLE 15

| PianoKey::ControlKey Attributes and Services |
|---|
| Attributes: |
| 1. absKeyNum |
| Services: |
| 1. RespondToKeyOn(sourceChannel, velocity); |
| 2. RespondToKeyOff(sourceChannel) |
| 3. RespondToProgramChange(sourceChannel); |

FIGS. 14*a*, 14*b*, 14*c*, 14*d* and 14*e* and Table 16

There is one instance of the music administrator object called musicAdm 3-3. This is the main driver software for the present invention. It is responsible for getting music input from the music input object 3-4 and calling the appropriate service for the appropriate piano key object 3-6. The piano key services called will almost always be RespondToKeyOn() or RespondToKeyOff(). Some music input may be routed directly to the music output object 3-12. Table 16 shows the music administrators attributes and services. Although the description that follows assumes there are 16 input channels, the description is applicable for any number of input channels. All attributes except melodyKeyFlg[16][128] are user setable per user preference. The attribute mode applies to all input channels and may be either off (0) or on (1). The array chordKeyFlg[60] is an array of flags that indicate which melody keys are on (flag=1) and which are off (flag=0). The array melodyKeyFlg[168][128] is an array of flags that indicate which melody keys are on (flag=1) and which are off (flag=0). The array holds 128 keys for each of 16 input channels. The cnlMode[16] attribute holds the mode for each of 16 input channels. This mode may be one of normal, bypass or off. If cnlMode[y] =bypass, then input from channel y will bypass any processing and be heard like a regular keyboard. If cnlMode[x] =off, then input from channel x will be discarded or filtered out. The attribute firstMldyKey[16] identifies the first melody key for each input channel. FirstMldyKey[y] =60 indicates that for channel y, keys 0–59 are to be interpreted as chord progression keys and keys 60–127 are to be interpreted as melody keys. FirstMldyKey[x] =0 indicates that channel x is to contain only melody keys and firstMldyKey[z]=128 indicates that channel z is to contain only chord progression keys. The attribute chordProcCnl[16] and mldyProcCnl[16] identify the process channel for an input channels chord progression keys and melody keys respectively. This gives the user the ability to map input to different channels, and/or to combine input from 2 or more channels and to split the chord and melody keys to 2 different channels if desired. By default, the process channels are the same as the receive channel. The chord progression keys are pianoKeys 0 through 59 and the melody keys are pianoKeys 60 through 127 (melodyKeyFlg[0] is for pianoKey[60]).

TABLE 16

| Music Administrator Objects Attributes and Services |
|---|
| Attributes: |
| 1. mode |
| 2. melodychordKeyFlg[16][60128] |
| 3. cnlMode[16]melodyKeyFlg[68] |
| firstMldyKey[16] |
| chordProcCnl[16] |
| mldyProcCnl[16] |
| Services: |
| 1. Update( ); |
| 2. SetMode(newMode); |
| SetCnlMode(cnlNum, newMode); |
| SetFirstMldyKey(cnlNum, keyNum); |
| SetProcCnl(cnlNum, chordCnl, mldyCnl); |
| 3. CorrectKeys( ); |

The service SetMode(x), called by the user interface object 3-2, simply sets the mode attribute to x. The service SetCnlMode(x, y) sets attribute cnlMode[x] to y. SetFirstMldyKey(x, y) sets firstMldyKey[x] to y and the service SetProcCnl(x, y, z) sets attribute chordProcCnl[x] to y and attribute mldyProcCnl[x] to z. The above services are called by the user interface object 3-2.

The Update() service is called by main (or, in some operating systems, by the real time kernel or other process scheduler). This service is EasyPlayeasy composers main execution thread. FIGS. **14*a* through 14*de* show a flow diagram of this service. It first checks if there is any music input received in step 14*a*-1 and does nothing if not. If there is input ready, step 14*a*-2 gets the music input from the music input object 3-4. This music input includes the key number (KeyNum in FIG. 14*a* through 14*d*), the velocity of the key press or release, the channel number (cnl in FIG. 14**) and whether the key is on (pressed) or off (released).

If mode attribute is off (mode=0) then the music input is simply echoed directly to the output in step **14*a*-4 with the destination channel being specified by the attribute mldyProcCnl[rcvCnl]. There is no processing of the music if mode is off. If mode is on (mode=1), then the receiving channel is checked to see if it is in bypass mode in step 14*a*-5. If it is, then the output is output in step 14*a*-4 without any processing. If not in bypass mode, then step 14*a*-6 checks if the channel is off. If it is off then execution returns to the beginning. If 14*b*-1 is on execution proceeds with the flow diagram shown in FIG. 14*b*. Step 14*b*-1** checks if the input channel of the received music is valid. If not valid, execution returns to the beginning (U1), to process the next music input (if any). This service does not return until there is no more music input waiting to be processed.

Figure 14A:
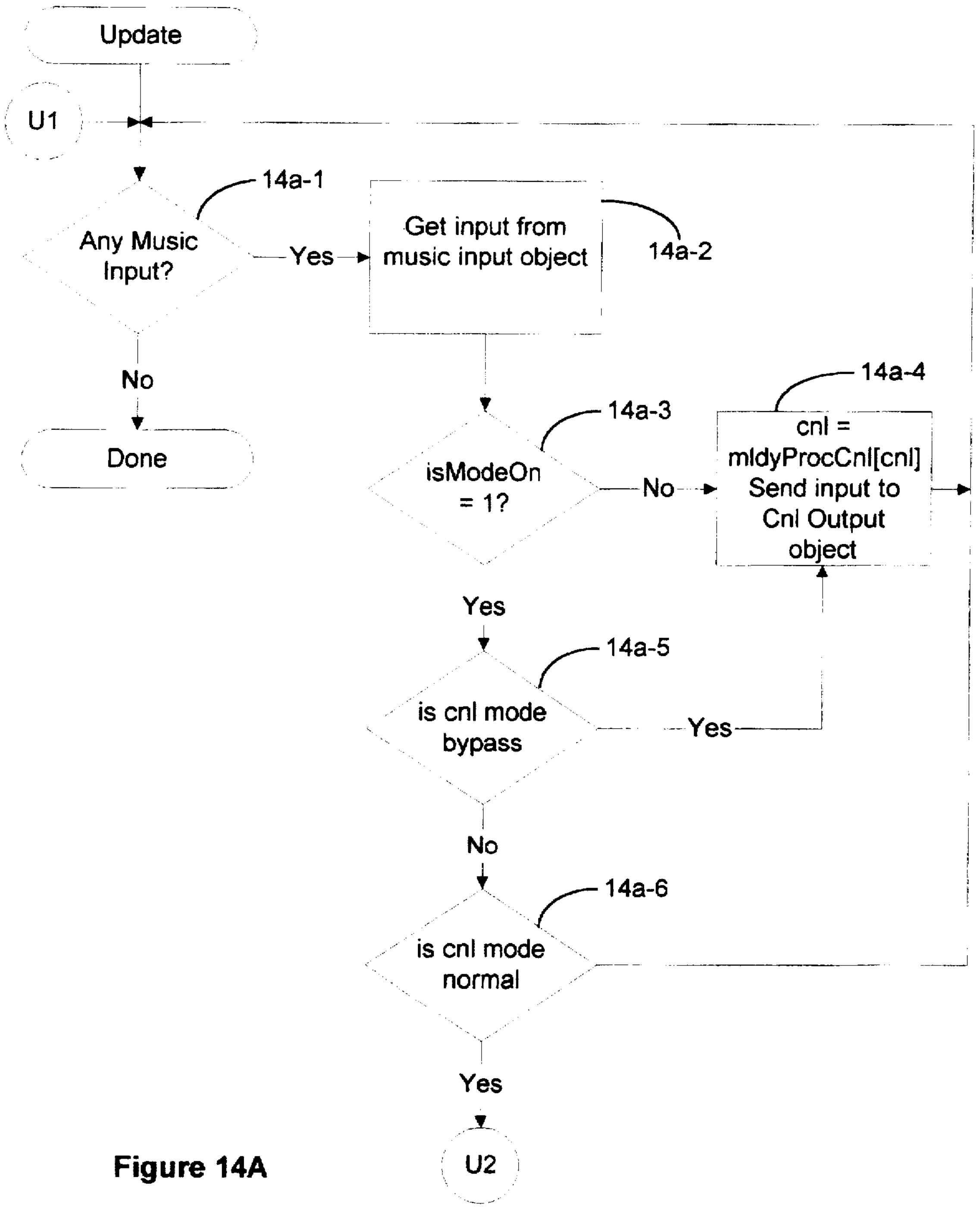
FIGS. 14*a* through 14*d* together are a logic flow diagram of Music Administrator objects 'Update' service.
Figure 14B:
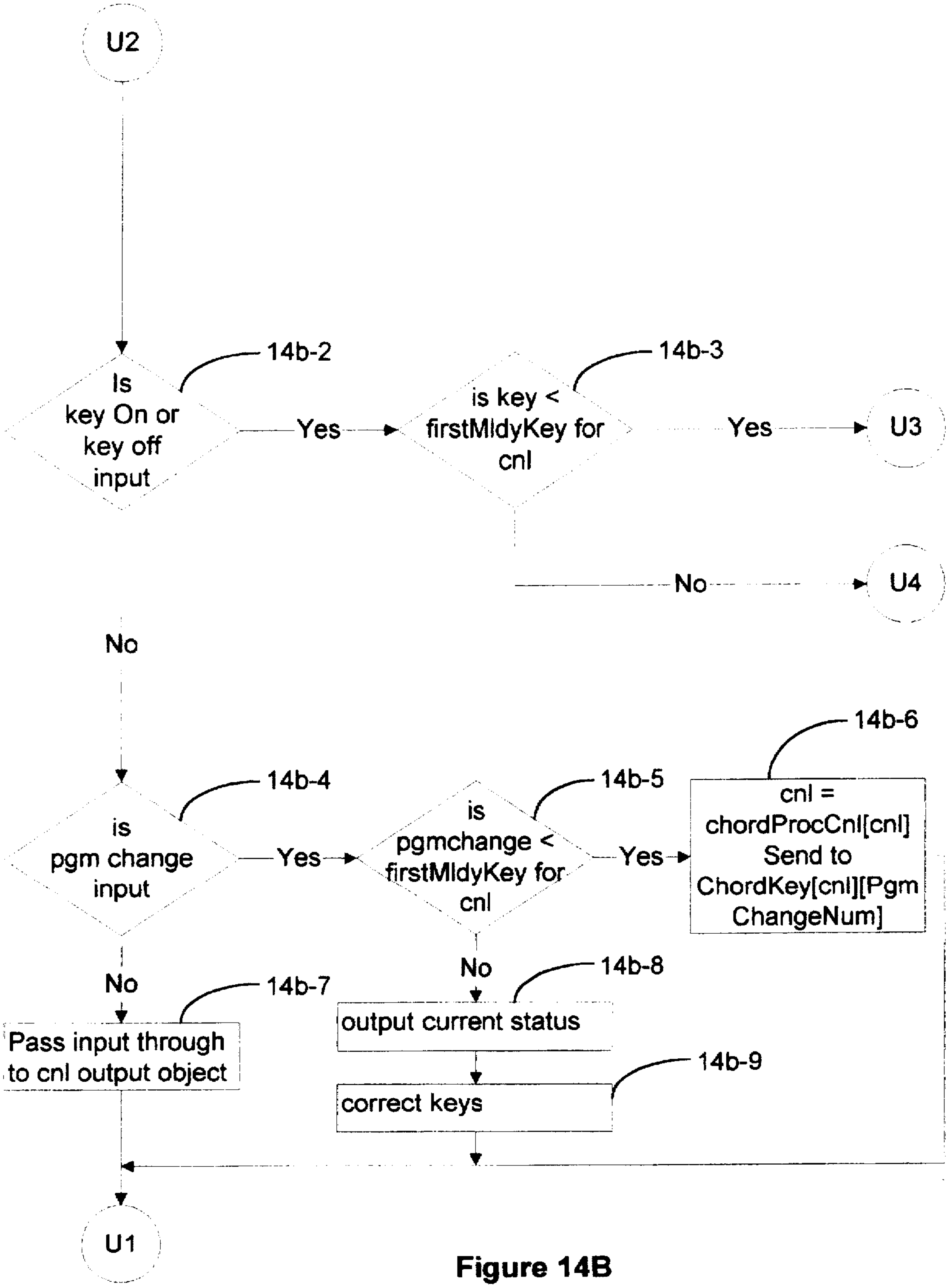
Figure 14C:
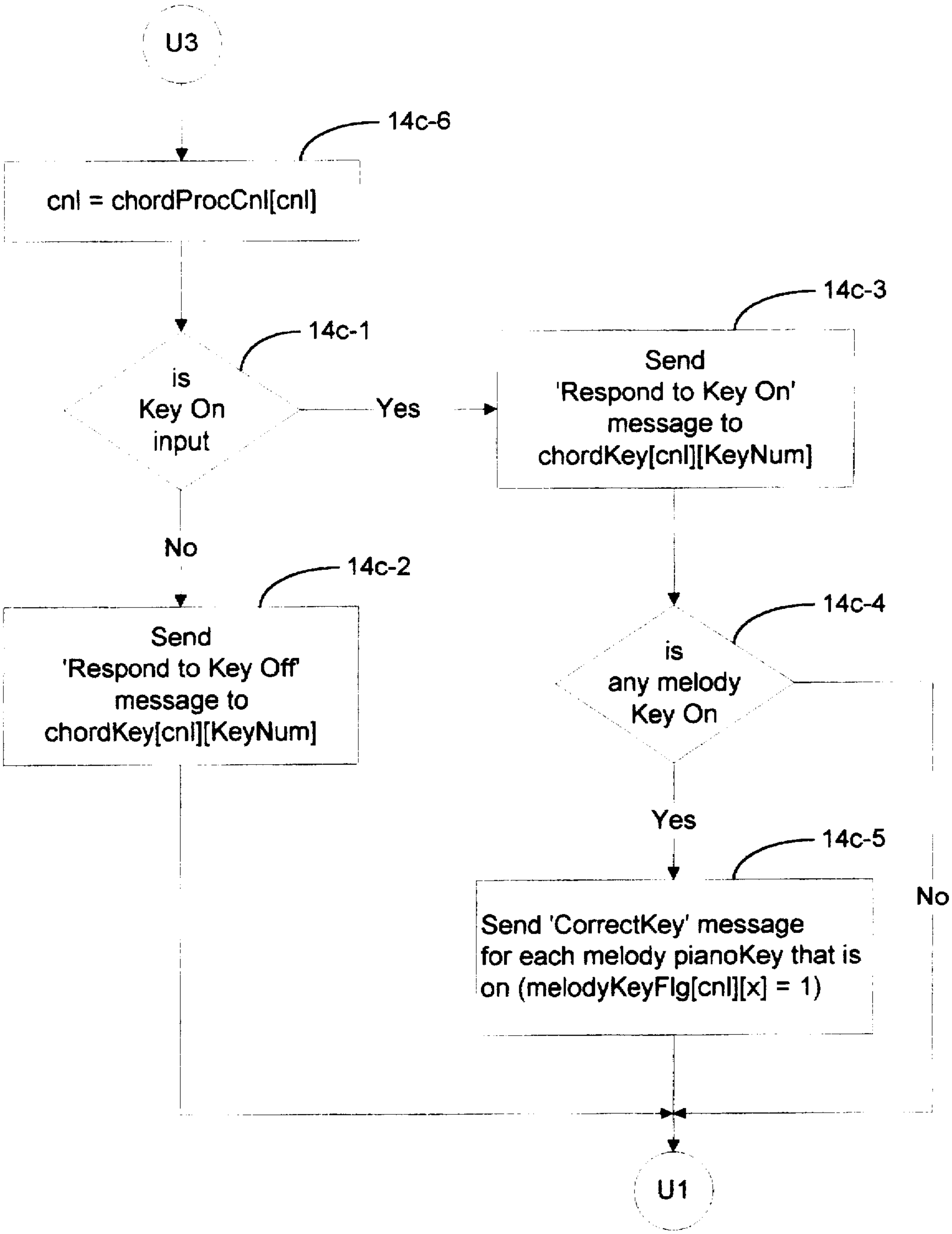
Figure 14D:
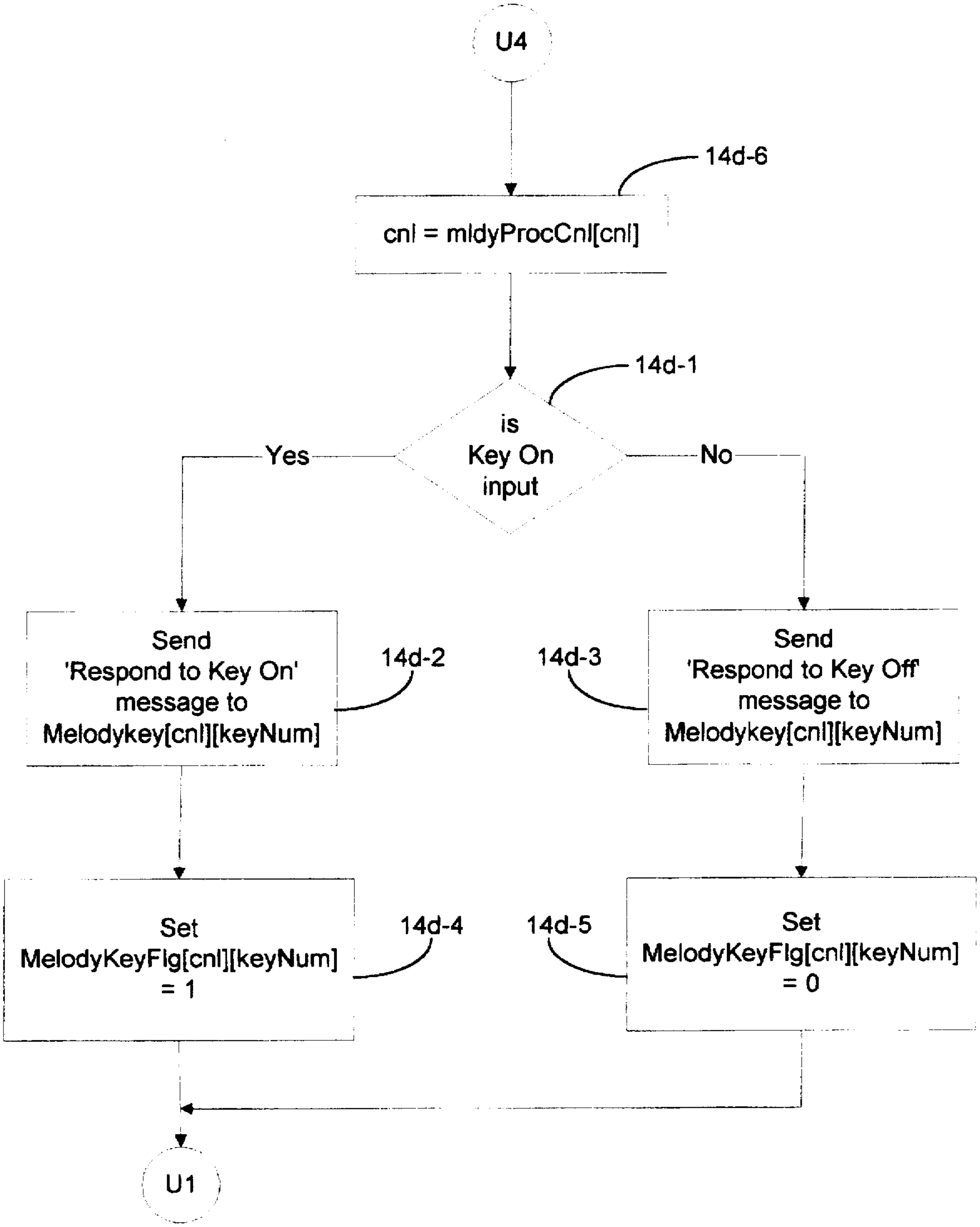

If the input is from a valid channel then Step **14*b*-2 checks if it is a key on or off message. If it is, then step 14*b*-3 checks if it is a chord progression key (keys<firstMldyKey[cnl]60) or a melody key (>=firstM1dyKey[cnl]). Processing of chord progression keys proceeds with U3 (FIG. 14*c*) and processing of melody keys proceeds with U4 (FIG. 14*d*). If it is not a key on/off message then step 14*b*-4 checks if it is a program change (or patch trigger). If it is not then it is a pitch bend or other MIDI message and is sent unprocessed to the output object by step 14*b*-7, after which it returns to U1 to process the next music input. If the input is a patch trigger then step 14*b*-5 checks if the patch trigger is for a chord progression key indicated by the program number being <firstM1dyKey[cnl]less than 60. If it is not, then the patch trigger is sent to the current status object in step 14*b*-8 by calling the RcvStatus(patchTrigger) service (see Table 17) and then calling the CorrectKey() service (14*b*-9), followed by returning to U1**.

If the patch trigger is for a chord progression key less than 60, then step **14*b*-6** calls the RespondToProgramChange() service of the pianochordKey of the same number as the patch trigger after changing the channel number to that specified in the attribute chordProcCnl[rcvCnl] where rcvCnl is the channel the program change was received on. Execution then returns to U1 to process the next music input.

Referring to FIG. **14*c*, step 14*c*-6 changes the channel (cnl in FIG. 14) to that specified by the attribute chordProcCnl [cnl]. Next, step 14*c*-1 checks if the music input is a key on message. If it is not, step 14*c*-2 calls the RespondToKeyOff() service of the key. If it is, step 14*c*-3 calls the RespondToKeyOn() service. After the KeyOn service is called, steps 14*c*-4 and 14*c*-5** call the CorrectKey() service of any melody key that is in the on state, indicated by melodyKeyFlg[cnl][pianoKey number]=1. Processing then proceeds to the next music input.

Referring to FIG. **14*d*, step 14*d*-6 changes the channel (cnl in FIG. 14) to that specified by the attribute mldyProcCnl[cnl]. Next, step 14*d*-1 checks if the melody key input is a Key On message. If it is, then step 14*d*-2 calls the RespondToKeyOn() service of the specified melody key. This is followed by step 14*d*-4 setting the melodyKeyFlg [cnl][key] to 1 indicating that the key is in the on state. If the music input is a key off message, then step 14*d*-3 calls the RespondToKeyOff() service and step 14*d*-5** clears the melodyKeyflg[cnl][key] to 0. Execution then proceeds to U1 to process the next input.

In the description thus far, if the user presses more than one key in the chord progression section, all keys will sound chords, but only the last key pressed will assign (or trigger) the current chord and current scale. It should be apparent that the music administrator object could be modified slightly so that only the lowest key pressed or the last key pressed will sound chords.

The CorrectKeys() service is called by the user interface in response to the song key being changed or changes in chord or scale assignments. This service is responsible for calling the CorrectKey() services of the chord progression key(s) that are on followed by calling the CorrectKey() services of the black and white melody keys that are on.

Table 17

Table 17 shows the current status objects attributes and services. This object, not shown in FIG. 3, is responsible for sending and receiving the current status which includes the song key, the current chord (fundamental and type), the current scale (root and type), and also the current chord inversion, if preferred. The current note group setup, and the current octave setting identifier, and an identifier which indicates a performance as a melody section performance or chord section performance, could also be sent and stored with each original and/or \processed performance track. The current note group setup of the instrument, and the melody section performance/chord section performance identifiers can be used to cause system to setup correctly in real-time such as for use with the re-performance methods described herein. The current status message sent and received consists of 6 consecutive patch changes in the form 61, 1$aa$, 1$bb$, 1$cc$, 1$dd$ and 1$ee$, where 61 is the patch change that identifies the beginning of the current status message (patch changes 0–59 are reserved for the chord progression keys).

aa is the current song key added to 100 to produce 1$aa$. The value of aa is found in the song key attribute row of Table 2 (when minor song keys are added, the value will range from 0 through 23). bb is the current chord fundamental added to 100. The value of bb is also found in the song key attribute row of Table 2, where the number represents the note in the row above it. cc is the current chord type added to 100. The value of cc is found in the Index column of Table 4. dd is the root note of the current scale added to 100. The value of dd is found the same as bb. ee is the current scale type added to 100. The possible values of ee are found in the Index column of Table 6a.

The attributes are used only by the service RcvStatus() which receives the current status message one patch change at a time. The attribute state identifies the state or value of the received status byte (patch change). When state is 0, RcvStatus() does nothing unless statusByte is 61 in which case is set state to 1. The state attribute is set to 1 any time a 61 is received. When state is 1, 100 is subtracted from statusByte and checked if a valid song key. If it is then it is stored in rcvdSongKey and state is set to 2. If not a valid song key, state is set to 0. Similarly, rcvdChordFund (state=2), rcvdChordType (state=3), rcvdScaleRoot (state=4) and rcvdScaleType (state=5) are sequentially set to the status byte after 100 is subtracted and value tested for validity. The state is always set to 0 upon reception of invalid value. After rcvdScaleType is set, the current song key, chord and scale are set according to the received values and state is set to 0 in preparation for the next current status message.

The service SendCurrentStatus() prepares the current status message by sending patch change 61 to channel 2, fetching the song key, current chord and current scale values, adding 100 to each value and outputting each to channel 2.

TABLE 17

| Current Status Objects Attributes and Services |
|---|
| Attributes: |
| 1. state |
| 2. rcvdSongKey |
| 3. rcvdChordFund |
| 4. rcvdChordType |
| 5. rcvdScaleRoot |
| 6. rcvdScaleType |
| Services: |
| 1. SendCurrentStatus( ); |
| 2. RcvStatus(statusByte); |

Alternatively, the current status message could be simplified to identify only which chord, scale, and song key bank (of the configuration object) is selected, rather than identifying the specific chord, scale, and song key. In this case, 61 could be scale bank 1, 62 scale bank 2, 36 chord group bank 1, 63 song key bank 1, 64 song key bank 2, etc. The RcvStatus() service would, after reception of each patch trigger, would call the appropriate service of the configuration object, such as SetScaleBank(1 or 2). However, if the configuration has changed since the received current status message was sent, the resulting chord, scale, and song key may be not what the user expected. It should be noted that all current status message triggers as well as patch triggers described herein could be output during performance from both the chord section's input controllers, as well as from the melody section's input controllers.

Table 18

There is one music input object musicIn 3-4. Table 18 shows its attributes and services. This is the interface to the music input hardware.

The low level software interface is usually provided by the hardware manufacturer as a 'device driver'. This object is responsible for providing a consistent interface to the hardware "device drivers" of many different vendors. It has five main attributes. keyRcvdFlag is set to 1 when a key pressed or released event (or other input) has been received. The array rcvdKeyBuffer[] is an input buffer that stores many received events in the order they were received. This array along with the attributes bufferHead and bufferTail enable this object to implement a standard first in first out (FIFO) buffer. The attribute ChannelMap[64] is a table of channel translations. ChannelMap[n]=y will cause data received on channel n to be treated as if received on channel y. This allows data from two or more different sources to combined on a single channel if desired.

The services include isKeyInputRcvd() which returns true (1) if an event has been received and is waiting to be read and processed. GetMusicInput() returns the next event received in the order it was received. The InterruptHandler() service is called in response to a hardware interrupt triggered by the received event. The MapChannelTo(inputCnl, outputCnl) service will set ChannelMap[inputCnl] to outputCnl. The use and implementation of the music input object is straight forward common. Normally, all input is received from a single source or cable. For most MIDI systems, this limits the input to 16 channels. The music input object 3-4 can accommodate inputs from more than one source (hardware device/cable). For the second, third and fourth source inputs (if present), the music input object adds 16, 32 and 48 respectfully to the actual MIDI channel number. This extends the input capability to 64 channels.

TABLE 18

| Music Input Objects Attributes and Services |
|---|
| Attributes: |
| 1. keyRcvdFlag |
| 2. rcvdKeyBuffer[n] |
| channelMap[64] |
| 43. bufferHead |
| 54. bufferTail |
| Services: |
| 1. isKeyInputRcvd( ); keyRcvdFlag |
| 2. GetMusicInput( ); rcvdKeyBuffer[bufferTail] |
| 3. InterruptHandler( ) |
| MapChannelTo(inputCnl, outputCnl); |

Table 19

There is one music output object musicOut 3-12. Table 19 shows its attributes and services. This is the interface to the music output hardware (which is usually the same as the input hardware). The low level software interface is usually provided by the hardware manufacturer as a 'device driver'. This object is responsible for providing a consistent interface to the hardware 'device drivers' of many different vendors.

The musicOut object has three main attributes. The array outputKeyBuffer[] is an output buffer that stores many notes and other music messages to be output This array along with the attributes bufferHead and bufferTail enable this object to implement a standard first in first out (FIFO) buffer or output queue.

The service OutputMusic() queues music output. The InterruptHandler() service is called in response to a hardware interrupt triggered by the output hardware being ready for more output. It outputs music in the order is was stored in the output queue. The use and implementation of the music output object is straight forward and common. As with the music input object 3-4, the music output object 3-12 can accommodate outputting to more than one physical destination (hardware device/cable). Output specified for channels 1-16, 17-32, 33-48 and 49-64 are directed to the first, second, third and fourth destination devices respectfully.

Figure 1D:
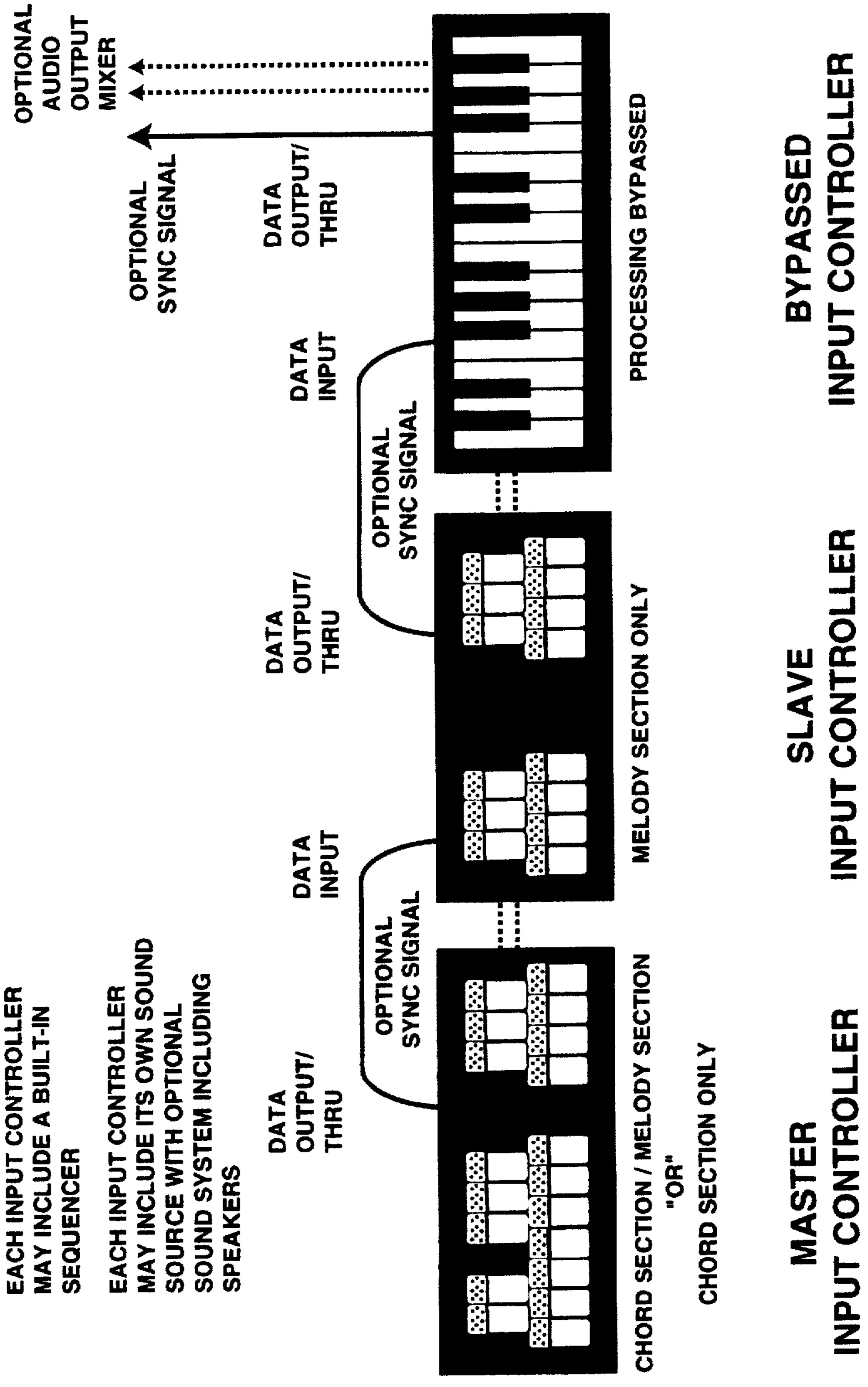
FIG. 1D is a general overview of one embodiment using multiple instruments synchronized or daisy-chained together for simultaneous performance.
Figure 1E:
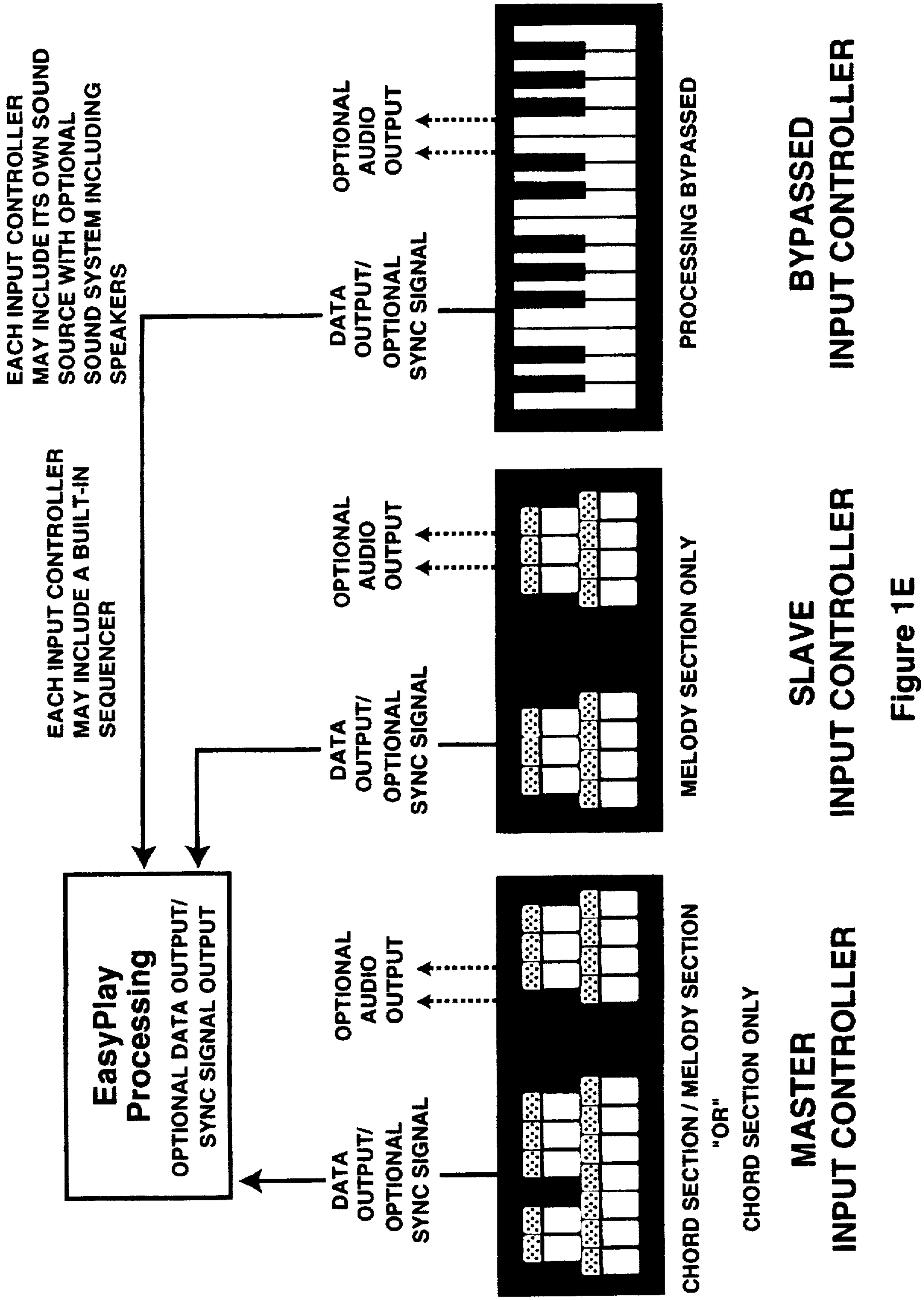
FIG. 1E is a general overview of one embodiment in which multiple instruments are used together with an external processor for simultaneous performance.
Figure 1F:
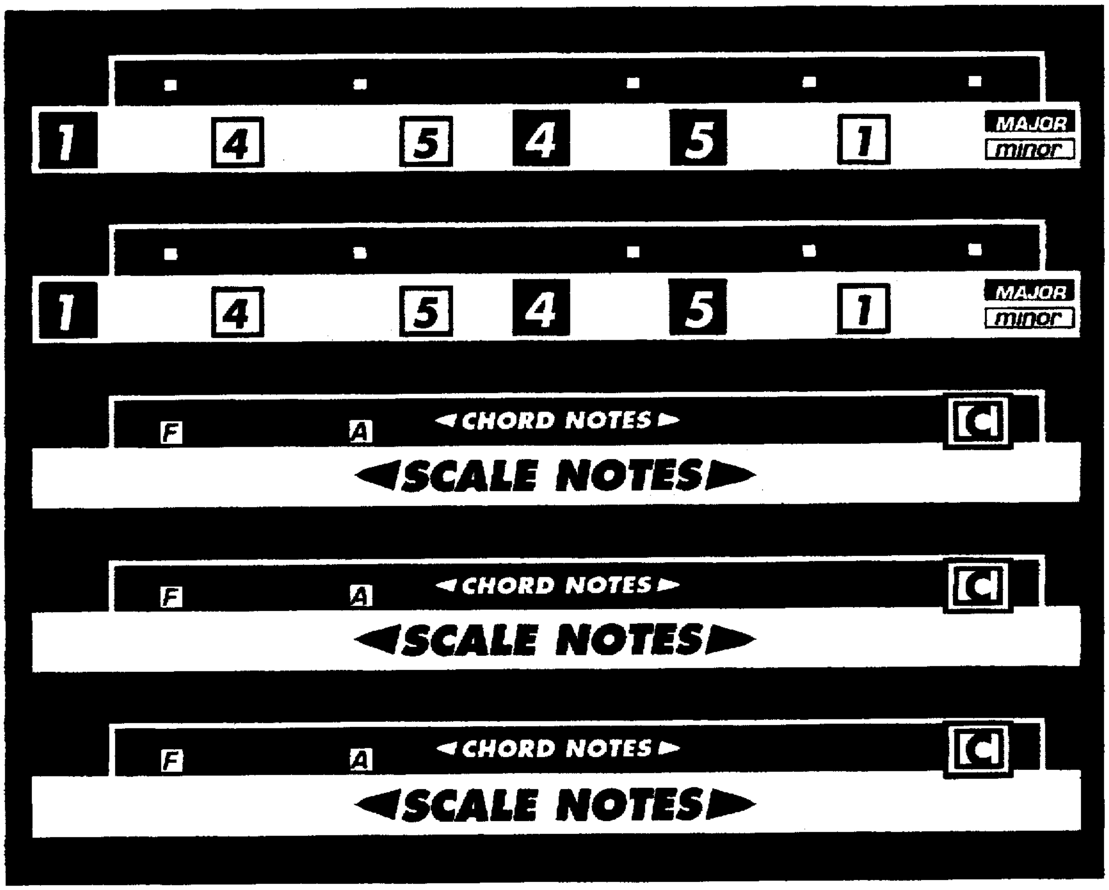
FIG. 1F is one sample of a printed indicator system which can be attached or placed on the instrument.

FIG. 1D depicts one embodiment of the present invention in which multiple instruments are synchronized or daisy-chained together form simultaneous recording and/or playback. Each input controller may include its own built-in sequencer, music processing software, sound source, sound system, and speakers. Two or more sequencers can be synchronized or locked together during recording and/or playback using MTC (MIDI time code), SMPTE, or other forms of sync. Methods of synchronization are well known in the art, and are fully described in numerous MIDI related textbooks, as well as in MIDI Specification 1.0. The configuration shown provides the advantage of allowing each user to record performance tracks and/or trigger tracks on their own instrument's sequencer. The sequencers will stay locked during both recording and/or playback allowing users to record additional performance tracks on their own instrument's sequencer, while staying in sync with the other instruments. The slave instruments can be controlled by data representative of chord changes, scale changes, current song key, setup configuration, etc. being output from the master instrument or instruments. This information can optionally be recorded on a sequencer track of one or more slave or bypassed instruments, allowing a user to finish a work-in-progress later, possibly on his own, without requiring the master instrument's recorded trigger track. Any one of the instruments can be designated as a master, slave, or bypassed instrument. If an instrument set to slave mode or bypassed mode contains a recorded trigger track, the track can be ignored, if needed, to be controlled by a master instrument. An instrument set to master mode which already contains a recorded trigger track, can automatically become a slave instrument to its own trigger track, thus allowing all input controllers on the instrument to be utilized for melody section performance. Processed and/or original performance data can be output from any instrument for purposes such as recording the performance data into another instrument's sequencer, or for outputting to a sound source. It can also be merged with processed and/or original performance data from other instruments for purposes such as recording all of the performance data into another instrument's sequencer, or for outputting all merged performance data from a single data output. Audio output can be output from instruments with an internal sound source, or the audio output from two or more instruments can be mixed, such as with a digital mixer, and then output from one instrument utilizing a D/A converter or digital output. FIG. 1E depicts another embodiment of the present invention in which multiple instruments are used together with an external processor for simultaneous recording and/or playback. Optional syncing may also be used to lock one or more of the instruments to the external processor. A variety of other combinations and configurations utilizing multiple instruments will become apparent to those of ordinary skill in the art.

TABLE 19

| Music Output Objects Attributes and Services |
|---|
| Attributes: |
| 1. outputKeyBuffer[n] |
| 2. bufferHead |
| 3. bufferTail |
| Services: |
| 1. OutputMusic(outputByte); |
| 2. InterruptHandler( ); |

Table 20

The present invention assigns chords to each key in the chord progression section enabling the user to play one finger chords and assign notes and scales to the melody section as previously described. While this is the preferred method, an added feature would be to allow the user to play the entire chord in the chord progression section. This requires the software to recognize the chord played in order to assign the proper notes and scales to the melody section. Table 20 gives the attributes and services of a chord recognition object that could be used for this purpose (chord recognition software is known in the art).

As each note is pressed in the chord progression section, the music administrator object 3-3 calls the SetNoteOn() service. As each note is released, the SetNoteOff() service is called. Both of these services return whether or not the new note on or off has resulted in a new valid chord being played in the chord progression section. The service isvalidChord() return true if the notes that are on in the chord progression section make up a valid chord. This service returns false if the notes do not make up a valid chord. The GetChord() service returns the cord type and fundamental of the most recent valid chord.

The attribute 'chordSingature' is a 12 bit binary number. Each bit represent a note in the chromatic scale. The number is initially set to 0 indicating all notes are off (no notes are played in chord progression section). When the SetNoteOn (noteNum) service is called, the bit for noteNum (regardless of octave) in chordSignature is set to 1. When the SetNoteOff(noteNum) service is called, the bit for noteNum is set to 0. In both cases, the new resulting chordSignature is then look up in a table of valid chord signatures, which identify the chord fundamental and type. If the chordSignature is found, then lastValidSignature is set equal to chordSignature. The table of valid chord signatures can be tailored to anyone's tolerance. For example, if four notes are on which do not represent a valid chord, but three of these notes define a C Major chord, the user may define the four note combination as a C Major chord.

For example, if the bits of chordSignature from left to right, represent the chromatic scale from C to B, then if the user played the notes C, E and G, then the 12 byte signature would 100010010000. The table of valid chord signatures would recognize this as a C Major chord. There are 4096 possible combinations of playing the 12 notes of the chromatic scale, of which a subset are valid chords. There could be a table of valid chord signatures for each song key, since chords may be valid in some keys and invalid in other.

Figure 15:
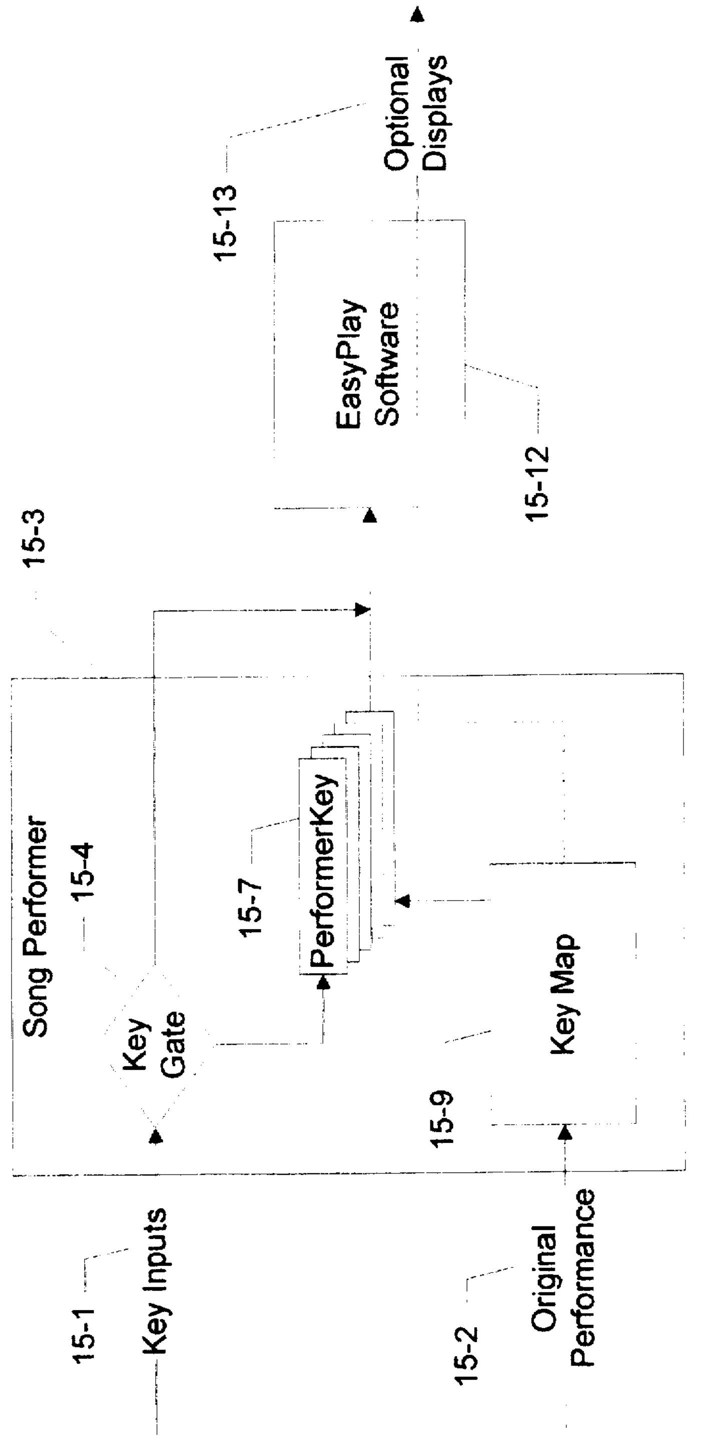
FIG. 15 is a general overview of the method of re-performing a previous performance on a reduced number of keys.

FIG. 15 and Tables 21 and 22

FIG. 15 shows a general overview of replaying a previously recorded performance from a single octave even if the original performance was played from several octaves. It will also indicate to the user which keys to play during re-performance, by utilizing indicators such as LEDs, lamps, alpha numeric displays, etc. Indicators can be positioned on or near the keys to be played, or positioned in some other manner so long as the user can easily discern which indicator corresponds to which key. Indicators could also be displayed on a computer monitor using a depiction of each input controller and its corresponding indicator. The use of indicators for visually assisted musical performances are well known in the art, and involves a controller which contains the processing unit, which may comprise a conventional microprocessor. The controller retrieves indicator information in a predetermined order from a source. The processing unit determines a location on the musical instrument corresponding to said indicator information. The determined location is indicated to the user where the user should physically engage the instrument in order to initiate the intended musical performance, as described in Shaffer et al., U.S. Pat. No. 5,266,735.

The method involves two software objects, SongPerformer 15-3 and PerformerKey 15-7. Although SongPerformer 15-3 is actually part of the EasyPlay Software 15-12, for purposes of illustration it is shown separate. What SongPerformer 15-3 does is intercept live key inputs 15-1 and previously recorded original performance key inputs 15-2 and translate these into the original performance which is then presented to EasyPlay Software 15-12 to be processed as an original performance. Thus the previously recorded original performance is played back under the control of the live Key Inputs 15-1.

The live key inputs 1-15 correspond to the key inputs 1-13 of FIG. 1A. The previous recorded original performance input 15-2 is from the sequencer 1-22 in FIG. 1A. It could also be input from an interchangeable storage device, such as a CD or the like, when said CD contains data representative of chord and/or scale changes, or contains a recorded sync track allowing the sequencer to lock to CD as described herein. 15-2 is referred to as an 'original performance' because it is a sequence of actual keys pressed and presented to EasyPlay software and not the processed output from EasyPlay software, although a processed performance corresponding to the original performance input 15-2 could also be routed and assigned on-the-fly to the appropriately indicated input controller to produce processed output. This would eliminate the need for original performance 15-2 to be presented to EasyPlay software for processing. Original performance 15-2 would still be used to make indications as described herein. A previously recorded processed performance track corresponding to previously recorded original performance track 15-2, could also be used could also be routed and assigned on-the-fly as above to produce processed output, although this method lacks the flexibility of the following method. When using Song Performer utilizing original performance input 15-2 to be presented to EasyPlay software for processing, the original performance will be re-processed by EasyPlay software 15-12. The EasyPlay software 15-12 is the same as 1-10 in FIG. 1A and the optional displays 1-18 of FIG. 1A corresponds to 15-13 of FIG. 15.

The PerformerKey object 15-7 will be discussed before the Song Performer object 15-3. Table 22 show the four attributes of the PerformerKey object 15-7. Attribute isEngaged is set to TRUE when the object is engaged and is set to FALSE when the object is disengaged. The defaultKey attribute holds the default key (MIDI note) value for the object and armedKey[11] is an array of 11 keys that each PeformerKey object 15-7 may be armed with. The attribute velocity holds the velocity parameter received with the last Engage(velocity) service. Each instance of PerformerKey object 15-7 is initialized with isEngaged=FALSE, default key=−1, velocity=0 and each armedKey[] set to −1. The value −1 indicates the attribute is null or empty. The service SetDfltKey(keyNum) will set the defaultKey attribute to keyNum where keyNum is a MIDI note number in the range 0 to 128. The service Engage(v) will set attributes isEngaged to TRUE and velocity to v and will send a MIDI note on message with velocity v for each key (MIDI note number) in the attribute armedKey[] to the EasyPlay software object 15-12. If there are no keys in the armedKey[] attribute, then a note on message with velocity v is sent for the defaultKey attribute if set. The service Disengage() will set isEngaged to FALSE and will send a note off message for each key in armedKey[] to the EasyPlay software object 15-12. If there are no keys in the armedKey[] attribute, then a note off message is sent for the defaultKey attribute if set. By having a default key, the user will always hear something when a key is pressed, even if it is not part of the previously recorded original performance. The service Arm(keyNum) will first place keyNum in the armedKey[] array (if not already). If this is the first key in the armedKey[] array then an indicator on or near the key is illuminated indicating to the user that this key is armed with an original performance event that needs to be played. Then, if isEngaged is TRUE, a note on message for keyNum will be sent (with velocity) to the EasyPlay software object 15-12. If isEngaged is TRUE and keyNum is the first key to be placed in armedKey[] attribute, then a note off message for the default key will also be sent to the EasyPlay software object 15-12. The service DisArm(service) will remove keyNum from armedKey[] array. If isEngaged is TRUE, then a note off message for keyNum will be sent to the EasyPlay software object 15-12. If isEngaged is TRUE and keyNum was the only key in the armedKey[] array then a note on message with velocity for the defaultKey attribute (if set) will be sent to the EasyPlay software object 15-12. When the last key is removed from the armedKey[] array, then the indicator on or near the physical key is turned off. The net effect of the above behavior is that in response to a live key being received (and Engaging a performKey object) a previously recorded key (having armed the performKey object) will be played (presented to EasyPlay software object 15-12) and the live keys that are armed will be indicated to the user.

Table 21 lists Song Performer 15-3 attributes and services. The attribute performerOctave identifies the 1st key of the octave where the user wishes to perform a previously recorded performance. PerformerKey[12] is an array of 12 instances of the PerformerKey objects 15-7 as described above, one instance for each key in one octave. The last attribute is the key map 15-9. This maps or identifies which PerformerKey[] instance should be armed with a given original performance key. The present invention maps all C keys (relative key 0, see FIG. 2) to the 1st PerformerKey instance, all C sharps to the 2nd instance etc., although any number of mapping scenarios, either predetermined manually by assigning a map identifier to each original performance note 15-2 and reading said map identifier on playback to provide routing, or created on-the-fly by using a mapping formula, could be accomplished by those of ordinary skill in the art, allowing user to perform using a variety of routings and skill levels. The mapping of the present invention This is done by dividing an original performance key by 12 and letting the remainder (modulus) identify the instance of PerformerKey[] 15-7 that should be armed with that original performance key. This enables the original performance to be performed from a reduced number of keys. The service SetPerformanceOctave(firstNoteNum) establishes which octave will play the original performance by setting performerOctave attribute to firstNoteNum and then setting the default key of each PerformerKey[] instance 15-7 to be the actual keys of the octave. This is done by calling the SetDfltKey(n) service of each PerformerKey[] instance 15-7. The service RcvLiveKey(keyEvent) responds to live key inputs and acts like a key gate 15-4. The keyEvent contains the status, note number, channel and velocity information. Note numbers that are not in the performer octave are passed directly to the EasyPlay software object 15-12. Note On messages that are in the performer octave result in calling the Engage(v) service of PerformerKey[r] 15-7 where v is the velocity and r is the relative key number of the received note on. Similarly note off messages that are in the performer octave result in calling the Disengage() service of PerformerKey[r] 15-7 where r is the relative key number of the received note on. The service RcvOriginalPerformance(keyEvent) receives previously recorded key events and current status messages. The current status messages and all non note on/off messages are passed directly to EasyPlay software object 15-12 (see table 17 for description of current status). Note on message for note number x will result in calling the Arm(x) service of PerformerKey[y] where y is obtained from the key map attribute 15-9 (in the present invention, y=x % 12 where % is the modulus or "remainder from division" operator). For example, note number 24 calls Arm(24) of PerformerKey [0], while note number 30 calls Arm(30) of PerformerKey [6]. Similarly, note off message for note number x will result in calling the DisArm(x) service of PerformerKey[y] where y is determined the same as for note on messages. When a performerKey 15-7 is armed with a previously recorded note on/off event, then playing the appropriate live key will result in that previously recorded note on/off event being replayed. It should be noted that the original performance information of the present invention could also be used to re-perform an original performance as it was originally played by the user. Although this method has distinct advantages over re-performance methods found in the prior art, it does not provide the dramatic levels of skill reduction described herein.

In one embodiment of the re-performance methods described herein, some or all of the original performance information described herein could be stored on an information track of a CD or other storage device containing audio or sound recording tracks to allow a musical re-performance, such as the performance of a song's melody line, to be performed by a user along with and in sync to the sound recording. To accomplish this, an MTC (MIDI Time Code) track or other form of sync, which is known in the art and a full description of synchronization can be found in MIDI Specification 1.0, is recorded on one of the CD's tracks, which allows the software to read the sync signal during CD playback, and lock to it. The software must be locked to the MTC or other sync signals provided by the CD, so that the data representative of chord and/or scale changes stored in the sequencer will be in sync with the chord and/or scale changes in the sound recording stored on the CD, during lockup and playback. This may require the creation of a sequencer tempo may, known in the art, so that additional music data can be recorded into the sequencer during a performance, and the sequencer's edit features can be utilized effectively. The original performance information stored on the CD can be time-indexed and stored in such a way as to be in sync with the original performance information stored in the sequencer, if any, during lockup and playback, or it can be stored according to preference. Optionally, the CD may contain only a sync signal, along with the sound recording, said sync signal being read by the software, and all music processing taking place completely within the software as described herein. The data representative of chord and/or scale changes stored in the sequencer will still need to be correctly in sync, when locked during playback, and musically-correct with the chord changes in the sound recording stored on the CD. The setup configuration data described herein could be stored on the CD or storage device and read by the software on playback to cause real-time selection of a setup configuration before the sound recording and re-performance begins. Various needed re-performance data for each song could be recorded as a data dump on an information track of the CD with said data dump being read by the software before re-performance begins. This allows all needed re-performance data for each song on the CD to be loaded into memory and indexed. A song selection signal could then be stored on an information track of the CD at the beginning of each song, and read by the software before re-performance of each song commences. This will allow all of the needed corresponding data for the CD's currently selected song to be accessed from memory for proper re-performance. This allows each CD to be self-contained with all of the appropriate data needed for re-performance to each song on the CD.

It should be noted that data representative of an original performance track as described herein, could also be recorded on a CD with a recorded sound recording, and a recorded information track containing data representative of chord and scale changes, known in the art, to provide improvement to such systems. The original performance information could be merged with the data representative of chord and scale changes, and recorded on one of the CD's tracks, or the various information could be recorded using more than one CD track. The chord and scale changes are recorded on the CD in such a way as to be in sync, and musically correct, with the chord and scale changes contained in the sound recording which is recorded on the CD. Original performance information could then be recorded on an information track of the CD so as to be in sync with the data representative of chord and scale changes and/or the sound recording recorded on the CD. This would allow a re-performance as described herein to be achieved on such systems, without the need for the recorded synchronization track described herein to be present on the CD.

TABLE 21

| Song Performer Attributes and Services |
| --- |
| Attributes: |
| 1. performerOctave |
| 2. PerformerKey[12] |
| 3. Key Map |
| Services: |
| 1. SetPerformerOctave(firstNoteNum); |
| 2. RcvLiveKey(keyEvent); |
| 3. RcvOriginalPerformance(keyEvent); |

TABLE 22

| PerformerKey Attributes and Services |
|---|
| Attributes: |
| 1. isEngaged |
| 2. defaultKey |
| 3. velocity |
| 4. armedKeys[11] |
| Services: |
| 1. Engage(velocity); |
| 2. Disengage( ); |
| 3. Arm(keyNum); |
| 4. DisArm(keyNum); |
| 5. SetDefaultKey(keyNum); |

User Interface 3-2

There is one User Interface object 3-2. The user interface is responsible for getting user input from computer keyboard and other inputs such as foot switches, buttons, etc., and making the necessary calls to the other objects to configure the software as the user wishes. The user interface also monitors the current condition and updates the display(s) accordingly. The display(s) can be a computer monitor, alphanumeric displays, LEDs, etc.

In the present invention, the music administrator object 3—3 has priority for CPU time. The user interface 3-2 is allowed to run (have CPU time) only when there is no music input to process. This is probably not observable by the user on today's fast processors (CPUs). The user interface does not participate directly in music processing, and therefore no table of attributes or services is provided (except the Update() service called by the main object 3-1. The user interface on an embedded instrument will look quite different from a PC version. A PC using a window type operating system interface will be different from a non-window type operating system.

User interface scenarios

The user tells the user interface to turn the system off. The user interface calls musicAdm.SetMode(0) 3-3 which causes subsequent music input to be directed, unprocessed, to the music output object 3-12.

The user sets the song key to D MAJOR. The user interface 3-2 calls songKey.SetSongKey(D MAJOR) (3-8). All subsequent music processing will be in D MAJOR.

The user assigns a minor chord to key 48. The user interface 3-2 calls config.AssignChord(minor, 48) 3-5. The next time pianoKey[48] responds to a key on, the current chord type will be set to minor.

As the user is performing, the current chord and scale are changed per new keys being played. The user interface monitors this activity by calling the various services of crntChord, crntScale etc. and updates the display(s) accordingly.

Many modifications and variations may be made in the embodiments described herein and depicted in the accompanying drawings without departing from the concept and spirit of the present invention. Accordingly, it is clearly understood that the embodiments described and illustrated herein are illustrative only and are not intended as a limitation upon the scope of the present invention.

For example, instead of using 54–65 as the basis for data generation, and popular chord voicing, another range may be used. Also, although the present embodiment designates keys 0–59 as the chord progression section, and 60–127 as the melody section, any ranges can be designated for each to adequately accomplish the same result. The split point of the chord section and melody section can be set differently from the independent shifting ranges of the chord section and melody section for increased flexibility on various systems. Chords in the chord progression section can be set to sound in a different octave than described herein. The preferred embodiment allows chords in the chord progression section to be shifted up or down by octaves with a foot switch, etc., instead of splitting the chord progression section into multiple groups and allowing each group to be sounded in a different octave when played. This was done so that the keys could be allocated for making more chord types available to the user, or for possibly even making another song key available simultaneously to the user. Multiple groups could, however, be made to sound in different octaves if needed by simply following the procedures set forth herein for chords in the melody section. Even more chord types could be made available by pressing multiple keys. For example, holding down combinations of keys in the chord progression section such as 1, 1+2, 1+2+3, 1+2+3+4, could each sound a different chord type providing many more chord types to the user. The same system could be used to trigger different inversions of each chord, or even to sound a specific note, combination of notes, or no notes of the chosen chord. When using multiple key presses, the programmer has the option of which combination or combinations shall output a current status message and/or trigger or triggers as described herein. Since current status messages and triggers described herein are used to initiate at least chord or scale changes, among a variety of other things, they may be referred to as data representative of at least a chord and/or scale change. Individual chord notes could also be assigned to individual input controllers in the chord progression section by calling the appropriate chord note mode as described herein. This would allow users to sound each individual note in a chord from separate input controllers in the chord progression section while establishing a chord progression, and while simultaneously making available scale notes, non-scale notes, chords, etc. in the melody section. Each individual chord note could also be set to output a trigger or triggers as described herein. The preferred embodiments of this invention were described using MIDI specifications, although any adequate protocol could be used to accomplish the results described herein. This can be done by simply carrying out all processing relative to the desired protocol. Therefore, the disclosed invention is not limited to MIDI only. Also, a foot pedal, buttons, and/or other input controllers could be used instead of the key depressions as described herein to change song keys, scales, inversions, and modes, and also for general performance or for playing the chord progression.

The invention described herein shall not be limited to the 17 popular chord types and 18 popular scales described, or to the basic inversions given for each chord. Any chord type or scale could be used including modified, altered, or partial scales, and any scale could be assigned to any chord by the user, including making multiple scales and chord voicings available simultaneously. The preferred embodiment describes how to derive inversions 1,2,3,4 and popular voicing of each chord, although any specific inversion or chord voicing could be derived using these methods, and in any octave. For example, an inversion where the alternate note=highest note in the inversion, 3rd note=highest note in the inversion, etc. could also easily be derived. Additional notes could also be output for each chord to create fuller sound, such as outputting an additional fundamental note which is one octave below the original fundamental, outputting scalic and chordal harmony notes, etc. Also, although chord notes in the preferred embodiment are output with a shared common velocity, it is possible to independently allocate velocity data for each note to give chords a "humanized" feel. In addition to this velocity data allocation, other data such as different delay times, polyphonic key pressure, etc. could also be output. Also, the chord assignments for the current song key in the chord progression section were based on the Major scale, even though any scale or scales such as blues, relative minor, modified scales, partial scales (ex. 1-4-5 only), scales with different roots, etc. could easily be used, so long as the note or notes assigned to be performed from a particular input controller make up a chord which is representative of the correct chord number and song key corresponding to said input controller, said chord number based on said song key's customary scale or customary scale equivalent.

Chord groups in the chord progression section could be made available in any order and labeled according to preference. Non-scale chords and/or chord group indicators were provided using the "#" symbol and appropriate relative position number. Any other symbols or indicators will do such as color coding, providing various icons, or titling a group with a name, such as non-scale, etc. so long as it is adequately conveyed to the user a chord or chord group's scale or non-scale status.

A specific relative position indicator could also be used to indicate an entire group of input controllers when each input controller in the group plays an individual chord note of a specific chord in the chord progression, such as all of the notes of a "1" chord, etc. It should be noted that the indicators described herein could be used to benefit any system in which chord progressions are to be performed from a chord progression section of the instrument, including any systems which may provide data representative of chord and scale changes. Indicator methods described herein could also be used to improve any system where at least one song key is selected for said chord progression section.

Also, the indication system in the preferred embodiment shows only 1 or 2 song keys simultaneously to avoid confusion to the user, it could also be expanded to show more song keys simultaneously. For example, in the song key of CMajor, the indication system could be made to not only display a 1 to indicate chord group 1 in the key of CMajor, but also a 5 to indicate chord group 5 in the key of FMajor, a 4 to indicate chord group 4 in the key of GMajor, a 2 to indicate chord group 2 in the key of A#Major, etc. The indication system could also indicate other useful information such as current chord type, chord root, etc. Also, the key labels in the present invention used only sharps (#) in order to simplify the description. These labels could easily be expanded using the Universal Table of Keys with the appropriate formulas, 1-b3-5, etc., which is known in the art. It should also be noted that all processed output could be shifted by semitones to explore various song keys, although all labels would need to be transposed accordingly. The current status message could optionally be transposed accordingly depending on the system implementation being used.

The invention described herein shall not be limited to the 17 popular chord types and 18 popular scales described, or to the basic inversions given for each chord. Any chord type or scale could be used including modified, altered, or partial scales, and any scale could be assigned to any chord by the user. The preferred embodiment describes how to derive inversions 1,2,3,4 and popular voicing of each chord, although any specific inversion or chord voicing could be derived using these methods, and in any octave. For example, an inversion where the alternate note=highest note in the inversion, 3rd note=highest note in the inversion, etc. could also easily be derived. Additional notes could also be output for each chord to create fuller sound, such as outputting an additional fundamental note which is one octave below the original fundamental, etc. Also, although chord notes in the preferred embodiment are output with a shared common velocity, it is possible to independently allocate velocity data for each note to give chords a "humanized" feel. In addition to this velocity data allocation, other data such as different delay times, polyphonic key pressure, etc. could also be output. Also, the current song key in the chord progression section is based on the Major scale, even though any scale or scales such as blues, relative minor, modified scales, partial scales (ex. 1-4-5 only), etc. could easily be used. Although the preferred embodiment described herein places all chord groups in chromatic order, any random order could just as easily be used. The indication system described herein shows chord groups 1–7 Major, and 1–7 relative minor of current song key and indicates non-scale chord groups with the "#" symbol and appropriate number. Any other symbols or indicators will do as long as they adequately convey to the user each chord groups specific relative position in the current song key scale and/or which chord groups are scale groups and which are non-scale groups. Because of the nature of the fixed-location methods described herein, a user could successfully operate this invention using no indication system at all, if preferred. Also, the indication system in the preferred embodiment shows only 1 or 2 song keys simultaneously to avoid confusion to the user, it could also be expanded to show more song keys simultaneously. For example, in the song key of CMajor, the indication system could be made to not only display a 1 to indicate chord group 1 in the key of CMajor, but also a 5 to indicate chord group 5 in the key of FMajor, a 4 to indicate chord group 4 in the key of GMajor, a 2 to indicate chord group 2 in the key of A#Major, etc. The indication system could also indicate other useful information such as current chord type, chord root, etc. Also, the key labels in the present invention used only sharps (#) in order to simplify the description. These labels could easily be expanded using the Universal Table of Keys with the appropriate formulas, 1-b3-5, etc., which is known in the art.

In the preferred embodiment, 4 positions are allocated for the fixed chord location, where the first position is the fundamental (1st) of the chord, second position is the alternate (5th) of the chord, and third and fourth positions are the remaining chord notes sorted from lowest to highest. Although this is the preferred embodiment, any number of positions could be allocated for the fixed chord location to allow for larger chords, or for additional specific chord notes or various chord voicing notes to be played. Duplicate chord notes could be eliminated, if preferred. Also, any specific chord note could be made available on any key in the fixed chord location and in any order. For example, we could have had the (3rd) of the chord specifically made available to the user for playing in place of the C1 for example. We could also have used any order such as fund., 3rd, alt., C1, etc. We could also have one or more chord notes made available in this fixed location randomly, such as sorting them from lowest to highest as described herein, etc. When providing indicators for specific chord notes, such as the fundamental and/or fifth, any indicator will do so long as it adequately conveys to the user the said note. For example, fund. and alt., 1 and 5, or through other indicators which may be accommodated by an explanation in a manual or through other means as described herein.

In the preferred embodiment, 7 positions are allocated for the fixed scale location. Notes are sorted from lowest to highest and then the highest is duplicated if needed. Although this is the preferred method, any number of positions could be allocated to accommodate different scale sizes and scale notes could be made available in any order, and without note duplication, if preferred. ScalesFor example, the scale could be made available with the root note in the first position, or scale notes could be arranged based on other groups of notes next to them. This would be useful when scale note groups and remaining non-scale note groups are made available next to each other or in the same approximate location. Each scale and non-scale note would be located into a position based on their closest proximity to each other. This would sometimes leave blank positions between notes which could then be filled with duplicate(s) of the previous lower note or next highest note or both, etc. These same rules apply for the remaining non-scale note groups and remaining scale note groups described herein. Any number of positions can be allocated to them and in any order. The scale note groups, combined scale note groups, individual chord note groups, chord inversion/voicing groups, remaining scale note groups, and remaining non-scale note groups, and various harmony groups for each of these described groups, described herein can be made available to the user in separate groups or together in any combination of groups based on preference and on the capabilities of the instrument on which these methods are employed. The locations of these groups are not to be limited to the locations described herein, with scale notes on the white keys and chord notes on the black keys. Any group or groups could be located anywhere on the instrument, and even broken up if need be. Futuristic instruments may have the ability to make many of the groups available simultaneously, including the right hand chords, block notes, thirds, etc. They may also use input controllers such as pads, buttons, or other devices which do not make-use of traditional keys at all. All methods described herein will work on these futuristic instruments regardless of the type of input controller they utilize and should be protected by the claims described herein, including input controllers which may provide as its input, multiple signals or inputs allowing chord progression notes and chords to be sounded at a different time than actual note generation and/or assignments take place.. Modern day instruments, however, will probably make the modes mentioned above available to the user by switching various modes between the same sets of keys, as described herein, while making only a certain group or groups available to the user simultaneously. This is due to the current limitations of today's instruments.

The preferred embodiment also describes a means of switching between two different song keys, and also a means of switching between two different scales for each current chord. By using the teachings described herein, a person of average skill in the art could easily expand these to more than just 2 each.

In the preferred embodiment, the chord progression section and the melody section can be made to function together or separately. It may also be useful to make the chord progression section and the first octave of the melody section to function together and independently of the rest of the melody section. Since the first octave of the melody section may often times sound notes which are in the same octave as notes sounded in the chord progression section this may prove useful in certain circumstances. Functions such as octave shifting, full range chords, etc. could be applied to the chord progression section and first melody octave independently of the functioning of the rest of the melody section. It may also be useful to make various modes and sections available by switching between them on the same sets of keys. For example, switching between the chord progression section and first melody octave on the same set of keys, or between scale and non-scale chord groups, etc. This would allow a reduction in the amount of keys needed to effectively implement the system. Also, although the preferred embodiment sends the processed output of the chord progression section and melody section on the same channel, separate channels could be assigned to a variety of different zones, known in the art, and note groups on the instrument, each thus allowing a user to hear different sounds for each zone or note group section. This could also apply to the trigger output, original performance, and harmony note output as well.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

I claim:

1. A method of generating a chord progression on an electronic instrument, comprising the steps of:

designating an input controller on the instrument for the performance of musical data, where said musical data comprises note-identifying information, and where said musical data is provided in response to selections and deselections of said input controller;

selecting a first song key corresponding to said input controller, said first song key defining said first song key's customary scale and customary scale equivalent;

providing first musical data comprising first note-identifying information, said first note-identifying information identifying notes making up a first chord representing a relative position in said first song key's customary scale or customary scale equivalent;

selecting a second song key corresponding to said input controller, said second song key defining said second song key's customary scale and customary scale equivalent;

providing second musical data comprising second note-identifying information, said second note-identifying information identifying notes making up a second chord which represents the same relative position in said second song key's customary scale or customary scale equivalent as said first chord represented in said first song key's customary scale or customary scale equivalent;

during at least one of said steps of selecting a first song key and providing first musical data or selecting a second song key and providing second musical data, providing at least one indicator corresponding to said input controller, said indicator representing a relative position corresponding to the selected song key for which it is provided, and to the corresponding chord of said selected song key; and in at least one of said steps of providing musical data, providing data representative of at least a chord or scale change.

* * * * *